United States Patent
Zheng et al.

(10) Patent No.: US 12,552,028 B2
(45) Date of Patent: Feb. 17, 2026

(54) BARYCENTER POSITION DETERMINING METHOD AND APPARATUS, LEGGED ROBOT, AND STORAGE MEDIUM

(71) Applicant: Tencent Technology (Shenzhen) Company Limited, Shenzhen (CN)

(72) Inventors: Yu Zheng, Shenzhen (CN); Xinyang Jiang, Shenzhen (CN); Wanchao Chi, Shenzhen (CN); Yonggen Ling, Shenzhen (CN); Shenghao Zhang, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 892 days.

(21) Appl. No.: 17/743,296

(22) Filed: May 12, 2022

(65) Prior Publication Data

US 2022/0274254 A1    Sep. 1, 2022

Related U.S. Application Data

(63) Continuation of application No. PCT/CN2021/086937, filed on Apr. 13, 2021.

(30) Foreign Application Priority Data

Apr. 14, 2020 (CN) .......................... 202010291278.4
Dec. 17, 2020 (CN) .......................... 202011503026.X

(51) Int. Cl.
*B62D 57/032* (2006.01)
*B25J 9/16* (2006.01)
*B25J 17/02* (2006.01)

(52) U.S. Cl.
CPC ......... *B25J 9/1664* (2013.01); *B25J 17/0283* (2013.01); *B62D 57/032* (2013.01)

(58) Field of Classification Search
CPC .... B62D 57/032; B25J 17/0283; B25J 9/1664
See application file for complete search history.

(56) References Cited

U.S. PATENT DOCUMENTS

2011/0178637 A1    7/2011    Lee et al.

FOREIGN PATENT DOCUMENTS

| CN | 105511465 A | 4/2016 |
|----|-------------|--------|
| CN | 106547206 A | 3/2017 |

(Continued)

OTHER PUBLICATIONS

Tencent Technology, Extended European Search Report, EP21787912.1, Jan. 9, 2023, 8 pgs.

(Continued)

*Primary Examiner* — Lam S Nguyen
(74) *Attorney, Agent, or Firm* — Morgan, Lewis & Bockius LLP

(57) ABSTRACT

A computing device creates first relation data indicating a relation between an interval duration and a center of mass position of a legged robot. The first relation data comprises a first constant, C. The computing device creates second relation data corresponding to at least one leg of for the legged robot and a force corresponding to the at last one leg with the ground. The second relation data comprises the first constant, C. The computing device creates third relation data according to the second relation data. The device determines a value of the first constant, C, when a target value J is a minimum value, and obtains the first relation data according to the determined value of the first constant, C.

20 Claims, 10 Drawing Sheets

(56) References Cited

FOREIGN PATENT DOCUMENTS

| | | |
|---|---|---|
| CN | 106814746 A | 6/2017 |
| CN | 107065908 A | 8/2017 |
| CN | 108237532 A | 7/2018 |
| CN | 109311159 A | 2/2019 |
| CN | 109703645 A | 5/2019 |
| CN | 110262510 A | 9/2019 |
| CN | 111506094 A | 8/2020 |
| JP | 5392125 B2 | 1/2014 |
| KR | 20170001260 A | 1/2017 |
| WO | WO 2015087504 A1 | 6/2015 |

OTHER PUBLICATIONS

Tencent Technology, WO, PCT/CN2021/086937, Jun. 24, 2021, 6 pgs.
Tencent Technology, IPRP, PCT/CN2021/086937, Oct. 13, 2022, 7 pgs.
Tencent Technology, Japanese Office Action, JP Patent Application No. 2022-539318, Oct. 17, 2023, 18 pgs.
Tencent Technology, Isr, PCT/CN2021/086937, Jun. 24, 2021, 2 pgs.

BARYCENTER POSITION DETERMINING METHOD AND APPARATUS, LEGGED ROBOT, AND STORAGE MEDIUM

CROSS-REFERENCE TO RELATED APPLICATIONS

This application is a continuation application of PCT Patent Application No. PCT/CN2021/086937, entitled "METHOD AND DEVICE FOR DETERMINING BARYCENTER POSITION, LEGGED ROBOT, AND STORAGE MEDIUM" filed on Apr. 13, 2021, which claims priority to: (i) Chinese Patent Application No. 202010291278.4, filed with the State Intellectual Property Office of the People's Republic of China on Apr. 14, 2020, and entitled "BARYCENTER POSITION DETERMINING METHOD AND APPARATUS, LEGGED ROBOT, AND STORAGE MEDIUM", and (ii) Chinese Patent Application No. 202011503026.X, entitled "BARYCENTER POSITION DETERMINING METHOD AND APPARATUS, LEGGED ROBOT, AND STORAGE MEDIUM", filed on Dec. 17, 2020, all of which are incorporated herein by reference in their entirety.

FIELD OF THE TECHNOLOGY

Embodiments of this application relate to the field of computer technologies, and in particular, to a center of mass position determining method and apparatus, a legged robot (e.g., a footed robot, a robot with legs, etc.), a computing device, and a computer-readable storage medium.

BACKGROUND OF THE DISCLOSURE

A legged robot is a robot that moves by simulating a walking gesture of an animal or a human. The legged robot is usually configured with a plurality of legs, each of which is configured with one or more joints, and moves by controlling raising or lowering of the legs. When the legged robot moves, a center of mass position of the legged robot needs to be first determined, and then raising or lowering of the leg is controlled according to the determined center of mass position.

A center of mass position determining method is provided in the related art, where a state of each joint in each leg configured for a legged robot is detected, and calculation is performed according to the state of each joint in each leg, to determine a center of mass position of the legged robot. If the legged robot has a relatively large number of joints, the calculation amount is relatively large. Therefore, the foregoing method is applicable to only a case that a legged robot has a relatively small smaller of joints, and has a narrow application range.

SUMMARY

Embodiments of this application provide a center of mass position determining method and apparatus, a legged robot, a device, and a medium, which can improve center of mass position accuracy. The technical solutions are as follows:

According to one aspect, a center of mass position determining method is provided, including:
creating first relation data, the first relation data indicating a relation between an interval duration t and a center of mass position P(t) of a legged robot, and the first relation data including a first constant C;
creating second relation data corresponding to at least one leg configured for the legged robot, the second relation data indicating a relation between a force $f_i$ corresponding to the at least one leg with the ground and the center of mass position P(t), and the second relation data including the first constant C;
creating third relation data based on the second relation data corresponding to the at least one leg, and determining a value of the first constant C in accordance with a determination that a target value J is a minimum value, the third relation data indicating a positive correlation between the target value J and a square of an acting force $f_i$ to which the at least one leg in contact with the ground is subjected; and
obtaining the first relation data corresponding to the first constant C whose value is determined.

According to another aspect, a center of mass position determining apparatus is provided, including:
a creating module, configured to create first relation data, the first relation data indicating a relation between an interval duration t and a center of mass position P(t) of a legged robot, and the first relation data including a first constant C;
the creating module being further configured to create second relation data corresponding to at least one leg configured for the legged robot, the second relation data corresponding to the at least one leg separately indicating a relation between an acting force $f_i$ corresponding to the at least one leg and the center of mass position P(t), and the second relation data including the first constant C;
the creating module being further configured to create third relation data based on the second relation data corresponding to the at least one leg, and determining a value of the first constant C in accordance with a determination that a target value J is a minimum value, the third relation data indicating a positive correlation between the target value J and a square of an acting force $f_i$ to which the at least one leg in contact with the ground is subjected; and
an obtaining module, configured to obtain the first relation data corresponding to the first constant C whose value is determined.

According to another aspect, a legged robot is provided, including: a processor and a memory, the memory storing at least one computer program, and the at least one computer program being loaded and executed by the processor to implement operations performed in the center of mass position determining method according to the foregoing aspects.

According to another aspect, a control device is provided, including: a processor and a memory, the memory storing at least one computer program, and the at least one computer program being loaded and executed by the processor to implement operations performed in the center of mass position determining method according to the foregoing aspects.

According to another aspect, a computer-readable storage medium is provided, storing at least one computer program, the at least one computer program being loaded and executed by a processor to implement operations performed in the center of mass position determining method according to the foregoing aspects.

According to still another aspect, a computer program product or a computer program is provided, including computer program code, the computer program code being stored in a computer-readable storage medium. A processor of a control device reads the computer program code from the computer-readable storage medium, and the processor executes the computer program code, to cause the control device to implement operations performed in the center of mass position determining method according to the foregoing aspects.

The technical solutions provided in the embodiments of this application include at least the following beneficial effects:

Based on the method, the apparatus, the legged robot, the device, and the medium provided in the embodiments of this application, it is unnecessary to detect a state of each joint of a legged robot, third relation data is created through second relation data corresponding to at least one leg of the legged robot, a value of a first constant C in the third relation data when a target value J is a minimum value is determined, and first relation data corresponding to the first constant C whose value is determined is determined as a center of mass trajectory of the legged robot moving from an initiation position to a termination position, so that the legged robot can move according to the determined center of mass trajectory, to ensure movement efficiency of the legged robot. Moreover, this manner is applicable to a legged robot with any quantity of legs, and has a wide application range.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some of the embodiments of this application, and a person of ordinary skill in the art may still derive other drawings from these accompanying drawings without creative efforts.

DESCRIPTION OF EMBODIMENTS

Figure 1:
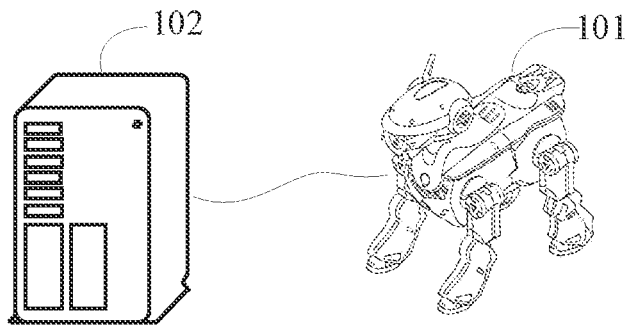
FIG. 1 is a schematic structural diagram of an implementation environment according to an embodiment of this application.

To make objectives, technical solutions, and advantages of the embodiments of this application clearer, the following further describes in detail implementations of this application with reference to the accompanying drawings.

It may be understood that, the terms "first", "second", "third", "fourth", "fifth", "sixth", "seventh", "eighth", "ninth", and the like used in this application may be used for describing various concepts in this specification. However, the concepts are not limited by the terms unless otherwise specified. The terms are merely used for distinguishing one concept from another concept. For example, without departing from the scope of this application, first relation data may be referred to as second relation data, and similarly, the second relation data may be referred to as the first relation data.

For the terms "at least one", "a plurality of", "each", and "any" used in this application, "at least one" refers to "one", "two", or "more", "a plurality of" refers to "two" or "more", "each" refers to "each of a plurality of corresponding", and "any" refers to "any one of a plurality of". For example, when "a plurality of sampling time points" refers to "three sampling time points", "each" refers to "each of the three sampling time points", and "any" refers to "any one of the three sampling time points", that is, may be the first sampling time point, the second sampling time point, or the third sampling time point.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

In the solutions provided in the embodiments of this application, through AI-based CV, a legged robot can determine a termination position (e.g., a target position, an ending position), a center of mass trajectory of the legged robot moving from an initiation position (e.g., an initial position, a starting position) to the termination position is obtained based on the determined termination position, and subsequently the legged robot is controlled according to the center of mass trajectory to move, to implement movement of the legged robot to the termination position.

A center of mass position determining method provided in the embodiments of this application is applicable to a legged robot. When the legged robot moves, a center of mass trajectory of movement from an initial position to a termination position is determined, and subsequently a center of mass position of the legged robot at any time point in a movement process is determined through the center of mass trajectory, thereby controlling raising or lowering of at least one leg of the legged robot, so that when the legged robot moves from the initiation position to the termination position, the center of mass of the legged robot moves according to the center of mass trajectory, to implement walking of the legged robot.

The center of mass position determining method provided in the embodiments of this application is further applicable to a control device. In some embodiments, the control device 102 is a server or a device in another form. In some embodiments, the server is an independent physical server, or a server cluster including a plurality of physical servers or a distributed system, or a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

FIG. 1 is a schematic structural diagram of an implementation environment according to an embodiment of this application. As shown in FIG. 1, the implementation environment includes a legged robot 101 and a server 102. The legged robot 101 and the server 102 establish a communicative connection, and interact with each other through the established communicative connection.

The legged robot 101 is configured to control raising or lowering of at least one leg, to implement walking of the legged robot. The server 102 is configured to provide a service to the legged robot 101, and can determine a center of mass trajectory for the legged robot 101 and send the determined center of mass trajectory to the legged robot 101, so that the legged robot 101 moves according to the center of mass trajectory.

In some embodiments, the legged robot 101 is configured with a perception system, and configured to obtain an image of the legged robot 101 in a movement direction through the perception system and send the image to the server 102, and the server 102 processes the image, to obtain a termination position of the legged robot, and subsequently determines a center of mass trajectory of the legged robot 101 according to the termination position.

The method provided in the embodiments of this application may be used for a plurality of scenarios.

For example, a scenario in which a legged robot moves:

When the legged robot moves, a termination position (e.g., a target position, a destination location) that needs to be reached is determined. By using the center of mass position determining method provided in the embodiments of this application, a center of mass trajectory of movement of the legged robot from an initiation position to the termination position is determined, and subsequently a center of mass position of the legged robot at any time point in a movement process is determined through the center of mass trajectory, thereby controlling raising or lowering of at least one leg of the legged robot, so that when the legged robot moves from the starting position to the ending position, the center of mass of the legged robot moves according to the center of mass trajectory, to implement walking of the legged robot and ensure movement stability of the legged robot.

In another example, a scenario in which a legged robot is remotely controlled to move:

When the legged robot moves, a server can control the legged robot to move. When the server controls the legged robot to move, the server determines, by using the center of mass position determining method provided in the embodiments of this application, a center of mass trajectory of the legged robot moving from an initiation position to a termination position, and sends the center of mass trajectory to the legged robot, and the legged robot controls the center of mass of the legged robot to move along the center of mass trajectory, to remotely control the legged robot to move.

Figure 2:
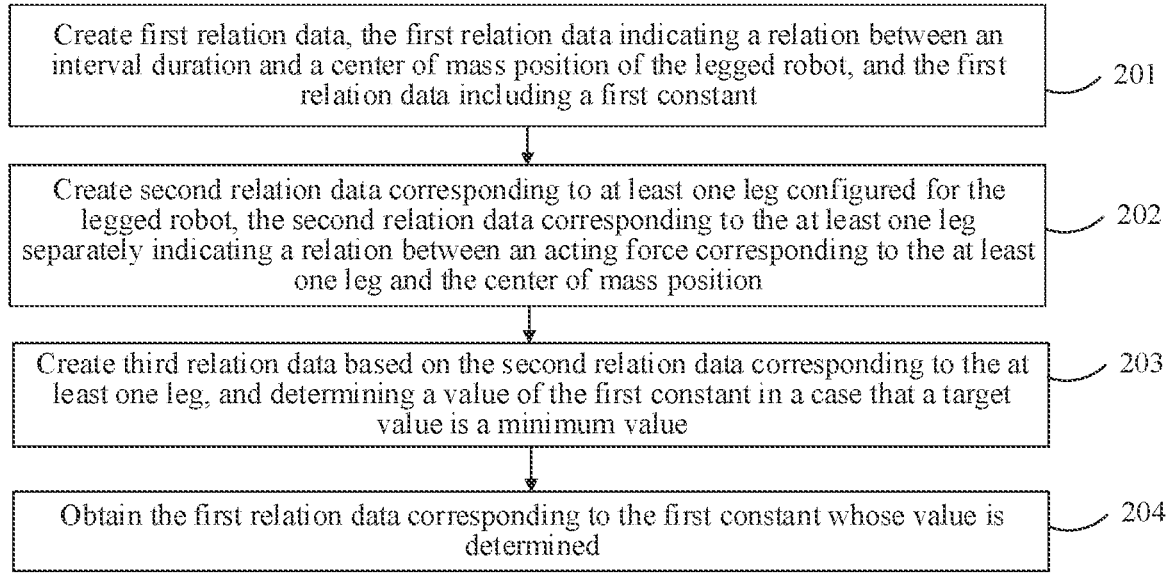
FIG. 2 is a flowchart of a center of mass position determining method according to an embodiment of this application.

FIG. 2 is a flowchart of a center of mass position determining method according to an embodiment of this application, applicable to a legged robot. As shown in FIG. 2, the method includes the following steps.

201. Create first relation data, the first relation data indicating a relation between an interval duration t and a center of mass position P(t) of the legged robot, and the first relation data includes a first constant C.

The interval duration t indicates a duration of an interval between any time point in a process that the legged robot moves from an initiation position to a termination position and a start time point corresponding to the initiation position, and the center of mass position P(t) indicates a center of mass position of the legged robot within the interval duration t.

Because a value of the first constant C included in the first relation data is not determined, the first relation data obtained in this case has not been determined. If the value of the first constant C is determined subsequently, a center of mass position P(t) corresponding to any interval duration t can be obtained through the first relation data.

202. Create second relation data corresponding to at least one leg configured for the legged robot, the second relation data corresponding to the at least one leg separately indicating a relation between an acting force $f_i$ corresponding to the at least one leg and the center of mass position P(t).

The second relation data includes the first constant C. The acting force $f_i$ indicates an acting force to which the $i^{th}$ leg in contact with the ground of the legged robot in the center of mass position P(t) is subjected, and i is a positive integer.

The legged robot is configured with at least one leg, and the legged robot is in contact with the ground through the at least one leg, thereby implementing movement or standing of the legged robot. i is used for representing sequence numbers of legs of the legged robot, and the sequence numbers of the legs are used for differentiating between different legs. When the center of mass of the legged robot is in any center of mass position P(t), different legs of the legged robot in contact with the ground may be subjected to different acting forces, that is, different legs in contact with the ground may be subjected to different acting forces $f_i$. Therefore, the second relation data corresponding to the at least one leg is separately created.

203. Create third relation data based on the second relation data corresponding to the at least one leg, and determine a value of the first constant C in accordance with a determination that a target value J is a minimum value.

The third relation data indicates a positive correlation between the target value J and a square of an acting force $f_i$ to which the at least one leg in contact with the ground is subjected. The positive correlation between the target value J and the square of the acting force $f_i$ to which the at least one leg in contact with the ground is subjected means that the target value J increases as the square of the acting force $f_i$ to which the at least one leg in contact with the ground is subjected increases, and decreases as the square of the acting force $f_i$ to which the at least one leg in contact with the ground is subjected decreases.

Because the second relation data corresponding to the at least one leg indicates the relation between the center of mass position P(t) and the acting force $f_i$ corresponding to the at least one leg, and the second relation data includes the first constant C, the value of the first constant C when the target value J is the minimum value can be determined based on the second relation data corresponding to the at least one leg.

204. Obtain the first relation data corresponding to the first constant C whose value is determined.

After the first constant C whose value is determined is substituted into the first relation data, a center of mass position P(t) corresponding to any interval duration t can be determined through the first relation data, that is, the first relation data corresponding to the first constant C whose value is determined is equivalent to obtaining the center of mass of the legged robot.

Based on the method provided in this embodiment of this application, it is not necessary to detect a state of each joint of a legged robot. Third relation data is created through second relation data corresponding to at least one leg of the legged robot, a value of a first constant C in the third relation data when a target value J is a minimum value is determined, and first relation data corresponding to the first constant C whose value is determined is determined as a center of mass trajectory of the legged robot moving from an initiation position to a termination position, so that the legged robot moves according to the determined center of mass trajectory, to ensure movement efficiency of the legged robot. Moreover, this manner is applicable to a legged robot with any quantity of legs, and has a wide application range.

Figure 3:
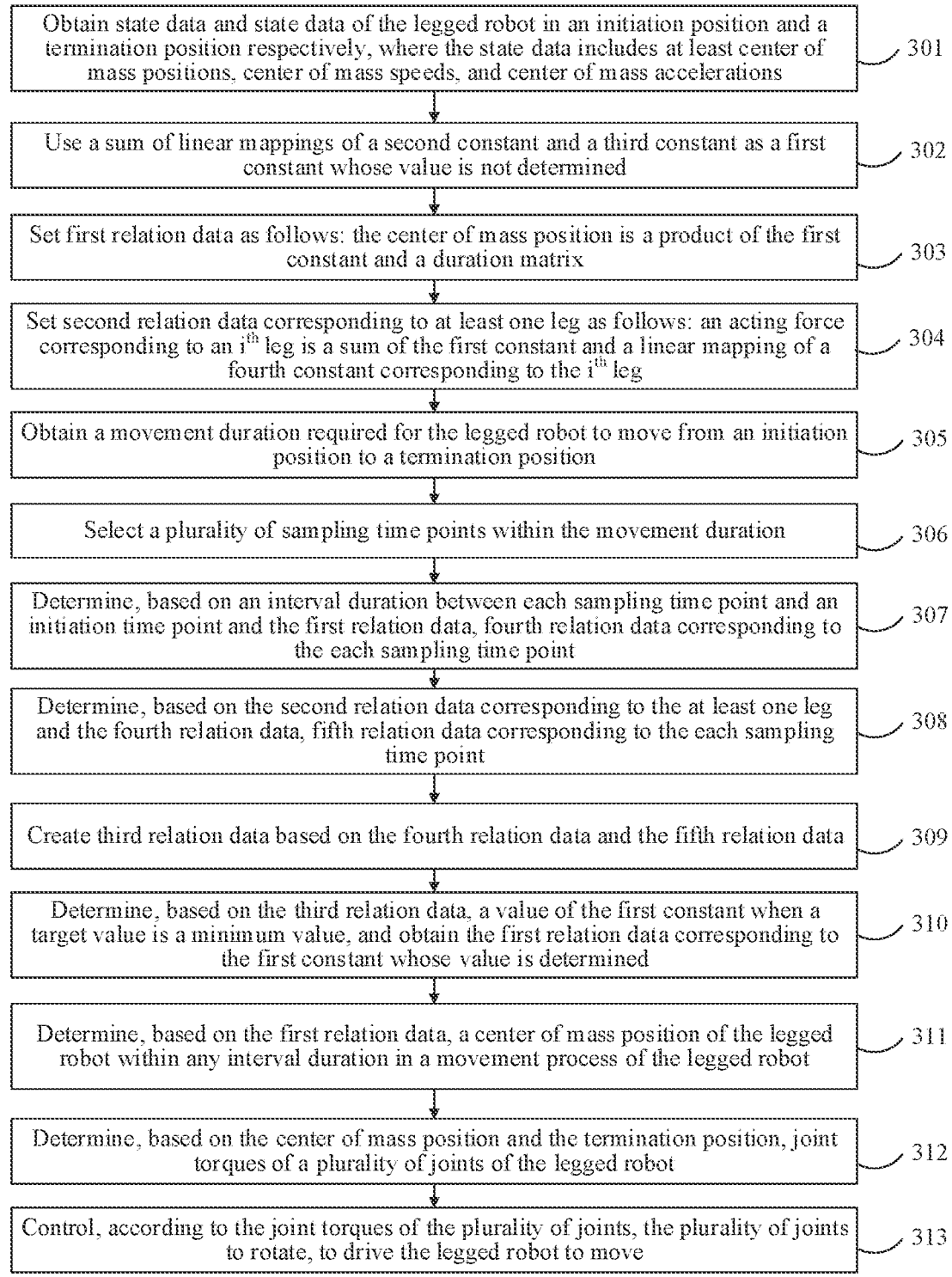
FIG. 3 is a flowchart of a center of mass position determining method according to an embodiment of this application.

In the following embodiment, third relation data is created based on first relation data and second relation data corresponding to at least one leg of a legged robot, and then a center of mass trajectory of the legged robot is determined through the third relation data. in the following embodiment, because an acting force $f_i$ to which the at least one leg of the legged robot is subjected refers to an acting force to which the at least one leg in contact with the ground of the legged robot is subjected when the center of mass of the legged robot is in a center of mass position P(t), the acting force $f_i$ to which the at least one leg is subjected can be represented with $f_i\{P(t)\}$; and because a first constant C is formed by a second constant $C_{free}$ whose value is not determined and a third constant h whose value is determined, a sampling center of mass position Q(C) can be represented with $Q(C_{free})$. FIG. 3 is a flowchart of a center of mass position determining method according to an embodiment of this application, applicable to a legged robot. As shown in FIG. 3, the method includes the following steps.

301. Obtain first state data and second state data of the legged robot in an initiation position and a termination position respectively, where the state data includes at least center of mass positions, center of mass speeds, and center of mass accelerations.

The center of mass is the center of mass of the legged robot, and the center of mass position is a position of the center of mass of the legged robot. In some embodiments, the center of mass position is represented with coordinates in a coordinate system or a vector. The center of mass speed is a movement speed of the center of mass of the legged robot, and the center of mass acceleration is an acceleration of the center of mass of the legged robot. In some embodiments, the center of mass speed and the center of mass acceleration are both represented with vectors. For example, in a world coordinate system, the center of mass position of the legged robot is [20, 35, 80], the center of mass speed is [5, 3, 0], and the center of mass acceleration is [2, 2, 2].

In a possible implementation, the obtaining first state data in an initiation position includes: detecting, by the legged robot, a state of the legged robot in the initiation position, and obtaining the state data in the initiation position.

In a possible implementation, the obtaining second state data in a termination position includes: obtaining, by the legged robot through a vision perception system, an image including an environment in a movement direction of the legged robot, performing feature extraction on the image, determining the termination position of the legged robot, and determining the second state data for the termination position. In some embodiments, the second state data in the termination position is arbitrarily set by the legged robot. For example, the vision perception system includes a camera, and the legged robot photographs the environment in the movement direction of the legged robot through the camera, to obtain the image including the environment in the movement direction of the legged robot.

302. Use a sum of linear mappings of a second constant $C_{free}$ and a third constant h as a first constant C whose value is not determined.

The first constant C is a constant used for representing a relation between a center of mass position P(t) and an interval duration t, and the first constant C can be represented in the form of a vector or a matrix.

The second constant $C_{free}$ is a constant whose value is not determined, and is a constant used for representing a relation between an interval duration t and a center of mass position P(t), and the second constant $C_{free}$ can be represented in the form of a vector or a matrix.

The third constant h is determined based on the obtained state data, and because the state data of the legged robot in the initiation position and the termination position has been determined, a value of the third constant h has been determined. The third constant h can be represented in the form of a vector or a matrix. For example, the third constant h is represented as h=[$P_0$ $V_0$ $a_0$ $P_1$ $V_1$ $a_1$], where $P_0$ represents the center of mass position of the legged robot in the initiation position, $V_0$ represents the center of mass speed of the legged robot in the initiation position, and $a_0$ represents the center of mass acceleration of the legged robot in the initiation position; and $P_1$ represents the center of mass position of the legged robot in the termination position, $V_1$ represents the center of mass speed of the legged robot in the termination position, and $a_1$ represents the center of mass acceleration of the legged robot in the termination position.

Because the value of the second constant $C_{free}$ is not determined, and the value of the third constant h has been determined, the value of the first constant C obtained by adding the linear mappings of the second constant $C_{free}$ and the third constant h is not determined.

In a possible implementation, step 302 includes: obtaining a mapping matrix of the second constant $C_{free}$ and a mapping matrix of the third constant h, and using a sum of a product of the second constant $C_{free}$ and the corresponding mapping matrix and a product of the third constant h and the corresponding mapping matrix as the first constant C. That is, the second constant $C_{free}$, the third constant h, and the first constant C meet the following relation:

$$C = T'C_{free} + Qh$$

where T' is a constant matrix used for representing the mapping matrix of the second constant $C_{free}$, and Q is a constant matrix used for representing the mapping matrix of the third constant h. In some embodiments, the constant matrix T' is a matrix of 96 rows and 15 columns. In some embodiments, the constant matrix Q is a constant matrix of 96 rows and 18 columns. In some embodiments, the second constant $C_{free}$ is a column vector of 15 rows. In some embodiments, the third constant h is a column vector of 18 rows.

303. Set first relation data as follows: the center of mass position P(t) is a product of the first constant C and a duration matrix E.

The first relation data is used for indicating a relation between the interval duration t and the center of mass position P(t). The interval duration t is used for indicating a duration of an interval between any time point in a process that the legged robot moves from an initiation position to a termination position and a start time point corresponding to the initiation position, and the center of mass position P(t) is used for indicating a center of mass position of the legged robot within the interval duration t. Because the first constant C whose value is not determined is obtained through the second constant $C_{free}$ whose value is not determined and the third constant h whose value is determined, the first relation data includes the second constant $C_{free}$ whose value is not determined and the third constant h. in the legged robot, the first relation data can be stored in the form of a descriptive statement or a function.

The duration matrix E is a matrix used for representing the interval duration t, and the duration matrix E meets the following relation:

$$E = \begin{bmatrix} E_t & 0 & 0 \\ 0 & E_t & 0 \\ 0 & 0 & E_t \end{bmatrix}; \text{ and } E_t = [1 \ t \ t^2 \ t^3]$$

where $E_t$ represents a duration vector. In this embodiment of this application, the highest power the interval duration t included in the duration vector $E_t$ is 3, and in another embodiment, the highest power the interval duration t included in the duration vector $E_t$ is any positive integer not less than 2.

In a possible implementation, the first relation data is represented with the following function:

$$P(t) = P^{init} + EC$$

$$P(t) = P^{init} + \begin{bmatrix} E_t & 0 & 0 \\ 0 & E_t & 0 \\ 0 & 0 & E_t \end{bmatrix} (T'C_{free} + Qh)$$

where $P^{init}$ is a constant vector used for representing an initiation center of mass position of the legged robot at the beginning of any movement period; T' is a constant matrix used for representing the mapping matrix of the second constant $C_{free}$; Q is a constant matrix used for representing the mapping matrix of the third constant h.

Because the value of the second constant $C_{free}$ included in the first relation data is not determined, a center of mass position P(t) corresponding to any interval duration t cannot be determined through the first relation data. If the value of the second constant $C_{free}$ is determined subsequently, a center of mass position P(t) corresponding to any interval duration t can be obtained through the first relation data.

Because the center of mass position of the legged robot changes with a moving interval duration t in a movement process of the legged robot, the center of mass position after any interval duration t has a corresponding center of mass position change amount, and a sum of the center of mass position change amount corresponding to the interval duration t and the initiation center of mass position of the legged robot at the beginning of movement is used as the corresponding center of mass position P(t) of the legged robot after any interval duration t, thereby determining the first relation data indicating a relation between the center of mass position P(t) and the interval duration t, and subsequently determining the center of mass trajectory of the legged robot through the first relation data.

In this embodiment of this application, the first relation data is created through the first state data in the initiation position and the second state data in the termination position that are obtained, and the second constant $C_{free}$; and in another embodiment, it is unnecessary to perform steps 301 to 303, and the first relation data can be created in another manner.

304. Set second relation data corresponding to at least one leg as follows: an acting force $f_i\{P(t)\}$ corresponding to an $i^{th}$ leg is a sum of the first constant C and a linear mapping of a fourth constant A corresponding to the $i^{th}$ leg.

The legged robot is configured with at least one leg, and the second relation data corresponding to the $i^{th}$ leg is used for indicating a relation between the center of mass position P(t) and the acting force $f_i\{P(t)\}$ corresponding to the $i^{th}$ leg.

The acting force $f_i\{P(t)\}$ indicates an acting force to which the $i^{th}$ leg in contact with the ground of the legged robot in the center of mass position $P(t)$ is subjected, and i is a positive integer. The fourth constant $\lambda$ is a constant whose value is not determined, and the fourth constant $\lambda$ is used for representing a relation between the acting force $f_i\{P(t)\}$ and the center of mass position $P(t)$. Because the first constant C is formed by the second constant $C_{free}$ whose value is not determined and the third constant h whose value is determined, the second relation data corresponding to the at least one leg includes the second constant $C_{free}$ whose value is not determined and the fourth constant $\lambda$. in the legged robot, the second relation data can be stored in the form of a descriptive statement or a function.

When the center of mass of the legged robot is in the center of mass position $P(t)$, different legs of the legged robot may be subjected to same or different acting forces, and then the different legs may correspond to same or different fourth constants $\lambda$. When different legs of the legged robot are subjected to different acting forces, and the different legs correspond to same fourth constants $\lambda$, mapping matrices of the fourth constants $\lambda$ corresponding to the different legs are different. Moreover, when the center of mass of the legged robot is in different center of mass positions $P(t)$, different legs may correspond to different fourth constants $\lambda$. For example, the legged robot includes 4 legs. When the 4 legs of the legged robot are all in contact with the ground, a fourth constant $\lambda$ corresponding to any leg includes a 6-dimension variable. When 3 legs of the legged robot are all in contact with the ground, a fourth constant $\lambda$ corresponding to any leg in contact with the ground includes a 3-dimension variable.

Because the second relation data corresponding to the at least one leg separately indicates the relation between the center of mass position $P(t)$ and the acting force $f_i\{P(t)\}$ corresponding to the at least one leg, and the first relation data is set as follows: the center of mass position $P(t)$ is a product of the first constant C and a duration matrix E, the first relation data is substituted into the second relation data corresponding to the at least one leg, to obtain the acting force $f_i\{P(t)\}$ corresponding to the at least one leg as a sum of the first constant C and a linear mapping of a fourth constant $\lambda$ corresponding to the $i^{th}$ leg.

By obtaining a mapping matrix of the first constant C and a mapping matrix of the fourth constant $\lambda$ corresponding to the $i^{th}$ leg, a first product of the first constant C and the corresponding mapping matrix, and a second product of the fourth constant $\lambda$ corresponding to the $i^{th}$ leg and the corresponding mapping matrix are determined, and a sum of the obtained first product and second product is used as the acting force $f_i\{P(t)\}$ corresponding to the $i^{th}$ leg.

The legged robot is in contact with the ground through the configured at least one leg, to support the legged robot in standing or moving, and through cooperation between the at least one leg, the center of mass of the legged robot is kept in the corresponding center of mass position $P(t)$. Therefore, it can be determined that the acting force corresponding to the at least one leg of the legged robot and the center of mass position $P(t)$ are associated with each other, thereby creating the second relation data corresponding to the at least one leg. By creating the second relation data corresponding to the at least one leg, the subsequently determined center of mass position $P(t)$ of the legged robot conforms to a force subjecting situation of the legged robot, to ensure feasibility of the subsequently obtained center of mass position $P(t)$.

In this embodiments of this application, the acting force $f_i\{P(t)\}$ corresponding to the $i^{th}$ leg determined through the first constant C and the fourth constant $\lambda$ corresponding to the $i^{th}$ leg is used for representing the created second relation data; and in another embodiment, it is unnecessary to perform step 304, and the second relation data corresponding to the at least one leg configured for the legged robot can be created in another manner.

305. Obtain a movement duration required for the legged robot to move from an initiation position to a termination position.

The movement duration is arbitrarily set by the legged robot, and is, for example, 15 seconds or 30 seconds.

In a possible implementation, step 305 includes: determining a distance between a center of mass position corresponding to the initiation position and a center of mass position corresponding to the termination position as a movement distance of the legged robot moving from the initiation position to the termination position, obtaining a movement speed of the legged robot, and determining a ratio of the movement distance to the movement speed as the movement duration. The movement speed of the legged robot is arbitrarily set by the legged robot. For example, the legged robot moves 0.2 or 0.5 meters per second.

306. Select a plurality of sampling time points within the movement duration.

A sampling time point refers to a time point between a start time point corresponding to the initiation position and an end time point corresponding to the termination position. The plurality of sampling time points include two or more sampling time points. There is an interval duration between each two neighboring sampling time points. In some embodiments, any two neighboring interval durations are equal or not equal.

For example, the movement duration is 60 seconds, the start time point corresponding to the initiation position is the $0^{th}$ second, the end time point corresponding to the termination position is the $60^{th}$ second, and 5 sampling time points are selected within the movement duration. The first sampling time point is the $10^{th}$ second, the second sampling time point is the $20^{th}$ second, the third sampling time point is the $30^{th}$ second, the fourth sampling time point is the $40^{th}$ second, and the fifth sampling time point is the $50^{th}$ second; or the first sampling time point is the $5^{th}$ second, the second sampling time point is the $20^{th}$ second, the third sampling time point is the $25^{th}$ second, the fourth sampling time point is the $40^{th}$ second, and the fifth sampling time point is the $55^{th}$ second.

In a possible implementation, step 306 includes: the movement duration is divided into a plurality of time periods, and an end time point of each time period is used as a sampling time point. The plurality of time periods can have equal or unequal durations.

307. Determine, based on an interval duration between each sampling time point and a start time point and the first relation data, fourth relation data corresponding to the each sampling time point.

The fourth relation data indicates a relation between the first constant C and a sampling center of mass position Q(C). Because the first constant C is formed by the second constant $C_{free}$ whose value is not determined and the third constant h whose value is determined, the fourth relation data indicates a relation between the second constant $C_{free}$ and a sampling center of mass position $Q(C_{free})$ and the sampling center of mass position $Q(C_{free})$ indicates a center of mass position of the legged robot at the corresponding sampling time point. in the legged robot, the fourth relation data can be stored in the form of a descriptive statement or a function.

The first relation data indicates that the center of mass position P(t) is a product of the first constant C and the duration matrix E, and the first constant C includes the second constant $C_{free}$ whose value is not determined. Therefore, by substituting an interval duration between any sampling time point and the start time point into the duration matrix E in the first relation data, the value of the duration matrix E at the any sampling time point is determined, to obtain the fourth relation data corresponding to the sampling time point, where the fourth relation data indicates a relation between the second constant $C_{free}$ and the sampling center of mass position $Q(C_{free})$. The value of the second constant $C_{free}$ included in the fourth relation data is not determined, but values of other constants included in the fourth relation data have all been determined.

308. Determine, based on the second relation data corresponding to the at least one leg and the fourth relation data, fifth relation data corresponding to each sampling time point.

The fifth relation data indicates a relation between the first constant C and the acting force $f_i$ corresponding to the at least one leg. Because the first constant C is formed by the second constant $C_{free}$ whose value is not determined and the third constant h whose value is determined, the fifth relation data indicates a relation between the second constant $C_{free}$ and the acting force $f_i\{P(t)\}$ corresponding to the at least one leg. The fourth relation data indicates the relation between the second constant $C_{free}$ and the sampling center of mass position $Q(C_{free})$, and the second relation data corresponding to the at least one leg indicates the relation between the center of mass position P(t) and the acting force $f_i\{P(t)\}$ corresponding to the at least one leg. Therefore, by substituting the fourth relation data corresponding to each sampling time point into the second relation data, the fifth relation data corresponding to the each sampling time point can be obtained. Because the value of the second constant $C_{free}$ included in the fourth relation data is not determined, and the values of the second constant $C_{free}$ and the fourth constant λ included in the second relation data are not determined, the values of the second constant $C_{free}$ and the fourth constant λ in the obtained fifth relation data are not determined. in the legged robot, the fifth relation data can be stored in the form of a descriptive statement or a function.

In a possible implementation, step 308 includes: determining, based on a stepping sequence of the legged robot, a stepping duration corresponding to the at least one leg, and the interval duration between the each sampling time point and the start time point, a leg of the legged robot in contact with the ground at the each sampling time point; and determining the fifth relation data based on each sampling center of mass position $Q(C_{free})$, the second relation data corresponding to the at least one leg, and the leg in contact with the ground at the each sampling time point.

The stepping sequence indicates a stepping sequence of a plurality of legs of the legged robot, and a stepping duration corresponding to the leg is a duration from raising to lowering of the leg. In some embodiments, different legs correspond to same or different stepping durations.

Through the stepping sequence of the legged robot, the stepping duration corresponding to the at least one leg, and the interval duration between each of the sampling time points and the start time point, a stepping leg corresponding to each sampling time point can be determined, thereby determining the leg of the legged robot in contact with the ground at the each sampling time point. By substituting each sampling center of mass position $Q(C_{free})$ into the second relation data, the acting force $f_i\{P(t)\}$ corresponding to the at least one leg in contact with the ground of the legged robot at the each sampling time point can be obtained, thereby obtaining the fifth relation data.

For example, the legged robot includes four legs divided in to a left front leg, a left rear leg, a right front leg, and a right rear leg, the stepping sequence is supporting the movement center of mass by the four legs, stepping with the right rear leg, stepping with the right front leg, supporting the movement center of mass by the four legs, supporting the movement center of mass by the four legs, stepping with the left rear leg, stepping with the left front leg, and supporting the movement center of mass by the four legs, and each stepping duration is 1 second. Therefore, when a sampling time point is the $1.5^{th}$ second, it can be determined that the legged robot is in a process of stepping with the right rear leg, and therefore legs currently in contact with the ground are the left front leg, the left rear leg, and the right front leg; and when a sampling time point is the $3.5^{th}$ second, it can be determined that the legged robot is in a process of supporting the movement center of mass by the four legs, and therefore legs currently in contact with the ground are the left front leg, the left rear leg, the right front leg, and the right rear leg.

309. Create third relation data based on the fourth relation data and the fifth relation data.

The third relation data indicates a positive correlation between the target value J and a square of an acting force $f_i\{P(t)\}$ to which the at least one leg in contact with the ground is subjected, and further indicates a positive correlation between the target value J and a square of the acting force $f_i\{P(t)\}$ corresponding to the at least one leg corresponding to the each sampling time point and the sampling center of mass position $Q(C_{free})$. Because each of the fourth relation data and the fifth relation data includes the first constant C whose value is not determined, the created third relation data also includes the first constant C whose value is not determined. Moreover, because the first constant C is formed by the second constant $C_{free}$ whose value is not determined and the third constant h whose value is determined, the third relation data includes the second constant $C_{free}$ whose value is not determined. in the legged robot, the third relation data can be stored in the form of a descriptive statement or a function.

In a possible implementation, step 309 includes: setting the target value J to a sum value of a weighted sum of squares of a plurality of distances and a weighted sum of squares of the acting force $f_i\{P(t)\}$ corresponding to the at least one leg. The plurality of distances include a distance between any two neighboring center of mass positions of a center of mass position in the initiation position, a plurality of sampling center of mass positions, and a center of mass position in the termination position.

A weight of each distance and a weight of each acting force $f_i\{P(t)\}$ are both arbitrarily set by the legged robot, and the weight of the acting force $f_i\{P(t)\}$ is a weight corresponding to a leg corresponding to the acting force $f_i\{P(t)\}$. A squared value of a product of each distance and a corresponding weight is determined, and a sum of squared values corresponding to a plurality of distances is used as a weighted sum of squares of the plurality of distances. A squared value of a product of an acting force $f_i\{P(t)\}$ corresponding to each leg and a corresponding weight is determined, and a sum of squared values corresponding to a plurality of acting forces is used as a weighted sum of squares of an acting force $f_i\{P(t)\}$ corresponding to at least one leg.

In a possible implementation, the target value J meets the following relation:

$$J = J_{grf} + J_{len}$$

where $J_{grf}$ is used for representing a weighted sum of squares of the acting force $f_i \{P(t)\}$ corresponding to the at least one leg, and $J_{len}$ is used for representing a weighted sum of squares of the plurality of distances.

In this embodiment of this application, the third relation data is created based on a plurality of sampling time points; and in another embodiment, it is unnecessary to perform steps 305 to 309, and instead the following steps are performed:

determining a distance between the center of mass position of the legged robot in the initiation position and the center of mass position of the legged robot in the termination position, and setting the target value J to a sum value of a weighted squared value of the distance and a weighted sum of squares of the acting force $f_i\{P(t)\}$ corresponding to the at least one leg.

A squared value of a product of the distance and a corresponding weight is determined, and a sum of squared values corresponding to a plurality of distances is used as a weighted squared value of the distance. A squared value of a product of an acting force $f_i\{P(t)\}$ corresponding to each leg and a corresponding weight is determined, and a sum of squared values corresponding to a plurality of acting forces $f_i\{P(t)\}$ is used as a weighted sum of squares of an acting force $f_i\{P(t)\}$ corresponding to at least one leg.

310. Determine, based on the third relation data, a value of the first constant C when a target value is a minimum value, and obtain the first relation data corresponding to the first constant C whose value is determined.

In this embodiment of this application, the third relation data includes the first constant C whose value is not determined, and the first constant C includes the second constant $C_{free}$ whose value is not determined, that is, the third relation data includes the second constant $C_{free}$ whose value is not determined.

Because the target value J and a square of the second constant $C_{free}$ are in a positive correlation, the target value J has a minimum value. The target value J is used for optimizing distribution of the acting force to which the at least one leg of the legged robot is subjected, can reflect the length of the center of mass trajectory, and can reflect the oscillation amplitude of the center of mass position of the legged robot. Through the minimum value of the target value J, the distribution of the acting force to which the at least one leg of the legged robot is subjected is balanced, and the oscillation amplitude of the center of mass position of the legged robot is small, thereby ensuring stability of the legged robot in the movement process. Therefore, the minimum value of the target value J is selected, and the value of the corresponding second constant $C_{free}$ can be determined through the minimum value.

Through the second constant $C_{free}$ whose value is determined and the third constant h whose value is determined, the value of the first constant C can be obtained. After the first constant C whose value is determined is substituted into the first relation data, the obtained first relation data is: the center of mass position P(t) is a product of the first constant C whose value is determined and the duration matrix E, so that the corresponding center of mass position P(t) can be determined through any interval duration between any time point and the start time point corresponding to the initiation position.

Additionally, constants in the third relation data whose values are not determined include the fourth constant λ, and then the value of the fourth constant λ when the target value J is the minimum value can be further determined based on the third relation data.

Additionally, through the first relation data corresponding to the first constant C whose value is determined, a coordinate system is created by using the interval duration as a transverse coordinate and using the center of mass position as a longitudinal coordinate, a center of mass position point corresponding to any interval duration is created in the coordinate system based on the relation between the center of mass position P(t) and the interval duration t in the first relation data corresponding to the first constant C whose value is determined, and a curve formed by connecting a plurality of center of mass position points is determined as the center of mass trajectory of the legged robot.

311. Determine, based on the first relation data, a center of mass position $P(t_0)$ of the legged robot within any interval duration $t_0$ in a movement process of the legged robot.

The interval duration $t_0$ is a duration of an interval between any time point in a process that the legged robot moves from an initiation position to a termination position and a start time point corresponding to the initiation position.

Because values of all constants other than the interval duration t in the first relation data corresponding to the first constant C whose value is determined have been determined, a center of mass position $P(t_0)$ corresponding to any interval duration $t_0$ can be obtained by substituting the any interval duration $t_0$ into the first relation data.

312. Determine, based on the center of mass position $P(t_0)$ and the termination position, joint torques of a plurality of joints of the legged robot.

In this embodiment of this application, by controlling each joint in each leg, the legged robot raises or lowers each leg of the legged robot, thereby driving the legged robot to move. By controlling joint torques of a plurality of joints, the legged robot causes at least one leg of the legged robot to support the legged robot in moving, so that the center of mass position of the legged robot is kept in the determined center of mass position $P(t_0)$. That is, through the center of mass position $P(t_0)$ of the legged robot within any interval duration $t_0$, the termination position, and inverse kinematics, the joint torques of the plurality of joints of the legged robot in the process that the legged robot moves from the initiation position to the termination position are determined.

In a possible implementation, step 312 includes: determining, based on the center of mass position $P(t_0)$ and the termination position, joint angles and joint torques of a plurality of joints of the legged robot. The joint angles are used for representing angles presented after the joints of the legged robot are rotated. Through the determined center of mass position $P(t_0)$ and inverse kinematics, the joint angles of the plurality of joints of the legged robot are determined. Then, through inverse dynamics and an optimization control method, the joint torques of the plurality of joints of the robot are determined.

In some embodiments, based on a position of a contact point in contact with the ground of at least one leg of the legged robot, and a stepping time sequence of the legged robot, relation data between the position of the contact point in contact with the ground of the at least one leg and the interval duration, and relation data between a gesture of the legged robot and the interval duration are created; based on the relation data between the position of the contact point in contact with the ground of the at least one leg and the interval duration, the relation data between the gesture of the legged robot and the interval duration, and the first relation data corresponding to the first constant C whose value is determined, relation data between joint angles of a plurality of joints of the legged robot and the interval duration is determined; a first-order derivative of the relation data between the joint angles of the plurality of joints and the interval duration with respect to the interval duration is determined as relation data between joint angular speeds of the plurality of joints and the interval duration; a second-order derivative of the relation data between the joint angles of the plurality of joints and the interval duration with respect to the interval duration is determined as relation data between joint angular accelerations of the plurality of joints of the legged robot and the interval duration; based on the relation data between the joint angular speeds and the interval duration, the relation data between the joint angular speeds and the interval duration, and the relation data between the joint angular accelerations and the interval duration, joint angles, joint angular speeds, and joint angular accelerations of the plurality of joints of the legged robot within any interval duration $t_0$ are determined; and joint angles, joint angular speeds, and joint angular accelerations of the plurality of joints at a current time point are obtained, and based on the joint angles, the joint angular speeds, and the joint angular accelerations of the plurality of joints at the current time point, and the joint angles, the joint angular speeds, and the joint angular accelerations of the plurality of joints corresponding to the interval duration $t_0$, the joint torques of the plurality of joints of the legged robot are determined.

In some embodiments, through a sensor configured for the legged robot, joint angles, joint speeds, and joint angular speeds of the plurality of joints of the legged robot at the current time point are captured.

313. Control, according to the joint torques of the plurality of joints, the plurality of joints to rotate, to drive the legged robot to move.

Through the determined joint torques of the plurality of joints, the plurality of joints of the legged robot are controlled to rotate, so that the center of mass position of the legged robot coincides with the determined center of mass position, to implement movement of the legged robot; and in the process that the legged robot moves from the initiation position to the termination position, the center of mass position of the legged robot at any time point always coincides with the center of mass position determined at the time point, thereby enabling the legged robot to move along the determined center of mass trajectory.

In a possible implementation, step 313 includes: controlling, according to the joint angles and the joint torques of the plurality of joints, the plurality of joints to rotate, to drive the legged robot to move.

By controlling, according to the joint angles and the joint torques, the plurality of joints to rotate, the plurality of joints are kept at the corresponding joint angles, thereby raising or lowering the leg of the legged robot, driving movement of the legged robot, and ensuring that the center of mass of the legged robot moves along the determined center of mass trajectory in the movement process.

In this embodiments of this application, a movement process that the legged robot moves from the initiation position to the termination position is describes; and in another embodiment, after reaching the termination position, the legged robot can further continue to perform the latter movement process, to perform the foregoing steps 301 to 313 by using the termination position of the former movement process as the initiation position of the latter movement process, so that the legged robot moves to the termination position of the latter process, thereby implementing a plurality of consecutive movement processes of the legged robot.

In a possible implementation, the termination position of the last movement process is used as a target position of the legged robot, and after it is determined that the legged robot moves to the termination position of the current movement process, it is detected whether the termination position coincides with the target position. In response to that the termination position does not coincide with the target position, the first state data is set for the termination position. In response to that the termination position coincides with the target position, the second state data is set for the termination position.

The center of mass speed and the center of mass acceleration included in the first state data are not 0, but the center of mass speed and the center of mass acceleration included in the second state data are 0. After the legged robot moves to the target position, the legged robot stops moving. In some embodiments, the target position is any position determined by the legged robot. For example, the legged robot needs to move to a room A, and a doorway position of the room A is used as the target position. In response to that the termination position does not coincide with the target position, it indicates that after reaching the termination position of the current movement process, the legged robot needs to continue to move, to perform a next movement process, and in order to ensure movement continuity of the legged robot, the center of mass speed and the center of mass acceleration of the legged robot are not 0. In response to that the termination position coincides with the target position, it indicates that after reaching the termination position of the current movement process, the legged robot stops moving, and in order to ensure stability of the legged robot, the center of mass speed and the center of mass acceleration of the legged robot are 0, to enable the legged robot to stop in the target position.

In this embodiment of this application, description is made by using the legged robot as an execution body; and in another embodiment, the foregoing steps 301 to 313 are performed by a server, the server determines, based on the center of mass position $P(t_0)$ and the termination position, the joint torques of the plurality of joints of the legged robot, and sends a movement instruction to the legged robot, where the movement instruction carries the joint torques of the plurality of joints, and the legged robot controls, according to the joint torques of the plurality of joints, the plurality of joints to rotate, to drive the legged robot to move.

In a possible implementation, the server establishes communicative connection to the plurality of joints of the legged robot, the server sends a rotating instruction to the plurality of joints of the legged robot according to the determined joint torques of the plurality of joints, where the rotating instruction carries the joint torques of the corresponding joints, and after receiving the rotating instruction, the plurality of joints of the legged robot rotate according to the corresponding joint torques, to drive the legged robot to move.

In these embodiments of this application, description is made by using the legged robot as an execution body; and in another embodiment, the foregoing steps 301 to 310 are performed by the server. After obtaining the first relation data corresponding to the first constant C whose value is determined, the server sends the first relation data corresponding to the first constant C whose value is determined to the legged robot, and the legged robot performs steps 311 to 313, thereby controlling the legged robot to move.

Based on the method provided in this embodiment of this application, it is unnecessary to detect a state of each joint of the legged robot, and through the first relation data, the second relation data corresponding to the at least one leg, and the third relation data that are created, the first relation data corresponding to the first constant $C_{free}$ may be determined, thereby reducing the calculation amount in the process of determining the first relation data corresponding to the first constant $C_{free}$ which is applicable to a legged robot with any quantity of legs, and has a wide application range. Moreover, through the first relation data corresponding to the first constant $C_{free}$, a center of mass position corresponding to any interval duration in the process that the legged robot moves from the initiation position to the termination position can be determined, so that a center of mass trajectory of the legged robot moving from the initiation position to the termination position is determined, to enable the legged robot to move according to the determined center of mass trajectory, thereby ensuring movement efficiency of the legged robot.

Moreover, by creating the second relation data corresponding to the at least one leg, the acting force to which the at least one leg in contact with the ground configured for the legged robot is subjected is considered, thereby improving accuracy of the determined center of mass position of the legged robot, enabling the legged robot to move according to the determined center of mass trajectory, ensuring feasibility and efficiency of the determined center of mass trajectory, and ensuring diversity and universality of determining the center of mass trajectory.

Figure 4:
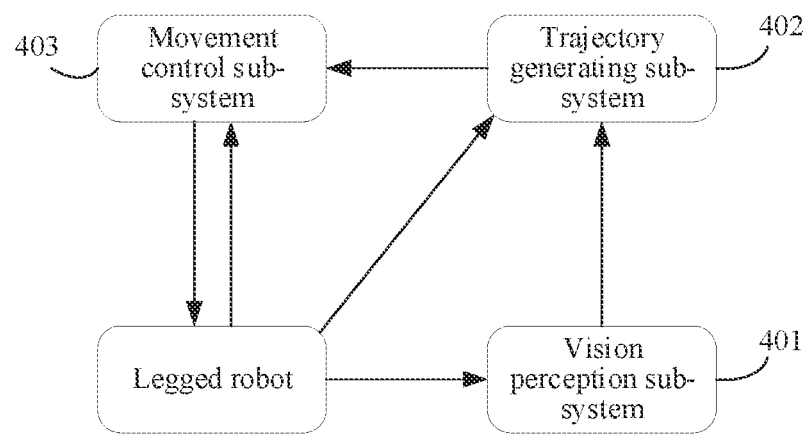
FIG. 4 is an architectural diagram of controlling, by a legged robot system, a legged robot to move according to an embodiment of this application.

FIG. 4 is an architectural diagram of controlling, by a legged robot system, a legged robot to move according to an embodiment of this application. The legged robot system includes a vision perception sub-system 401, a trajectory generating sub-system 402, and a movement control sub-system 403.

The vision perception sub-system 401 obtains, based on state data of the legged robot, a termination position and a stepping sequence of the legged robot, and sends the obtained termination position and stepping sequence of the legged robot to the trajectory generating sub-system 402.

The trajectory generating sub-system 402 receives the termination position and the stepping sequence of the legged robot sent by the vision perception sub-system 401, determines a center of mass trajectory of the legged robot through the obtained state data of the legged robot, determines a joint torque of each joint of the legged robot based on the determined center of mass trajectory of the legged robot, and sends the determined joint torque of the each joint of the legged robot to the movement control sub-system 403.

The movement control sub-system 403 receives the determined joint torque of the each joint of the legged robot sent by the trajectory generating sub-system 402, controls, according to the determined joint torque of the each joint of the legged robot, the each joint to rotate, to drive the legged robot to move, and monitors the state data of the legged robot in real time in the process of controlling the legged robot to move, thereby ensuring that the legged robot can stably move.

The foregoing embodiment involves the first relation data, the second relation data, and the third relation data, and based on the foregoing embodiment, the process of creating the foregoing three types of relation data is described in detail in the following embodiment:

First. Process of creating first relation data:

1. Obtain a stepping sequence of a legged robot, and divide a process that the legged robot moves from an initiation position to a termination position into a plurality of consecutive movement sub-processes according to the stepping sequence of the legged robot.

The stepping sequence indicates a stepping sequence of a plurality of legs of the legged robot, and performing a stepping action by any leg is referred to as a movement sub-process.

Additionally, in the plurality of movement sub-processes, to ensure that the plurality of movement sub-processes are consecutive, for two neighboring movement sub-processes, an end position of the former movement sub-process is the same as an initiation position of the latter movement sub-process.

2. Create first relation data for each movement sub-process.

Because in the plurality of movement sub-processes, different movement sub-processes have different effects on the center of mass position of the legged robot, the movement sub-processes also correspond to different first constants C. Therefore, first relation data is created for each movement sub-process.

In the $k^{th}$ movement sub-process of the plurality of movement sub-processes, the first relation data is set to: the center of mass position P(t) of the legged robot is a product of a duration matrix E and a first constant $C_k$, and the first constant $C_k$ meets the following relation:

$$C_k = \begin{bmatrix} C_{xk} \\ C_{yk} \\ C_{zk} \end{bmatrix}$$

where k is a positive integer not less than 1, $C_{xk}$ represents a component of the first constant $C_k$ corresponding to the $k^{th}$ movement sub-process on the x axis, $C_{yk}$ represents a component of the first constant $C_k$ corresponding to the $k^{th}$ movement sub-process on the y axis, and $C_{zk}$ represents a component of the first constant $C_k$ corresponding to the $k^{th}$ movement sub-process on the z axis.

The first relation data corresponding to the $k^{th}$ movement sub-process can be represented with the following function:

$$P(t) = P^{init} + \begin{bmatrix} E_t & 0_{1\times 4} & 0_{1\times 4} \\ 0_{1\times 4} & E_t & 0_{1\times 4} \\ 0_{1\times 4} & 0_{1\times 4} & E_t \end{bmatrix} \begin{bmatrix} C_{xk} \\ C_{yk} \\ C_{zk} \end{bmatrix}$$

$$E_t = [1 \quad t \quad t^2 \quad t^3]$$

$$T_{k-1} \leq t \leq T_k$$

where $P^{init}$ is a constant vector used for representing an initiation center of mass position of the legged robot at the beginning of any movement period; $E_t$ represents a duration vector; $C_{xk}$ represents a component of the first constant $C_k$ corresponding to the $k^{th}$ movement sub-process on the x axis, $C_{yk}$ represents a component of the first constant $C_k$ corresponding to the $k^{th}$ movement sub-process on the y axis, and $C_{zk}$ represents a component of the first constant $C_k$ corresponding to the $k^{th}$ movement sub-process on the z axis; $C_{*k}=[C_{*k,\,0}\ C_{*k,\,1}$ $C_{*k, 2}$ $C_{*k, 3}]^T$, in some embodiments, * represents the x axis, the y axis, or the z axis, $C_{*k} \in \mathbb{R}^{4 \times 1}$ indicates that the constant $C_{*k}$ is a column vector including 4 dimensions, and $\mathbb{R}$ represents a real number set in a multidimensional space; and a movement duration of each movement sub-process is $t_n$, and n represents the quantity of the plurality of movement sub-processes, so that a sum of movement durations of first k−1 movement sub-processes is $T_{k-1} = \Sigma_{n=1}^{k-1} t_n$ and a sum of movement durations of first k movement sub-processes is $T_k = \Sigma_{n=1}^{k} t_n$.

3. Create, based on the first relation data the plurality of movement sub-processes, first relation data corresponding to movement of the legged robot from the initiation position to the termination position.

Because the movement process that the legged robot moves from the initiation position to the termination position is formed by the plurality of movement sub-processes of the legged robot, a first constant C in the first relation data corresponding to movement of the legged robot from the initiation position to the termination position is formed by first constants $C_k$ corresponding to the plurality of movement sub-processes, that is, the first constant C in the first relation data corresponding to movement of the legged robot from the initiation position to the termination position includes components of a first constant $C_k$ corresponding to each movement sub-process on the x, y, and z axes.

In a possible implementation, the first relation data corresponding to movement of the legged robot from the initiation position to the termination position can be represented with the following function:

$$P(t) = P^{init} + \begin{bmatrix} E_t & 0_{1 \times 4} & 0_{1 \times 4} \\ 0_{1 \times 4} & E_t & 0_{1 \times 4} \\ 0_{1 \times 4} & 0_{1 \times 4} & E_t \end{bmatrix} C$$

$$C = [C_1 \quad C_2 \quad \ldots \quad C_k \quad \ldots \quad C_n]^T$$

where $P^{init}$ is a constant vector used for representing an initiation center of mass position of the legged robot at the beginning of any movement period; $E_t$ represents a duration vector; C represents the first constant in the first relation data corresponding to movement of the legged robot from the initiation position to the termination position; $C_1$ represents the first constant corresponding to the first movement sub-process, $C_2$ represents the first constant corresponding to the second movement sub-process, $C_k$ represents the first constant corresponding to the $k^{th}$ movement sub-process, $C_n$ represents the first constant corresponding to the $n^{th}$ movement sub-process, and T represents transposition on a matrix.

Figure 5:
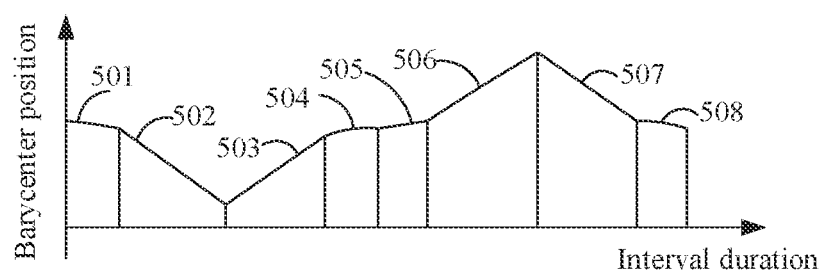
FIG. 5 is a schematic diagram of a movement process of a legged robot according to an embodiment of this application.

Additionally, the number of dimensions included in the first constant C and the number of dimensions included in the second constant $C_{free}$ can be determined based on a variable in the first relation data. As shown in FIG. 5, movement of the legged robot from the initiation position to the termination position includes eight movement sub-processes, which are sequentially a movement sub-process 501, a movement sub-process 502, a movement sub-process 503, a movement sub-process 504, a movement sub-process 505, a movement sub-process 506, a movement sub-process 507, and a movement sub-process 508 according to a time sequence. The quantity of components of the first constant C that are included on the x, y, and z axes is 3, and the duration vector $E_t$ in the first relation data includes a 4-dimensional interval duration, so that the quantity 3×8×4=96 of dimensions included in the first constant C can be determined. In any two neighboring movement sub-processes, the termination position of the former movement sub-process is the same as the initiation position of the latter movement sub-process. Therefore, to ensure continuity of the eight movement sub-processes, the quantity of dimensions in the first constant C that is used for representing the continuity of the eight movement sub-processes is 3×7×3=63. The first 3 represents the quantity of components on the x, y, and z axes, 7 represents that there are seven same positions in the eight movement sub-processes, and the second 3 represents that state data corresponding to each position includes such a total of 3 variables as a center of mass position, a center of mass speed, and a center of mass acceleration. For the legged robot in the eight movement sub-processes, state data in the initiation position of the first movement sub-process is determined, and state data in the termination position of the last movement sub-process is determined. Therefore, the quantity of dimensions in the first constant C used for representing the state data in the determined positions of the eight movement sub-processes is 3×6=18. 3 represents the quantity of components on the x, y, and z axes, and 6 represents the quantity of values included in the state data in the determined two positions. Therefore, the quantity of dimensions included in the second constant $C_{free}$ is 96−63−18=15.

In this embodiment of this application, only creating the first relation data is described. Additionally, based on the first relation data of the $k^{th}$ movement sub-process, relation data between the center of mass acceleration $\ddot{P}(t)$ corresponding to the center of mass position P(t) of the $k^{th}$ movement sub-process and the interval duration t can be further created.

In a possible implementation, second-order derivation is performed on the first relation data of the $k^{th}$ movement sub-process with respect to the interval duration t, to obtain relation data between the center of mass acceleration $\ddot{P}(t)$ of the $k^{th}$ movement sub-process and the interval duration t, and the relation data between the center of mass acceleration $\ddot{P}(t)$ and the interval duration t can be represented with the following function:

$$\ddot{P}(t) = \begin{bmatrix} E_a & 0 & 0 \\ 0 & E_a & 0 \\ 0 & 0 & E_a \end{bmatrix} \begin{bmatrix} C_{xk} \\ C_{yk} \\ C_{zk} \end{bmatrix}, E_a = [0 \quad 0 \quad 2 \quad 6t]$$

where $E_a$ represents a time matrix, which is obtained by performing the second-order derivation on the duration vector $E_t$ with respect to the interval duration t, and $E_a \in \mathbb{R}^{1 \times 4}$ represents that the time matrix $E_a$ is a 4-dimensional row vector; k is a positive integer not less than 1, $C_{xk}$ represents a component of the first constant $C_k$ corresponding to the $k^{th}$ movement sub-process on the x axis, $C_{yk}$ represents a component of the first constant $C_k$ corresponding to the $k^{th}$ movement sub-process on the y axis, and $C_{zk}$ represents a component of the first constant $C_k$ corresponding to the $k^{th}$ movement sub-process on the z axis.

Second. Process of creating second relation data:
1. Create relation data between an acting force to which at least one leg of the legged robot is subjected and the gravity of the legged robot.

In the legged robot, the relation data is stored in the form of a descriptive statement or a function.

In a possible implementation, relation data between an acting force to which at least one leg of the legged robot is subjected and the gravity of the legged robot can be represented with the following function:

$$\begin{bmatrix} m(\ddot{P}(t) - g) \\ \dot{L} \end{bmatrix} = \sum_{i=1}^{Y} \begin{bmatrix} Z'_{3\times 3} \\ \hat{r}_i - \hat{P}(t) \end{bmatrix} f_i \{P(t)\},$$

where m represents the mass of the legged robot; $\ddot{P}(t)$ represents that a second-order derivative of a center of mass position P(t) of the legged robot with respect to the interval duration t is used as a center of mass acceleration corresponding to the center of mass position P(t) of the legged robot; g represents a gravity acceleration, the gravity acceleration $g \in \mathbb{R}^{3\times 1}$ represents that the gravity acceleration g is a 3-dimensional column vector, and $\mathbb{R}$ represents a real number set in a multi-dimensional space; L represents an angular momentum of the legged robot, the angular momentum $L \in \mathbb{R}^{3\times 1}$ represents that the angular momentum L is a 3-dimensional column vector, $\dot{L}$ represents a first-order derivative of the angular momentum L with respect to the interval duration t, and represents a change amount of the angular momentum L; Y represents the quantity of legs in contact with the ground of the legged robot; $Z'_{3\times 3}$ represents an identity matrix of 3 rows and 3 columns; $r_i$ represents a position of a contact point in contact with the ground of the $i^{th}$ leg of the legged robot, and i is a positive integer not less than 1 and not greater than Y; $\hat{r}_i$ represents a skew symmetric matrix of contact points $r_i$; $\hat{P}(t)$ represents a skew symmetric matrix of center of mass positions P(t); and $f_i\{P(t)\}$ is an acting force to which the $i^{th}$ leg in contact with the ground of the legged robot is subjected.

In the foregoing relations, the dynamical equation used for representing the center of mass of the legged robot represents a relation between movement of the legged robot and an external force to which the legged robot is subjected, and the external force to which the legged robot is subjected conforms to Newton's laws and Euler's equations. The gravity of the legged robot is equal to a sum of all external forces to which the legged robot is subjected, and a first-order derivative of an angular momentum of the legged robot with respect to a duration is equal to a torque to which the legged robot is subjected.

According to the foregoing relation data between an acting force to which at least one leg of the legged robot is subjected and the gravity of the legged robot, it can be learned that a sum of acting forces to which the legged robot is subjected is equal to the gravity of the legged robot, that is, a relation $$m(\ddot{P}(t) - g) = \sum_{i=1}^{Y} f_i \{P(t)\}$$

can be obtained; the relation is substituted into the relation data between an acting force to which at least one leg of the legged robot is subjected and the gravity of the legged robot, and the relation data between an acting force to which at least one leg of the legged robot is subjected and the gravity of the legged robot is simplified, to obtain the following relation:

$$\begin{bmatrix} m(\ddot{P}(t) - g) \\ m\hat{P}(t)(\ddot{P}(t) - g) + \dot{L} \end{bmatrix} = G f_0 \{P(t)\}$$

$$G = \begin{bmatrix} Z'_{3\times 3} & Z'_{3\times 3} & \cdots & Z'_{3\times 3} \\ \hat{r}_1 & \hat{r}_2 & \cdots & \hat{r}_Y \end{bmatrix} \in \mathbb{R}^{6\times 3Y}$$

where m represents the mass of the legged robot; $\ddot{P}(t)$ represents that a second-order derivative of a center of mass position P(t) of the legged robot with respect to the interval duration t is used as a center of mass acceleration corresponding to the center of mass position P(t) of the legged robot; g represents a gravity acceleration, the gravity acceleration $g \in \mathbb{R}^{3\times 1}$ represents that the gravity acceleration g is a 3-dimensional column vector, and $\mathbb{R}$ represents a real number set in a multi-dimensional space; L represents an angular momentum of the legged robot, the angular momentum $L \in \mathbb{R}^{3\times 1}$ represents that the angular momentum L is a 3-dimensional column vector, and $\dot{L}$ represents a first-order derivative of the angular momentum L with respect to the interval duration t; $\hat{P}(t)$ represents a skew symmetric matrix of center of mass positions P; and $f_0\{P(t)\}$ is used for representing a sum of acting forces to which at least one leg in contact with the ground of the legged robot is subjected; G is a constant matrix, the constant matrix $G \in \mathbb{R}^{6\times 3Y}$ represents that the constant matrix G is a matrix of 6 rows and 3Y columns, and $\mathbb{R}$ represents a real number set in a multi-dimensional space; $Z'_{3\times 3}$ represents an identity matrix of 3 rows and 3 columns; $r_i$ represents a position of a contact point in contact with the ground of the $i^{th}$ leg of the legged robot, and i is a positive integer not less than 1 and not greater than Y; Y represents the quantity of legs in contact with the ground of the legged robot; $\hat{r}_i$ represents a skew symmetric matrix of contact points $r_i$.

2. Create, based on the relation data between an acting force to which at least one leg of the legged robot is subjected and the gravity of the legged robot and the center of mass position P(t) of the legged robot, relation data between an acting force to which at least one leg of the legged robot is subjected and the center of mass position P(t) of the legged robot.

The center of mass position P(t) of the legged robot meets the following relation:

$$P(t) = P^{init} + P_t$$

where $P^{init}$ is a constant vector used for representing an initiation center of mass position of the legged robot at the beginning of any movement period; $P_t$ represents a center of mass position change amount of the center of mass position of the legged robot after the interval duration t away from the beginning of the start time point of the programming period. In this embodiment of this application, the initiation center of mass position $P^{init}$ is the same as the center of mass position included in the state data of the legged robot in the initiation position.

By substituting the relation $P(t)=P^{init}+P_t$ met by the center of mass position P(t) into the relation data between an acting force to which at least one leg of the legged robot is subjected and the gravity of the legged robot, relation data between an acting force to which at least one leg of the legged robot is subjected and the center of mass position P(t) of the legged robot is obtained. The relation data between an acting force to which at least one leg of the legged robot is subjected and the center of mass position P(t) of the legged robot can be represented with the following function:

$$Gf_0\{P(t)\} = m\begin{bmatrix} \ddot{P}_t \\ \hat{P}^{init}\ddot{P}_t + \hat{g}P_t \end{bmatrix} - m\begin{bmatrix} g \\ \hat{P}^{init}g \end{bmatrix} + \begin{bmatrix} 0_{3\times 1} \\ m\hat{P}_t\ddot{P}_t + \dot{L} \end{bmatrix}$$

where G is a constant matrix, the constant matrix $G \in \mathbb{R}^{6\times 3Y}$ represents that the constant matrix G is a matrix of 6 rows and 3Y columns, $\mathbb{R}$ and represents a real number set in a multi-dimensional space; $f_0\{P(t)\}$ is used for representing a sum of acting forces to which at least one leg in contact with the ground of the legged robot is subjected; m represents the mass of the legged robot; $P_t$ represents a center of mass position change amount of the center of mass position of the legged robot after the interval duration t away from the beginning of the start time point of the programming period; $\ddot{P}_t$ represents a second-order derivative of the center of mass position change amount $P_t$ with respect to the interval duration t; $P^{init}$ is a constant vector used for representing an initiation center of mass position of the legged robot at the beginning of any movement period, and $\hat{P}^{init}$ is a skew symmetric matrix of the constant vector $P^{init}$; g represents a gravity acceleration, and $g \in \mathbb{R}^{3\times 1}$ represents that the gravity acceleration g is a 3-dimensional column vector; $\hat{g}$ represents a skew symmetric matrix of the gravity acceleration g, and $\hat{P}_t$ represents a skew symmetric matrix of change amounts of center of mass positions; and L represents an angular momentum of the legged robot, the angular momentum $L \in \mathbb{R}^{3\times 1}$ represents that the angular momentum L is a 3-dimensional column vector, and $\dot{L}$ represents a first-order derivative of the angular momentum L with respect to the interval duration t.

Because center of mass position change amounts meet the relation $P_t = P_t^{xy} + P_t^z$, in the foregoing relation data between an acting force to which at least one leg of the legged robot is subjected and the center of mass position P(t) of the legged robot, $\hat{P}_t \ddot{P}_t$ meets the following relation:

$$\hat{P}_t\ddot{P}_t = \hat{P}_t^{xy}\ddot{P}_t^{xy} + \hat{P}_t^{xy}\ddot{P}_t^z + \hat{P}_t^z\ddot{P}_t^{xy} + \hat{P}_t^z\ddot{P}_t^z$$

where $P_t^{xy}$ represents a component of the center of mass position change amount $P_t$ on a plane formed by the x and y axes, and the z coordinate corresponding to $P_t^{xy}$ is 0; $P_t^z$ represents a component of the center of mass position change amount $P_t$ on the z axis; $P_t^z$ corresponds to x and y coordinates of 0; $\hat{P}_t^{xy}$ represents a skew symmetric matrix of a component of the center of mass position change amount $P_t$ on a plane formed by the x and y axes; $\ddot{P}_t^{xy}$ represents a second-order derivative of a component of the center of mass position change amount $P_t$ on a plane formed by the x and y axes with respect to the interval duration t, and also represents a component of the center of mass acceleration on a plane formed by the x and y axes; $\ddot{P}_t^z$ represents a second-order derivative of a component of the center of mass position change amount $P_t$ on the z axis with respect to the interval duration t, and also represents a component of the center of mass acceleration on the z axis; $\hat{P}_t^z$ represents a skew symmetric matrix of a component of the center of mass position change amount $P_t$ on the z axis; $\hat{P}_t^{xy}\ddot{P}_t^{xy}$ represents a torque around the Z axis, and $\hat{P}_t^{xy}\ddot{P}_t^z + \hat{P}_t^z\ddot{P}_t^{xy}$ represents a torque in a direction within the xy plane. Because $\hat{P}_t^z$ and $\ddot{P}_t^z$ are collinear, $\hat{P}_t^z\ddot{P}_t^z$ is 0.

In a movement process of the legged robot, the legged robot has stable movement and a small change amount in the direction of the z axis, so that $\hat{P}_t^z$, $\ddot{P}_t^z$, and $\hat{P}_t^{xy}\ddot{P}_t^z + \hat{P}_t^z\ddot{P}_t^{xy}$ in the foregoing relations can be ignored; and $P_t^{xy}$, $\ddot{P}_t^{xy}$, and $\hat{P}_t^{xy}\ddot{P}_t^{xy}$ all have small absolute values, and therefore can be ignored. Therefore, $\hat{P}_t\ddot{P}_t$ in the foregoing relation data between an acting force to which at least one leg of the legged robot is subjected and the center of mass position P(t) of the legged robot can be ignored.

In a movement process of the legged robot, when a gesture change of the legged robot is small, the change amount $\dot{L}$ of the angular momentum corresponding to the legged robot is small and therefore can be ignored. Therefore, the third term on the right side of the equation in the relation data between the acting force to which at least one leg of the legged robot is subjected and the center of mass position P(t) of the legged robot can be ignored. Then, the relation data between the acting force to which at least one leg of the legged robot is subjected and the center of mass position P(t) of the legged robot is simplified, to obtain the following relation:

$$Gf_0\{P(t)\} \approx HX'_t - W_g,$$

$$H = m\begin{bmatrix} 0_{3\times 3} & Z'_{3\times 3} \\ \hat{g} & \hat{P}^{init} \end{bmatrix}, X'_t = \begin{bmatrix} P_t \\ \ddot{P}_t \end{bmatrix}, W_g = m\begin{bmatrix} g \\ \hat{P}^{init}g \end{bmatrix},$$

where G is a constant matrix, the constant matrix $G \in \mathbb{R}^{6\times 3Y}$ represents that the constant matrix G is a matrix of 6 rows and 3Y columns, and $\mathbb{R}$ represents a real number set in a multi-dimensional space; $f_0\{P(t)\}$ is used for representing a sum of acting forces to which at least one leg in contact with the ground of the legged robot is subjected; H is a constant matrix; $W_g$ is a constant vector; $X'_t$ represents a set of the center of mass position change amount $P_t$ and the change amount of the center of mass acceleration $\ddot{P}_t$; m represents the mass of the legged robot; $Z'_{3\times 3}$ represents an identity matrix of 3 rows and 3 columns; $P^{init}$ is a constant vector used for representing an initiation center of mass position of the legged robot at the beginning of any movement period; $\hat{P}^{init}$ is a skew symmetric matrix of the constant vector $P^{init}$; g represents a gravity acceleration, and $g \in \mathbb{R}^{3\times 1}$ represents that the gravity acceleration g is a 3-dimensional column vector; $\hat{g}$ represents a skew symmetric matrix of the gravity acceleration g.

3. Create second relation data based on relation data between an acting force to which at least one leg of the legged robot is subjected and a center of mass position P(t) of the legged robot.

By processing the relation data between an acting force to which at least one leg of the legged robot is subjected and a center of mass position P(t) of the legged robot, the following relation can be obtained:

$$f_0\{P(t)\} \approx G^+H\begin{bmatrix} P(t) \\ \ddot{P}(t) \end{bmatrix} + U\lambda - G^+W_g,$$

where $f_0\{P(t)\}$ is used for representing a sum of acting forces to which at least one leg in contact with the ground of the legged robot is subjected; $G^+$ is a constant matrix, represented as a pseudo inverse matrix of the constant matrix G, and the constant matrix $G^+$ represents a set of a constant matrix $G_i^+$ corresponding to at least one leg; H is a constant matrix; P(t) represents a center of mass position; $\ddot{P}(t)$ is a second-order derivative of a center of mass position P(t) with respect to the interval duration t, and represents a center of mass acceleration corresponding to the center of mass position P(t); $\lambda$ represents a fourth constant corresponding to at least one leg of the legged robot; $W_g$ is a constant vector; U is a constant matrix, and the constant matrix U represents a mapping matrix set corresponding to the fourth constant $\lambda$ corresponding to the at least one leg.

Through the foregoing relation, the second relation data corresponding to the $i^{th}$ leg of the legged robot can be obtained, and the following relation is met:

$$f_i\{P(t)\} \approx G_i^+ H \begin{bmatrix} P(t) \\ \ddot{P}(t) \end{bmatrix} + U_i\lambda - G_i^+ W_g$$

where $f_i\{P(t)\}$ represents the acting force corresponding to the $i^{th}$ leg; $G_i^+$ is a constant matrix, and the constant matrix $G_i^+$ represents a constant matrix corresponding to the $i^{th}$ leg; H is a constant matrix; P(t) represents a center of mass position; $\ddot{P}(t)$ is a second-order derivative of a center of mass position P(t) with respect to the interval duration t, and represents a center of mass acceleration corresponding to the center of mass position P(t); $\lambda$ represents a fourth constant corresponding to at least one leg of the legged robot; $U_i$ represents a mapping matrix corresponding to the fourth constant $\lambda$ corresponding to the $i^{th}$ leg; $W_g$ is a constant vector.

It can be known according to the foregoing second relation data that, the acting force $f_i\{P(t)\}$ corresponding to the $i^{th}$ leg of the legged robot and the fourth constant $\lambda$ are in a linear relation.

Figure 6:
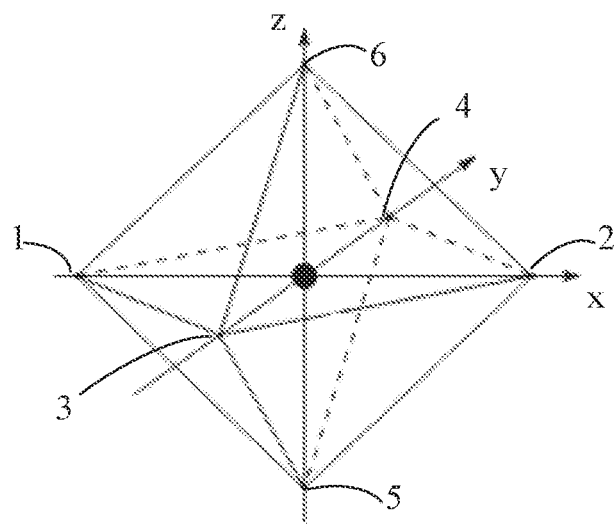
FIG. 6 is a schematic diagram of an offset of a center of mass position of a legged robot according to an embodiment of this application.

In this embodiment of this application, description is made by using the center of mass position P(t) of the legged robot under an ideal condition; and in another embodiment, the center of mass position P(t) of the legged robot has an error, and the center of mass position P(t) of the legged robot in the movement process is affected by a leg of the legged robot, so that the center of mass position P(t) of the legged robot changes within a specific range. To improve accuracy and stability of the obtained center of mass position of the legged robot, a non-deterministic constraint is added to the error of the center of mass position. As shown in FIG. 6, a point is taken in each of positive and negative directions of the x, y, and z axes of a coordinate system, to obtain a point 1, a point 2, a point 3, a point 4, a point 5, and a point 6. The obtained six points are used as vertexes of a polyhedron, to obtain an offset $\delta P'_j$ of the center of mass position of the legged robot.

$$P_{new}^{init} = P^{init} + \delta P'_j$$

$$P_0^{new} = P_0 + \delta P'_j$$

$$P_1^{new} = P_1 + \delta P'_j$$

j is used for representing points obtained on the coordinate axes x, y, and z, which are 1, 2, 3, 4, 5, and 6; $\delta$ represents an offset coefficient, and $\delta$ is a constant; $P'_j$ is represented as an offset of the center of mass position of the legged robot on a coordinate axis, and $P'_j$ corresponds to any one of the six points on the coordinate axes, in some embodiments, coordinates of $P'_j$ are represented as ($\pm\delta x$, 0, 0), (0, $\pm\delta y$, 0), and (0, 0, $\pm\delta z$); $P^{init}$ is a constant vector used for representing an initiation center of mass position of the legged robot at the beginning of any movement period; $P_0$ represents the center of mass position of the legged robot in the initiation position, $P_1$ represents the center of mass position of the legged robot in the termination position, $P_{new}^{init}$ a center of mass position having an offset added at the beginning of a programming period, $P_0^{new}$ represents a center of mass position of the legged robot having an offset correspondingly added in the initiation position, and $P_1^{new}$ represents a center of mass position of the legged robot having an offset correspondingly added in the termination position.

After an offset $\delta P'_j$ is added to the center of mass position of the legged robot, relation data between an acting force to which at least one leg of the legged robot is subjected and the center of mass position P(t) of the legged robot can be represented with the following function:

$$Gf_0\{P(t)\} = m\begin{bmatrix} 0_{3\times3} & Z'_{3\times3} \\ \hat{g} & \hat{P}^{init} \end{bmatrix}\begin{bmatrix} P_t \\ \ddot{P}_t \end{bmatrix} - m\begin{bmatrix} g \\ \hat{P}^{init}g \end{bmatrix} + m\begin{bmatrix} 0_{3\times1} \\ \delta\hat{P}'_j(\ddot{P}_t - g) \end{bmatrix}$$

where G is a constant matrix, the constant matrix $G \in \mathbb{R}^{6\times3Y}$ represents that the constant matrix G is a matrix of 6 rows and 3Y columns, and $\mathbb{R}$ represents a real number set in a multi-dimensional space; $f_0\{P(t)\}$ is used for representing a sum of acting forces to which at least one leg in contact with the ground of the legged robot is subjected; m represents the mass of the legged robot; $Z'_{3\times3}$ represents an identity matrix of 3 rows and 3 columns; g represents a gravity acceleration, and $g \in \mathbb{R}^{3\times1}$ represents that the gravity acceleration g is a 3-dimensional column vector; $\hat{g}$ represents a skew symmetric matrix of the gravity acceleration g, $P^{init}$ is a constant vector used for representing an initiation center of mass position of the legged robot at the beginning of any movement period, and $\hat{P}^{init}$ is a skew symmetric matrix of the constant vector $P^{init}$; $P_t$ represents a center of mass position change amount of the center of mass position of the legged robot after the interval duration t away from the beginning of the start time point of the programming period; $\ddot{P}_t$ represents a second-order derivative of the center of mass position change amount $P_t$ with respect to the interval duration t; $\hat{P}_t$ represents a skew symmetric matrix of the center of mass position change amount; j is used for representing points obtained on the coordinate axes x, y, and z, which are 1, 2, 3, 4, 5, and 6; 6 represents an offset coefficient, and $\delta$ is a constant; $P'_j$ is represented as an offset of the center of mass position of the legged robot on a coordinate axis.

Through the relation data between the acting force to which at least one leg of the legged robot is subjected and the center of mass position P(t) of the legged robot after an offset $\delta P'_j$ is added to the center of mass position of the legged robot, it can be determined that when the offset of the center of mass position of the legged robot reaches each vertex of the polyhedron, the acting force to which the legged robot is subjected conforms to a friction force constraint. Therefore, when the offset of the center of mass position of the legged robot is within the polyhedron, the acting force to which the legged robot is subjected also conforms to the friction force constraint.

Third. Process of creating third relation data:

The third relation data is created based on a friction force constraint to which the legged robot is subjected, the fourth relation data, and the fifth relation data.

In a movement process of the legged robot, the legged robot is subjected to a friction force constraint: a leg in contact with the ground of the legged robot is subjected to a friction force greater than 0, and the friction force to which the leg is subjected is not less than a component force of an acting force $f_i\{P(t)\}$ to which the leg in contact with the ground is subjected in a friction force direction, to avoid generating relative slide between the leg and the ground, thereby ensuring that the legged robot can normally move. An acting force $f_i\{P(t)\}$ corresponding to each of at least one leg of the legged robot is subjected to a friction force constraint, and the following relation is met:

$$\begin{cases} n_i^T f_i\{P(t)\} \geq 0 \\ \sqrt{(t_{i1}^T f_i\{P(t)\})^2 + (t_{i2}^T f_i\{P(t)\})^2} \leq \mu_i n_i^T f_i\{P(t)\} \end{cases}$$

where $n_i$ is a normal vector of a contact point in contact with the ground of the $i^{th}$ leg of the legged robot, $n_i \in \mathbb{R}^{3 \times 1}$ represents that the normal vector $n_i$ is a 3-dimensional column vector, and $\mathbb{R}$ represents a real number set in a multi-dimensional space; $t_{i1}$ and $t_{i2}$ represent two tangent vectors on a plane perpendicular to the normal vector of the contact point in contact with the ground of the $i^{th}$ leg of the legged robot, the tangent vector $t_{i1}$ and the tangent vector $t_{i2}$ are orthogonal with each other, and $t_{i1}, t_{i2} \in \mathbb{R}^{3 \times 1}$ represents that the tangent vector $t_{i1}$ and the tangent vector $t_{i2}$ are both 3-dimensional column vectors; T represents transposition on a vector, and $\mu_i$ is a friction coefficient between the $i^{th}$ leg of the legged robot and the ground.

In a movement process of the legged robot, the legged robot is subjected to a friction force constraint. Therefore, a direction of the acting force to which the $i^{th}$ leg in contact with the ground of the legged robot is subjected is within a cone, a contact point in contact with the ground of the $i^{th}$ leg is a vertex of the cone, and a connecting line within the cone from the vertex to any point of a base circle of the cone can be used as the direction of the acting force $f_i\{P(t)\}$ to which the $i^{th}$ leg in contact with the ground is subjected. To avoid introducing a nonlinear constraint, the cone is approximately presented as a rectangular pyramid, and the acting force $f_i\{P(t)\}$ to which the $i^{th}$ leg in contact with the ground meets the following relation:

$$\begin{bmatrix} -\mu_i n_i^T \pm t_{i1}^T \\ -\mu_i n_i^T \pm t_{i2}^T \\ -n_i^T \\ n_i^T \end{bmatrix} f_i\{P(t)\} \leq \begin{bmatrix} 0 \\ 0 \\ -f_i^{min}\{P(t)\} \\ f_i^{max}\{P(t)\} \end{bmatrix}$$

where $\mu_i$ is a friction coefficient; $n_i$ is a normal vector of a contact point in contact with the ground of the $i^{th}$ leg of the legged robot, $n_i \in \mathbb{R}^{3 \times 1}$ represents that the normal vector $n_i$ is a 3-dimensional column vector, and $\mathbb{R}$ represents a real number set in a multi-dimensional space; $t_{i1}$ and $t_{i2}$ represent two tangent vectors on a plane perpendicular to the normal vector of the contact point in contact with the ground of the $i^{th}$ leg of the legged robot, the tangent vector $t_{i1}$ and the tangent vector $t_{i2}$ are orthogonal with each other, and $t_{i1}, t_{i2} \in \mathbb{R}^{3 \times 1}$ represents that the tangent vector $t_{i1}$ and the tangent vector $t_{i2}$ are both 3-dimensional column vectors; T represents transposition on a vector; $f_i^{min}\{P(t)\}$ represents a minimum value of the acting force to which the $i^{th}$ leg in contact with the ground of the legged robot is subjected in a normal direction, $f_i^{max}\{P(t)\}$ represents a maximum value of the acting force to which the $i^{th}$ leg in contact with the ground of the legged robot is subjected in the normal direction, $f_i^{min}\{P(t)\}$ and $f_i^{max}\{P(t)\}$ are both greater than 0, and each of $f_i^{min}\{P(t)\}$ and $f_i^{max}\{P(t)\}$ can be any value set by the legged robot. $-\mu_i n_i^T \pm t_{i1}^T$ and $-\mu_i n_i^T \pm t_{i2}^T$ are used for representing normal vectors of four side surfaces of the rectangular pyramid.

Through the foregoing relation, through a constraint on component forces of the acting force $f_i\{P(t)\}$ to which the $i^{th}$ leg in contact with the ground of the legged robot is subjected on the four side surfaces of the rectangular pyramid, and a constraint on component forces of the acting force $f_i\{P(t)\}$ to which the $i^{th}$ leg in contact with the ground of the legged robot is subjected in the normal direction, the direction of the acting force $f_i\{P(t)\}$ to which the $i^{th}$ leg in contact with the ground of the legged robot is subjected is limited within the rectangular pyramid.

Because the legged robot meets a friction force constraint at each of a plurality of sampling time points, the following is obtained by substituting the fourth relation data corresponding to the each sampling time point and the fifth relation data corresponding to the each sampling time point into the foregoing relation:

$$H_f V + B_f \leq D_f$$

where $H_f$ is a constant matrix, each of $B_f$ and $D_f$ is a constant vector, V represents a variable vector, the variable matrix is $V = [C_{free}^T \Lambda^T]^T$, $\Lambda$ is a union of fourth constants $\lambda$ corresponding to different legs, and through the union $\Lambda$, a general solution to the acting force of the legged robot in contact with the ground meeting the center of mass dynamics condition can be obtained. In some embodiments, the variable matrix $\Lambda$ is a column vector of 87 rows, the constant matrix $H_f$ is a matrix of 360 rows and 87 columns, the constant vector $B_f$ is a column vector of 360 rows, and the constant vector $D_f$ is a column vector of 360 rows.

Additionally, because the center of mass position of the legged robot has the offset $\delta P'_j$, the foregoing relation can be represented as:

$$H_f^{new} V + B_f^{new} \leq D_f^{new}$$

where $H_f^{new}$ is a constant matrix, and each of $B_f^{new}$ and $D_f^{new}$ is a constant vector.

By substituting the fourth relation data corresponding to the each sampling time point into the fifth relation data, the obtained third relation meets the following relation:

$$J = J_{grf} + J_{len}$$

where J represents the target value; $J_{grf}$ is used for representing a weighted sum of squares of the acting force $f_i\{P(t)\}$ corresponding to the at least one leg, and $J_{len}$ is used for representing a weighted sum of squares of the plurality of distances. Each of $J_{grf}$ and $J_{len}$ in the third relation data includes a square of a variable matrix V, and the variable matrix V meets a friction force constraint.

Through a quadratic programming solver, the minimum value of the target value J in the third relation data can be obtained. Therefore, a variable matrix V corresponding to the minimum value of the target value J can be obtained, that is, the second constant $C_{free}$ and the fourth constant $\lambda$ corresponding to the minimum value of the target value J are obtained, the first constant C whose value is determined is obtained through the second constant $C_{free}$ and the third constant h whose values are determined, and by substituting the first constant C whose value is determined into the first relation data, a center of mass trajectory of the legged robot is obtained.

Based on the method provided in this embodiment of this application, based on center of mass dynamics of the legged robot, a parameter slightly affecting the center of mass position of the legged robot is ignored, and constraints of center of mass positions, speeds, and accelerations in the initiation position and the termination position on the center of mass position, and a friction force constraint to which the legged robot in contact with the ground is subjected are considered; determining the center of mass position is converted in to a quadratic programming problem, to solve a center of mass trajectory with high stability; and subsequently, with reference to the termination position of the foothold of the legged robot, a joint torque of each joint of the legged robot is obtained based on inverse kinematics, and the plurality of joints are controlled according to joint torques of the plurality of joints to rotate, to drive the legged robot to move.

The center of mass position determining method provided in this embodiment of this application is applicable to various legged robots, for example, a two-legged robot, a four-legged robot or a multi-legged robot; is applicable to various gaits of the legged robot, for example, two-legged walking, four-legged walking, four-legged jogging or a random gait; is applicable to various complex environments, for example, a flat ground, an uneven ground, a slope, or stairs; can use any order of the interval duration t, and can use any movement process in the process from the initiation position to the termination position; and can keep, when that the ground is a plane or has a relatively small height difference, the height of the center of mass of the robot unchanged, and use only 2 groups of curves to plan movement of the center of mass in the plane. Constraints of the state data in the initiation position and the state data in the termination position on the center of mass position may be determined according to actual requirements, and it is necessary to ensure that a curve parameter having a constraint added still has an independent variable. When sampling time points are selected, sampling can be performed in any position on the trajectory of the center of mass position, and a larger quantity of sampling time points indicates more proper distribution, and a more reliable center of mass movement trajectory obtained, but a larger dimension and a longer solving time of the quadratic programming problem.

Additionally, a distance corresponding to a sampling time point in the third relation data can be determined through a plurality of sampling time points, and the distance can include components in three directions of the x axis, the y axis, and the z axis, for which different weights can be selected according to an actual situation; and in addition to the acting force of the ground and the curve oscillation amplitude, a sum of squares of accelerations, a sum of squares of speed differences between neighboring points, a sum of squares of differences between accelerations, and the like can be further considered. Simplification of a cone of friction: approximation can be performed by using an inscribed pyramid with N (N>4) sloping sides of the cone of friction, and a larger value of N indicates more accurate approximation to the cone of friction, but a larger dimension and a longer solving time of the quadratic programming problem. Position of a contact point: the contact point is not merely limited to a contact point in contact with the ground on a leg of the legged robot, and is similarly applicable to a case that a part of the robot such as the body, the trunk, or the upper limb is in contact with an environment. Polyhedron whose center of mass position has a non-deterministic constraint: any polyhedron meeting an actual requirement may be used, and an increase in the quantity of vertexes of the polyhedron causes increases in the dimension and the solving time of the quadratic programming problem. When a center of mass position in a single direction is determined and has a change that can be ignored, a polyhedron can be dimensionally reduced to a parallel polygon. When center of mass positions in two directions are determined and have changes that can be ignored, a polyhedron can be dimensionally reduced to a straight line. When center of mass positions in all three directions are determined and have changes that can be ignored, a polyhedron can be dimensionally reduced to a point.

Figure 7:
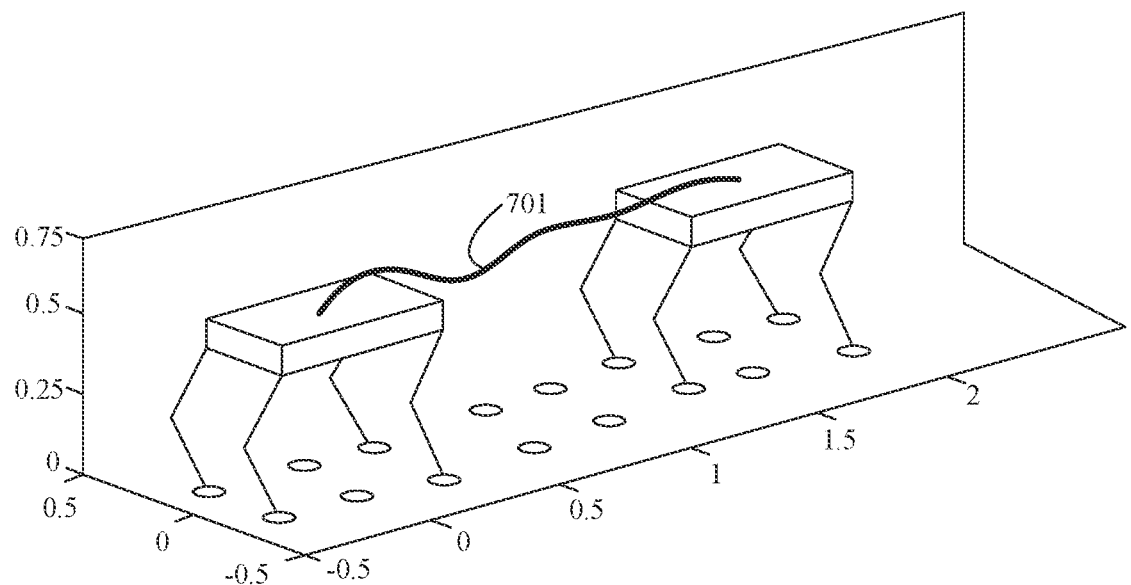
FIG. 7 is a schematic diagram of a movement process of a legged robot according to an embodiment of this application.

As shown in FIG. 7, a legged robot is configured with 4 legs, and the legged robot moves from an initiation position to a termination position according to a determined center of mass trajectory 701.

Figure 8:
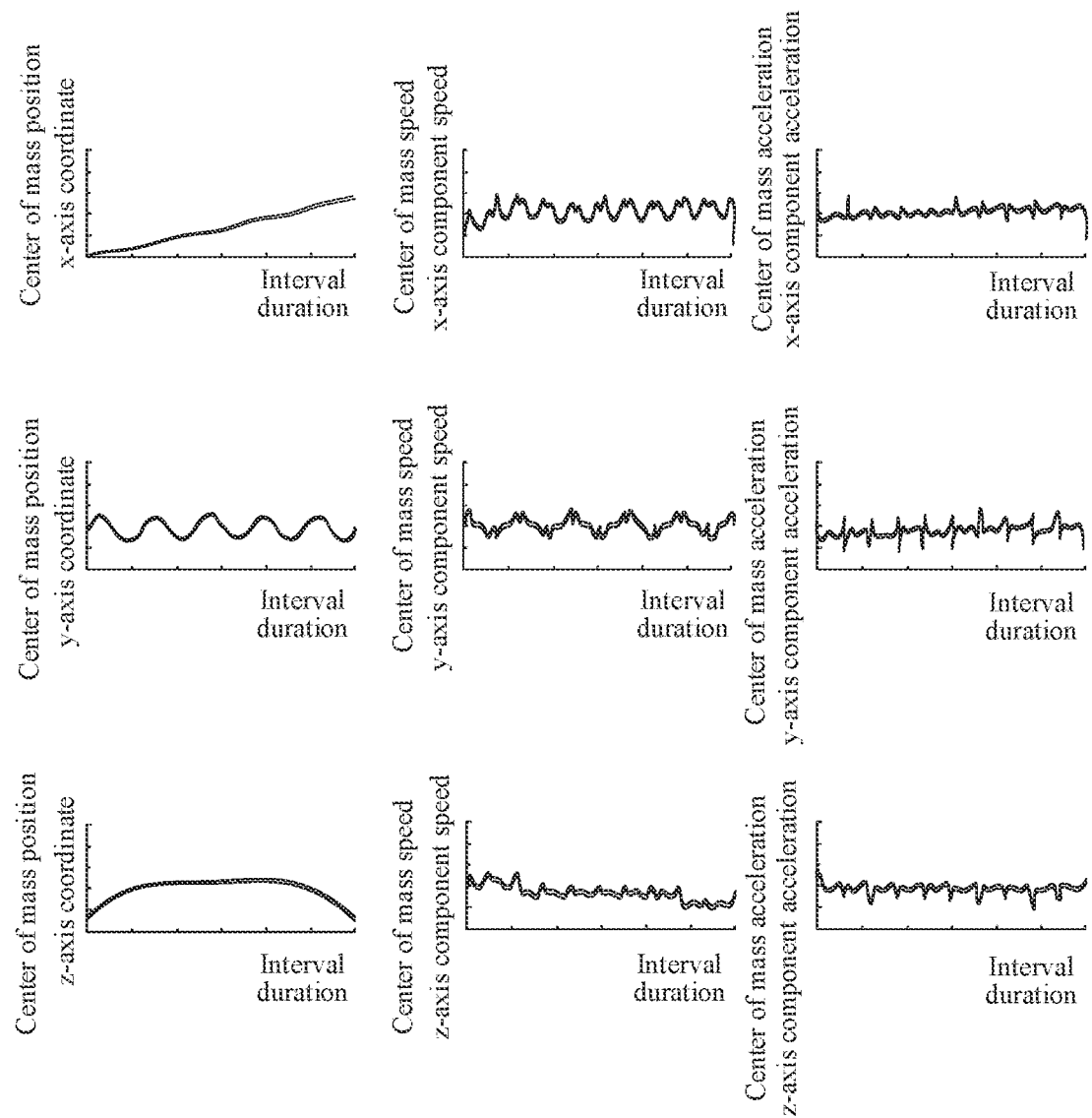
FIG. 8 is a schematic diagram of changes of state data of a legged robot with interval durations according to an embodiment of this application.

As shown in FIG. 8, a legged robot generates a center of mass position trajectory once in each half stepping period, and curve graphs of changes in a center of mass position, a center of mass speed, and a center of mass acceleration of the legged robot with an interval duration are shown. Two curves in each curve graph respectively represent center of mass position curves in which the highest powers of the interval duration t included in the center of mass position P(t) are respectively 3 and 6. Three curve graphs in the first column in FIG. 8 are used for representing curves of changes in coordinates of the center of mass position on the coordinate axes x, y, and z with the interval duration when the highest powers of the interval duration t included in the center of mass position P(t) are respectively 3 and 6. Three curve graphs in the second column in FIG. 8 are used for representing curves of changes in component speeds of the center of mass speed on the coordinate axes x, y, and z with the interval duration when the highest powers of the interval duration t included in the center of mass position P(t) are respectively 3 and 6. Three curve graphs in the third column in FIG. 8 are used for representing curves of changes in component accelerations of the center of mass acceleration on the coordinate axes x, y, and z with the interval duration when the highest powers of the interval duration t included in the center of mass position P(t) are respectively 3 and 6. The legged robot is configured with 4 legs, which are respectively a right rear leg, a right front leg, a left rear leg, and a left front leg, and a stepping sequence of the legged robot is stepping with the right rear leg, stepping with the right front leg, stepping with the left rear leg, and stepping with the left front leg. In some embodiments, each half stepping period is stepping with the right rear leg and stepping with the right front leg, or stepping with the left rear leg and stepping with the left front leg. The legged robot repeatedly performs the stepping process of the plurality of legs according to the stepping sequence, thereby enabling the legged robot to move. It can be known from FIG. 8 that, a deviation between the center of mass position curves in which the highest powers of the interval duration t included in the center of mass position P(t) of the legged robot are respectively 3 and 6 is small, and therefore, it is determined that the highest power of the interval duration t included in the center of mass position P(t) can be any value.

Figure 9:
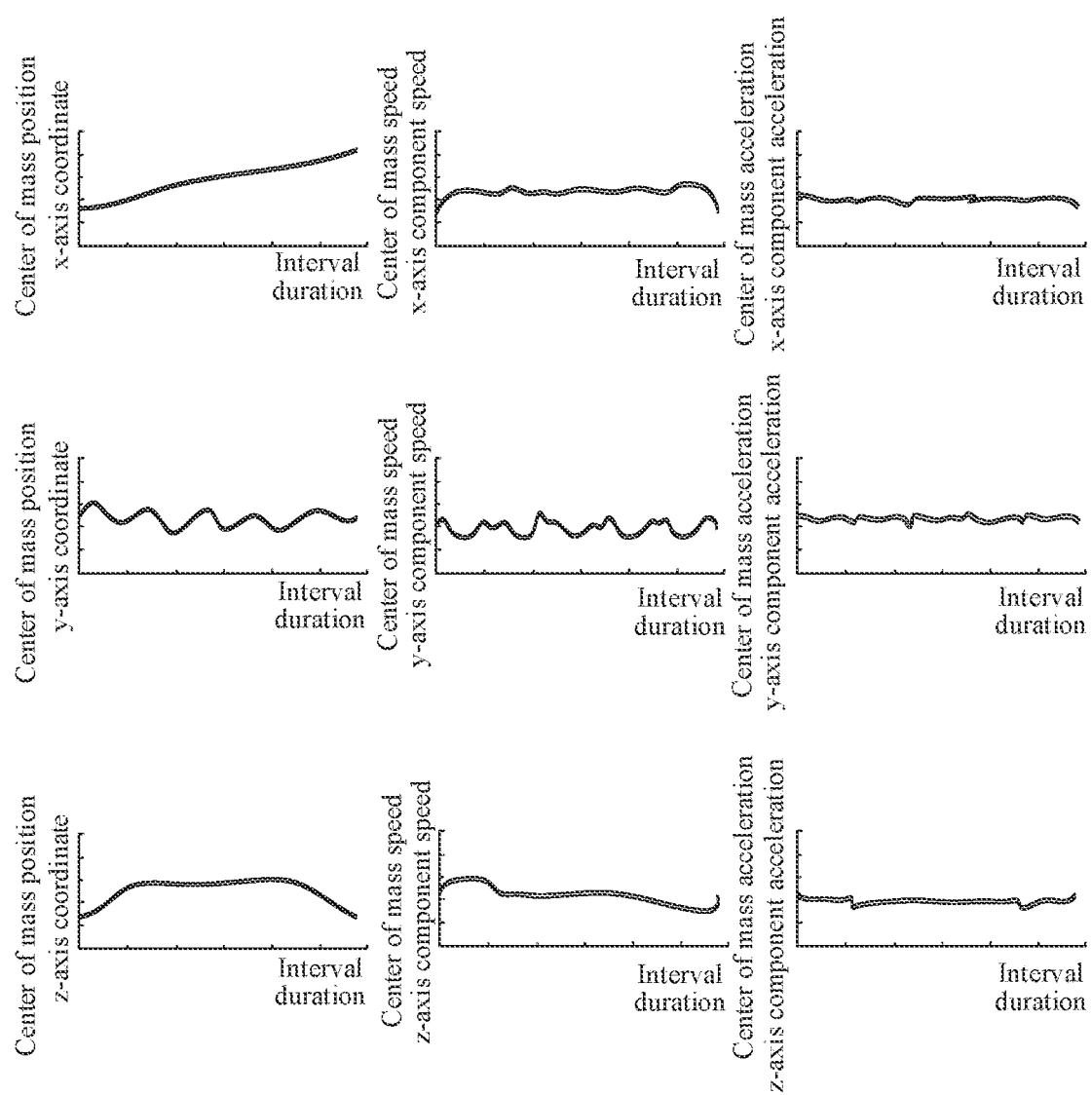
FIG. 9 is a schematic diagram of changes of state data of a legged robot with interval durations according to an embodiment of this application.

As shown in FIG. 9, a legged robot generates a center of mass position trajectory once in each stepping period, and curve graphs of changes in a center of mass position, a center of mass speed, and a center of mass acceleration of the legged robot with an interval duration are shown. Two curves in each curve graph respectively represent center of mass position curves in which the highest powers of the interval duration t included in the center of mass position P(t) are respectively 3 and 6. Three curve graphs in the first column in FIG. 9 are used for representing curves of changes in coordinates of the center of mass position on the coordinate axes x, y, and z with the interval duration when the highest powers of the interval duration t included in the center of mass position P(t) are respectively 3 and 6. Three curve graphs in the second column in FIG. 9 are used for representing curves of changes in component speeds of the center of mass speed on the coordinate axes x, y, and z with the interval duration when the highest powers of the interval duration t included in the center of mass position P(t) are respectively 3 and 6. Three curve graphs in the third column in FIG. 9 are used for representing curves of changes in component accelerations of the center of mass acceleration on the coordinate axes x, y, and z with the interval duration when the highest powers of the interval duration t included in the center of mass position P(t) are respectively 3 and 6. The legged robot is configured with 4 legs, which are respectively a right rear leg, a right front leg, a left rear leg, and a left front leg, and a stepping sequence of the legged robot is stepping with the right rear leg, stepping with the right front leg, stepping with the left rear leg, and stepping with the left front leg. In some embodiments, each stepping period is stepping with the right rear leg, stepping with the right front leg, stepping with the left rear leg, and stepping with the left front leg. The legged robot repeatedly performs the stepping process of the plurality of legs according to the stepping sequence, thereby enabling the legged robot to move. It can be known from FIG. 9 that, a deviation between the center of mass position curves in which the highest powers of the interval duration t included in the center of mass position P(t) of the legged robot are respectively 3 and 6 is small, and therefore, it is determined that the highest power of the interval duration t included in the center of mass position P(t) can be any value.

Figure 10:
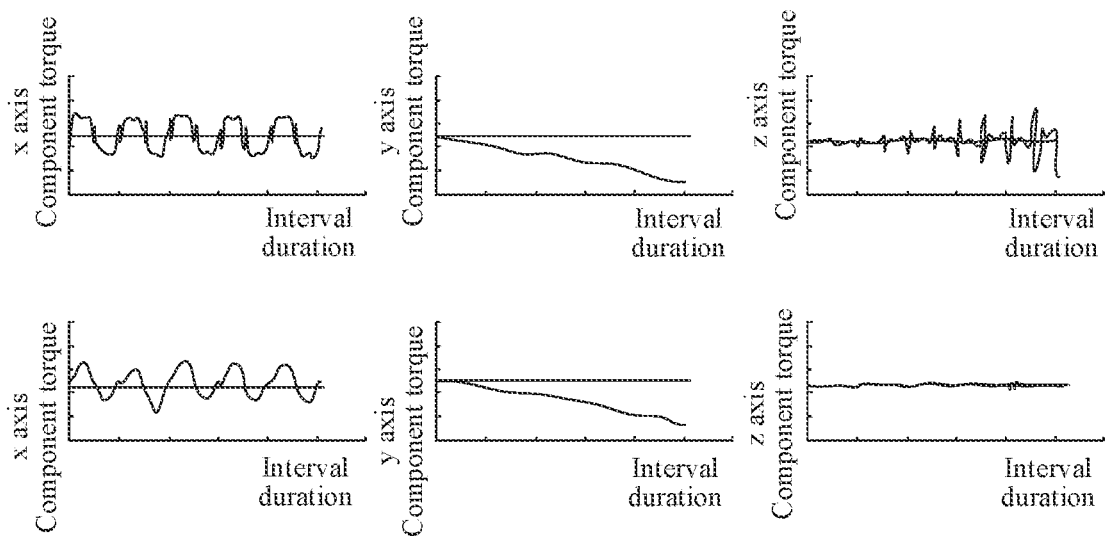
FIG. 10 is a schematic diagram of changes of torques of a legged robot with interval durations according to an embodiment of this application.

As shown in FIG. 10, when the highest power of the interval duration t included in the center of mass position P(t) of the legged robot is 6, the first row of images represents curves indicating that the legged robot generates a center of mass position trajectory once in each half stepping period, and a total torque and an omitted torque of the legged robot change with the interval duration. Three curve graphs in the first row in FIG. 10 represents curves of changes in component torques of the total torque and the omitted torque of the legged robot on the coordinate axes x, y, and z with the interval duration when the legged robot generates a center of mass position trajectory once in each half stepping period. The second row of images represents curves indicating that the legged robot generates a center of mass position trajectory once in each stepping period, and a total torque and an omitted torque of the legged robot change with the interval duration. Three curve graphs in the second row in FIG. 10 represents curves of changes in component torques of the total torque and the omitted torque of the legged robot on the coordinate axes x, y, and z with the interval duration when the legged robot generates a center of mass position trajectory once in each stepping period. It can be known from FIG. 10 that, the torque omitted when the center of mass position is determined in the foregoing embodiment is close to 0, indicating that the torque can be ignored.

Figure 11:
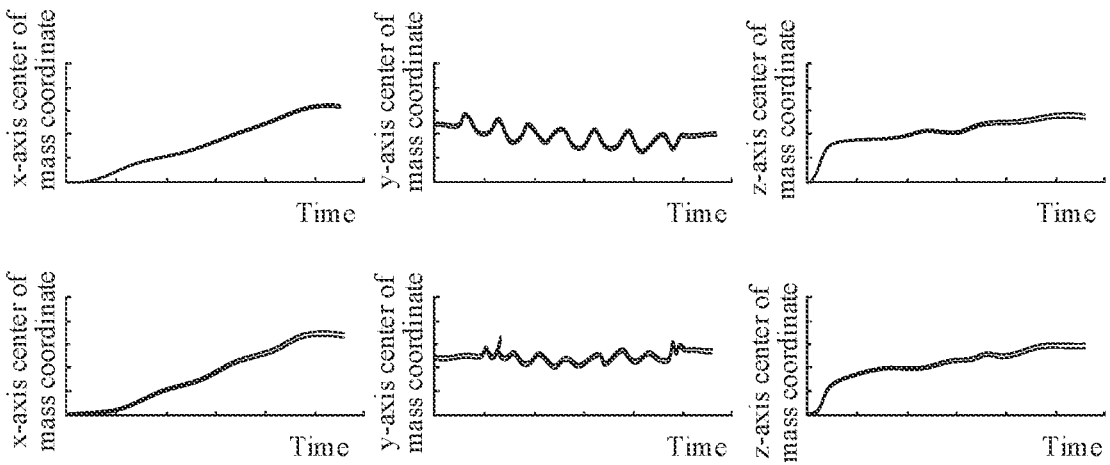
FIG. 11 is a schematic diagram of changes of center of mass positions of a legged robot with interval durations according to an embodiment of this application.

FIG. 11 shows curves of changes of the center of mass position determined by the legged robot for the legged robot according to the center of mass position determining method in the foregoing embodiment and the center of mass position of the legged robot with the interval duration. In FIG. 11, the first row of images represents curves of changes in the center of mass position with the interval duration when the legged robot slowly moves, and the second row of images represents curves of changes in the center of mass position with the interval duration when the legged robot quickly moves. It can be known from FIG. 11 that, the center of mass position determined for the legged robot through the center of mass position determining method provided in the foregoing embodiment coincides with the center of mass position of the legged robot, thereby determining that the center of mass position determining method provided in this embodiment of this application is accurate.

Figure 12:
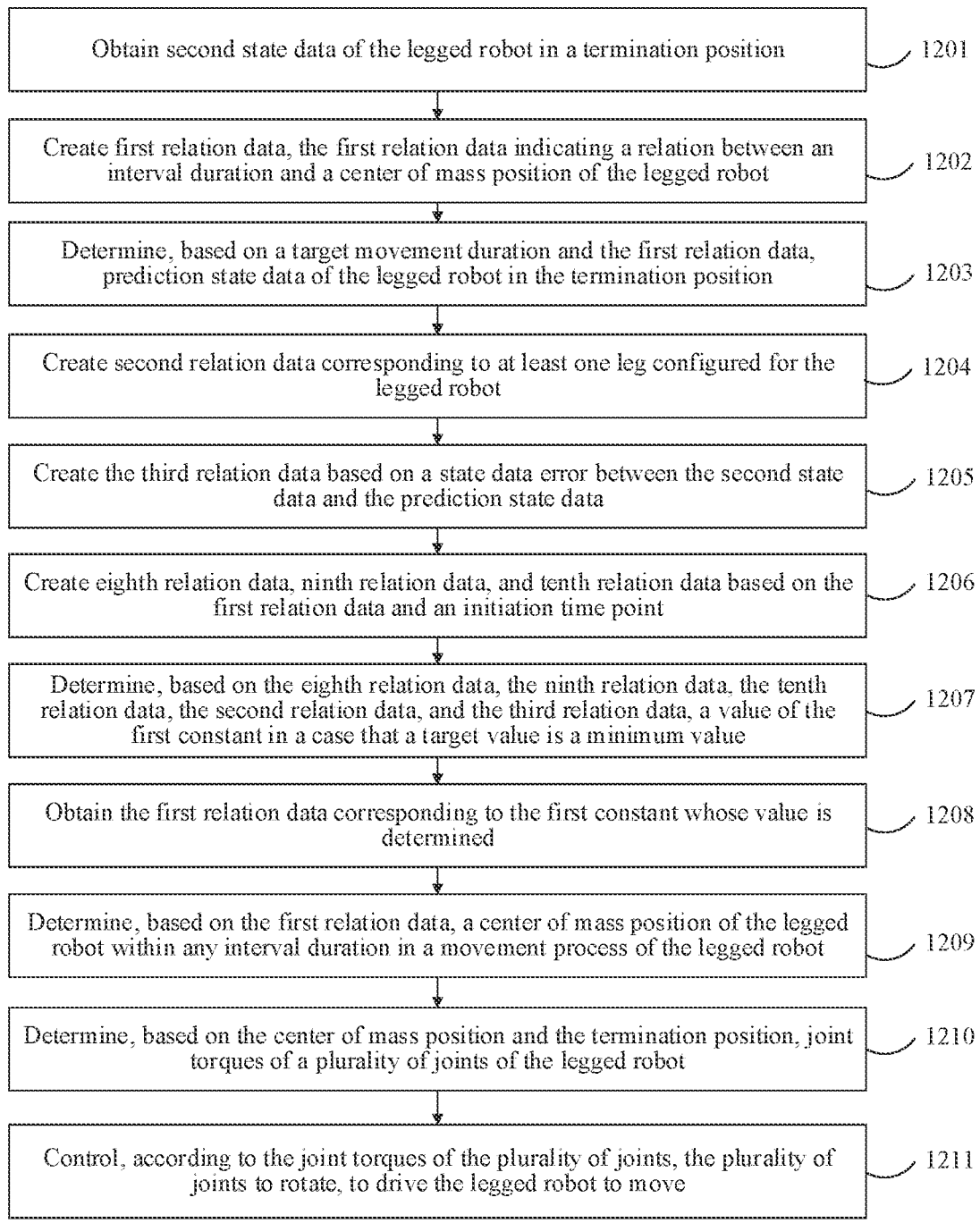
FIG. 12 is a flowchart of a center of mass position determining method according to an embodiment of this application.

In the following embodiment, third relation data is created through a state data error between second state data of a legged robot in a termination position and prediction state data, and then a movement trajectory of the legged robot is determined through the third relation data. FIG. 12 is a flowchart of a center of mass position determining method according to an embodiment of this application, applicable to a legged robot. As shown in FIG. 12, the method includes the following steps.

1201. Obtain second state data of the legged robot in a termination position.

The second state data includes at least a target center of mass position. In some embodiments, the target center of mass position is represented in the form of coordinates in a coordinate system or in the form of a vector. For example, in a world coordinate system, the target center of mass position of the legged robot is [20, 35, 80].

In a possible implementation, the second state data includes a target center of mass position, and step 1201 includes: obtaining, when the legged robot is in the termination position, a position of a contact point in contact with the ground of the at least one leg configured for the legged robot; and determining the target center of mass position based on the position of the contact point of the at least one leg.

For example, the legged robot is a four-legged robot. When the legged robot moves to the termination position, four legs of the four-legged robot are all in contact with the ground. Therefore, four contact positions in contact with the ground on the four legs are obtained, and based on the four contact positions, the target center of mass position of the legged robot in the termination position is determined.

The center of mass is the center of mass of the legged robot, and the center of mass position is a position of the center of mass of the legged robot. The target center of mass position is a position of the center of mass of the legged robot intended when the legged robot moves to the termination position.

The termination position is a position to be reached by the legged robot. In this case, the legged robot has not reached the termination position. The termination position is determined by the legged robot based on an environment in which the legged robot is located. In some embodiments, the legged robot obtains, through a vision perception system, an image including an environment in a movement direction of the legged robot, performs feature extraction on the image including the environment, determines the termination position of the legged robot, determines the second state data for the termination position, and determines, a position of a contact point in contact with the ground on the at least one leg when the legged robot is in the termination position.

For example, the vision perception system includes a camera, and the legged robot photographs the environment in the movement direction of the legged robot through the camera, to obtain the image including the environment in the movement direction of the legged robot.

In some embodiments, based on contact positions in contact with the ground on a plurality of legs of the legged robot, a center position of the plurality of contact positions is determined; and based on the height of the legged robot and the center position, the target center of mass position is determined.

For example, in a world coordinate system, a coordinate system with a right-h and rule is used, a movement direction of the legged robot is used as the X axis, a direction on the left side of the legged robot and perpendicular to the X axis is used as the Y axis, and a direction perpendicular to the ground is used as the Z axis; and through contact positions on a plurality of legs of the legged robot, a center position of the plurality of contact positions is determined, and a coordinate value of the center position on the Z axis is added to the height value of the legged robot, to obtain a coordinate value of the target center of mass position in the world coordinate system, that is, the target center of mass position is determined.

In a possible implementation, the second state data further includes a target center of mass speed, and step 1201 further includes: obtaining first state data of the legged robot in an initiation position, where the first state data includes at least an initiation center of mass position; and determining a ratio of a distance between the target center of mass position and the initiation center of mass position to the target movement duration as the target center of mass speed.

The initiation position is a current position of the legged robot, and the initiation center of mass position is a current position of the center of mass of the legged robot. A center of mass speed is a movement speed of the center of mass of the legged robot, and the center of mass speed can be represented with a vector. The target center of mass speed is a movement speed of the center of mass of the legged robot intended when the legged robot moves to the termination position.

The distance between the target center of mass position and the initiation center of mass position represents a movement distance of the center of mass of the legged robot in the process that the legged robot moves from the initiation position to the termination position. The target movement duration indicates a duration required for the legged robot to move from the initiation position to the termination position.

In some embodiments, the target movement duration is any duration, for example, 2 seconds or 3 seconds. Through a ratio of the distance to the target movement duration, a speed at which the legged robot moves from the initiation position to the termination position, that is, a target center of mass speed at which the legged robot moves to the termination position can be determined. In some embodiments, the target center of mass speed is represented in the form of a vector.

For example, a center of mass position of the legged robot is represented in the form of a vector, for example, [1, 2, 3], and all elements in the vector respectively represent coordinate values of the center of mass of the legged robot on the x axis, the y axis, and the z axis of the coordinate system. Therefore, the distance between the target center of mass position and the initiation center of mass position is also represented with a vector, representing displacements of the center of mass of the legged robot on the x axis, the y axis, and the z axis, and a ratio of the distance to the target movement duration is component speeds of the target center of mass speed on the x axis, the y axis, and the z axis.

In a possible implementation, the second state data further includes a target center of mass acceleration, and the first state data further includes an initiation center of mass speed; and step 1201 further includes: determining a ratio of a difference between the target center of mass speed and the initiation center of mass speed to the target movement duration as the target acceleration.

The target center of mass acceleration is an acceleration of the center of mass of the legged robot intended when the legged robot moves to the termination position. In some embodiments, the target center of mass acceleration is represented in the form of a vector. The initiation center of mass speed indicates a speed of the center of mass of the legged robot when the legged robot is in the initiation position. In some embodiments, the initiation center of mass speed is represented in the form of a vector.

A difference between the target center of mass speed and the initiation center of mass speed indicates a center of mass speed change amount of the legged robot when the legged robot moves from the initiation position to the termination position, and a ratio of the center of mass speed change amount to the target movement duration is a center of mass speed change amount per unit time of the legged robot when the legged robot moves from the initiation position to the termination position, that is, the target center of mass acceleration of the legged robot at the time of moving to the termination position.

In a possible implementation, the second state data includes at least a target center of mass position, a target center of mass speed, and a target center of mass acceleration, and therefore step 1201 includes: obtaining, when the legged robot is in the termination position, a position of a contact point in contact with the ground of the at least one leg configured for the legged robot; and determining the target center of mass position based on the position of the contact point of the at least one leg; obtaining first state data of the legged robot in an initiation position, where the first state data includes at least an initiation center of mass position, and determining a ratio of a distance between the target center of mass position and the initiation center of mass position to the target movement duration as the target center of mass speed; and determining a ratio of a difference between the target center of mass speed and the initiation center of mass speed to the target movement duration as the target acceleration.

1202. Create first relation data, the first relation data indicating a relation between an interval duration t and a center of mass position P(t) of the legged robot.

The interval duration t indicates a duration of an interval between any time point in a process that the legged robot moves from an initiation position to a termination position and a start time point corresponding to the initiation position. The center of mass position P(t) indicates a center of mass position of the legged robot within the interval duration t. The first relation data includes a first constant C whose value is not determined, and the first constant C is used for representing a relation between the center of mass position P(t) and the interval duration t. In some embodiments, the first constant C is represented in the form of a vector or a matrix.

In the legged robot, the first relation data is stored in the form of a descriptive statement or a function.

In a possible implementation, step 1202 includes: the first relation data is set as follows: the center of mass position P(t) is a product of the first constant C and a duration matrix E.

The duration matrix E is a matrix used for representing the interval duration t.

In some embodiments, the first relation data meets the following relation:

$$P(t) = P^{init} + EC$$

where $P^{init}$ is a constant vector used for representing an initiation center of mass position of the legged robot in the initiation position.

Because the center of mass position of the legged robot changes with a moving interval duration t in a movement process of the legged robot, the center of mass position after any interval duration t has a corresponding center of mass position change amount, and a sum of the center of mass position change amount corresponding to the interval duration t and the initiation center of mass position of the legged robot at the beginning of movement is used as the corresponding center of mass position P(t) of the legged robot after any interval duration t, thereby determining the first relation data indicating a relation between the center of mass position P(t) and the interval duration t, and subsequently determining the center of mass trajectory of the legged robot through the first relation data.

1203. Determine, based on a target movement duration and the first relation data, prediction state data of the legged robot in the termination position.

The first relation data is used for representing a center of mass position at any time point in the process that the legged robot moves from the initiation position to the termination position, and the target movement duration indicates a duration required for the legged robot to move from the initiation position to the termination position. Therefore, through the target movement duration and the first relation data, the prediction center of mass position of the legged robot when the legged robot moves to the termination position according to the center of mass trajectory indicated by the first relation data can be predicted. Because the first relation data includes the first constant C whose value is not determined, the obtained prediction center of mass position is related to the first constant C whose value is not determined.

In a possible implementation, the prediction state data includes a prediction center of mass position, and step 1203 includes: determining, based on the first relation data, the prediction center of mass position of the legged robot after the target movement duration away from an initiation position.

The first relation data indicates a relation between the interval duration t and the center of mass position P(t) of the legged robot, and the first relation data includes the first constant C whose value is not determined. Therefore, the target movement duration is used as the interval duration t and substituted into the first relation data, to obtain the prediction center of mass position of the legged robot, and the prediction center of mass position is related to the first constant C whose value is not determined.

In a possible implementation, the prediction state data includes a prediction center of mass speed, and step 1203 includes: creating, based on the first relation data, relation data between the interval duration t and a center of mass speed of the legged robot; and determining, based on the relation data between the interval duration t and the center of mass speed of the legged robot, the prediction center of mass speed of the legged robot after the target movement duration away from an initiation position.

The prediction center of mass speed is a center of mass speed of the legged robot predicted through the first relation data when the legged robot moves to the termination position, and the prediction center of mass speed is related to the first constant C whose value is not determined.

In some embodiments, the first-order derivative of the first relation data with respect to the interval duration t is obtained, to obtain relation data between the interval duration t and the center of mass speed of the legged robot, and the target movement duration is substituted into the relation data, to obtain the prediction center of mass speed.

In a possible implementation, the prediction state data includes a prediction center of mass acceleration, and step 1203 includes: creating, based on the first relation data, relation data between the interval duration t and a center of mass acceleration of the legged robot; and determining, based on the relation data between the interval duration t and the center of mass acceleration of the legged robot, the prediction center of mass acceleration of the legged robot after the target movement duration away from an initiation position.

The prediction center of mass acceleration is a center of mass acceleration of the legged robot predicted through the first relation data when the legged robot moves to the termination position, and the prediction center of mass acceleration is related to the first constant C whose value is not determined.

In some embodiments, the second-order derivative of the first relation data with respect to the interval duration t is obtained, to obtain relation data between the interval duration t and the center of mass acceleration of the legged robot, and the target movement duration is substituted into the relation data, to obtain the prediction center of mass acceleration.

In a possible implementation, the prediction state data includes at least a prediction center of mass position, a prediction center of mass speed, and a prediction center of mass acceleration, and therefore step 1203 includes: determining, based on the first relation data, the prediction center of mass position of the legged robot after the target movement duration away from an initiation position; creating, based on the first relation data, relation data between the interval duration t and a center of mass speed of the legged robot; and determining, based on the relation data between the interval duration t and the center of mass speed of the legged robot, the prediction center of mass speed of the legged robot after the target movement duration away from an initiation position; and creating, based on the first relation data, relation data between the interval duration t and a center of mass acceleration of the legged robot; and determining, based on the relation data between the interval duration t and the center of mass acceleration of the legged robot, the prediction center of mass acceleration of the legged robot after the target movement duration away from an initiation position.

1204. Create second relation data corresponding to at least one leg configured for the legged robot.

The second relation data corresponding to the at least one leg separately indicating a relation between an acting force $f_i$ corresponding to the at least one leg and the center of mass position P(t). The acting force $f_i$ indicates an acting force to which the $i^{th}$ leg in contact with the ground of the legged robot is subjected, and i is a positive integer. The second relation data includes the first constant C whose value is not determined. in the legged robot, the second relation data is stored in the form of a descriptive statement or a function.

In a possible implementation, step 1204 includes: creating sixth relation data, creating seventh relation data, and creating, based on the sixth relation data and the seventh relation data, the second relation data corresponding to the at least one leg.

The sixth relation data indicates a relation between an angular momentum L of the legged robot and the interval duration t, and the angular momentum L is used for representing a change in a gesture of the legged robot. The seventh relation data indicates a positive correlation between the acting force $f_i(L)$ corresponding to the at least one leg and the angular momentum L. The seventh relation data is used for representing an effect of the gesture of the legged robot on the acting force corresponding to the at least one leg of the legged robot. Through the sixth relation data and the seventh relation data that are created, a relation between the acting force $f_i$ to which the at least one leg in contact with the ground of the legged robot is subjected and the interval duration t is determined.

In the legged robot, the sixth relation data and the seventh relation data are stored in the form of descriptive statements or functions.

1205. Create the third relation data based on a state data error between the second state data and the prediction state data.

The third relation data indicates a positive correlation between the target value J and the state data error and a square of an acting force $f_i$ to which the at least one leg in contact with the ground is subjected. Because the prediction center of mass position is related to the first constant C, the state data error is also related to the first constant C. Therefore, the target value J is related to the first constant C, that is, the third relation data includes the first constant C whose value is not determined, in the legged robot, the third relation data is stored in the form of a descriptive statement or a function.

In a possible implementation, a square of a product of each acting force $f_i$ and a corresponding weight is determined, and a sum of squares corresponding to an acting force $f_i$ corresponding to at least one leg is used as a weighted sum of squares of the acting force $f_i$ corresponding to the at least one leg. In some embodiments, a weight corresponding to each acting force $f_i$ is arbitrarily set by the legged robot.

In some embodiments, the acting force $f_i$ to which the at least one leg in contact with the ground of the legged robot is subjected includes $f_{i_x}$, $f_{i_y}$, and $f_{i_z}$, the acting force $f_{i_x}$ is a component force of the acting force $f_i$ on the x axis, the acting force $f_{i_y}$ is a component force of the acting force $f_i$ on the y axis, the acting force $f_{i_z}$ is a component force of the acting force $f_i$ on the z axis, and for the $i^{th}$ leg in contact with the ground of the legged robot, a weighted square of the acting force $f_i$ corresponding to the leg meets the following relation $$F_i = a_1 \cdot f_{i_x}^2 + a_2 \cdot f_{i_y}^2 + a_3 \cdot f_{i_z}^2$$

where $F_i$ represents the weighted square of the acting force $f_i$ corresponding to the $i^{th}$ leg, $a_1$, $a_2$, $a_3$ respectively represents weights of the acting force $f_i$ corresponding to the $i^{th}$ leg on the x axis, the y axis, and the z axis, $a_1$, $a_2$, $a_3$ is any constant, and values of $a_1$, $a_2$, $a_3$ may be the same or different. Additionally, for different acting forces, the values of $a_1$ may be the same or different, the values of $a_2$ may be the same or different, and the values of $a_3$ may be the same or different.

In some embodiments, a weighted sum of squares of the acting force $f_i$ corresponding to the at least one leg in contact with the ground of the legged robot is equal to a sum of weighted squares $F_i$ corresponding to the at least one leg.

In a possible implementation, the second state data includes a target center of mass position, and the prediction state data includes a prediction center of mass position; and step 1205 includes: determining a first difference between the target center of mass position and the prediction center of mass position; and setting the target value J to a sum value of a weighted sum of squares of the acting force $f_i$ corresponding to the at least one leg, and a square of the first difference.

The first difference is used for indicating a difference between the target center of mass position and the prediction center of mass position when the legged robot is in the termination position. Because the prediction center of mass position is related to the first constant C, the first difference is related to the first constant C, and after the target value J is set to the sum value of the weighted sum of squares of the acting force $f_i$, corresponding to the at least one leg, and the square of the first difference, the target value is related to a quadratic term of the first constant C. In some embodiments, when the first constant C includes a plurality of constant terms, quadratic terms of the first constant C include quadratic constant terms formed by the plurality of constant terms, that is, a square of each constant term or a product of any two constant terms. For example, the first constant C includes constant terms $C_x$, $C_y$, and $C_z$, and therefore the quadratic terms of the first constant C include quadratic constant terms such as $C_x^2$, $C_y^2$, $C_z^2$, $C_x C_y$, $C_x C_z$, and $C_y C_z$.

In some embodiments, a distance between the target center of mass position and the prediction center of mass position is determined as the first difference.

In some embodiments, each of the target center of mass position and the prediction center of mass position is represented in the form of coordinates, and therefore the first difference is also represented in the form of coordinates. The target center of mass position includes first coordinate values on the x, y, and z axes, the prediction center of mass position includes second coordinate values on the x, y, and z axes, and differences between the first coordinate values and the second coordinate values on the x, y, and z axes are determined, to obtain the first difference. The first difference includes differences on the x, y, and z axes, and a weighted sum of squares of the differences of the first difference on the x, y, and z axes is used as a square of the first difference. In some embodiments, weights corresponding to the x, y, and z axes are arbitrarily set by the legged robot.

In a possible implementation, the second state data includes a target center of mass speed, and the prediction state data includes a prediction center of mass speed; and step 1205 includes: determining a third difference between the target center of mass speed and the prediction center of mass speed; and setting the target value J to a sum value of a weighted sum of squares of the acting force $f_i$ corresponding to the at least one leg, and a square of the third difference.

The third difference is used for indicating a difference between the target center of mass speed of the legged robot and the prediction center of mass speed when the legged robot is in the termination position. Because the prediction center of mass speed is related to the first constant C, the third difference is related to the first constant C, and after the target value J is set to the sum value of the weighted sum of squares of the acting force $f_i$ corresponding to the at least one leg, and the square of the third difference, the target value J is related to a quadratic term of the first constant C. In some embodiments, when the first constant C includes a plurality of constant terms, quadratic terms of the first constant C include quadratic constant terms formed by the plurality of constant terms, that is, a square of each constant term or a product of any two constant terms. For example, the first constant C includes constant terms $C_x$, $C_y$, and $C_z$, and therefore the quadratic terms of the first constant C include quadratic constant terms such as $C_x^2$, $C_y^2$, $C_z^2$, $C_xC_y$, $C_xC_z$, and $C_yC_z$.

In some embodiments, each of the target center of mass speed and the prediction center of mass speed is represented in the form of coordinates, and therefore the third difference is also represented in the form of coordinates. The target center of mass speed includes first component speeds on the x, y, and z axes, the prediction center of mass speed includes second component speeds on the x, y, and z axes, and speed differences between the first component speeds and the second component speeds on the x, y, and z axes are determined, to obtain the third difference. The third difference includes speed differences on the x, y, and z axes, and a weighted sum of squares of the speed differences of the third difference on the x, y, and z axes is used as a weighted square of the third difference. x, y, and z axes are arbitrarily set by the legged robot.

In a possible implementation, the second state data includes a target center of mass acceleration, and the prediction state data includes a prediction center of mass acceleration; and step 1205 includes: determining a second difference between the target center of mass acceleration and the prediction center of mass acceleration; and setting the target value J to a sum value of a weighted sum of squares of the acting force $f_i$ corresponding to the at least one leg, and a square of the second difference.

The second difference is used for indicating a difference between the target center of mass acceleration of the legged robot and the prediction center of mass acceleration when the legged robot is in the termination position. Because the prediction center of mass acceleration is related to the first constant C, the second difference is related to the first constant C, and after the target value J is set to the sum value of the weighted sum of squares of the acting force $f_i$ corresponding to the at least one leg, and the square of the third difference, the target value J is related to a quadratic term of the first constant C. In some embodiments, when the first constant C includes a plurality of constant terms, quadratic terms of the first constant C include quadratic constant terms formed by the plurality of constant terms, that is, a square of each constant term or a product of any two constant terms. For example, the first constant C includes constant terms $C_x$, $C_y$, and $C_z$, and therefore the quadratic terms of the first constant C include quadratic constant terms such as $C_x^2$, $C_y^2$, $C_z^2$, $C_xC_y$, $C_xC_z$, and $C_yC_z$.

In some embodiments, each of the target center of mass acceleration and the prediction center of mass acceleration is represented in the form of coordinates, and therefore the second difference is also represented in the form of coordinates. The target center of mass acceleration includes first component accelerations on the x, y, and z axes, the prediction center of mass acceleration includes second component accelerations on the x, y, and z axes, and acceleration differences between the first component accelerations and the second component accelerations on the x, y, and z axes are determined, to obtain the second difference. The second difference includes acceleration differences on the x, y, and z axes, and a weighted sum of squares of the acceleration differences of the second difference on the x, y, and z axes is used as a weighted square of the second difference. x, y, and z axes are arbitrarily set by the legged robot.

The three possible implementations of the foregoing step 1205 are respectively described only by using state data including center of mass positions, center of mass speeds, or center of mass accelerations. Additionally, any two of the foregoing three possible implementations can be combined, or the three possible implementations are combined.

When any two possible implementations are combined, if the state data error includes the first difference and the second difference, the target value J is set to a sum value of a weighted sum of squares of the acting force $f_i$ corresponding to the at least one leg and a weighted sum of squares of the first difference and the second difference; or if the state data error includes the first difference and the third difference, the target value J is set to a sum value of a weighted sum of squares of the acting force $f_i$ corresponding to the at least one leg and a weighted sum of squares of the first difference and the third difference; or if the state data error includes the second difference and the third difference, the target value J is set to a sum value of a weighted sum of squares of the acting force $f_i$ corresponding to the at least one leg and a weighted sum of squares of the second difference and the third difference. Weights of any two differences included in the state data error are arbitrarily set by the legged robot.

When the foregoing three possible implementations are combined, that is, the state data error includes the first difference, the second difference, and the third difference, the target value J is set to a sum value of a weighted sum of squares of the acting force $f_i$ corresponding to the at least one leg and a weighted sum of squares of the first difference, the second difference, and the third difference. In some embodiments, weights of the first difference, the second difference, and the third difference are arbitrarily set by the legged robot. After the weighted square of the first difference, the weighted square of the second difference, and the weighted square of the third difference are determined, a sum of the weighted square of the first difference, the weighted square of the second difference, and the weighted square of the third difference is used as a weighted sum of squares of the first difference, the second difference, and the third difference.

In a possible implementation, step 1205 includes the following steps 12051 to 12053:

12051. Select a plurality of sampling time points within the target movement duration.

A sampling time point refers to a time point between a start time point corresponding to the initiation position and a target time point corresponding to the termination position. The plurality of sampling time points include two or more sampling time points. Interval durations between any two neighboring sampling time points may be equal or not equal.

For example, the movement duration is 60 seconds, the start time point corresponding to the initiation position is the $0^{th}$ second, the target time point corresponding to the termination position is the $60^{th}$ second, and 5 sampling time points are selected within the movement duration. The first sampling time point is the $10^{th}$ second, the second sampling time point is the $20^{th}$ second, the third sampling time point is the $120^{th}$ second, the fourth sampling time point is the $40^{th}$ second, and the fifth sampling time point is the $50^{th}$ second; or the first sampling time point is the $5^{th}$ second, the second sampling time point is the $20^{th}$ second, the third sampling time point is the $25^{th}$ second, the fourth sampling time point is the $40^{th}$ second, and the fifth sampling time point is the $55^{th}$ second.

In a possible implementation, step 12051 includes: the movement duration is divided into a plurality of time periods, and an end time point of each time period is used as a sampling time point. The obtained plurality of time periods may be equal or not equal.

12052. Determine, based on an interval duration between each sampling time point and a start time point and the first relation data, fourth relation data corresponding to the each sampling time point.

The fourth relation data indicates a relation between the first constant C and a sampling center of mass position Q(C), and the sampling center of mass position Q(C) indicates a center of mass position of the legged robot at the corresponding sampling time point. in the legged robot, the fourth relation data is stored in the form of a descriptive statement or a function.

The first relation data indicates that the center of mass position P(t) is a product of the first constant C and the duration matrix E. Therefore, by substituting an interval duration between any sampling time point and the start time point into the duration matrix E in the first relation data, the value of the duration matrix E at the any sampling time point is determined, to obtain the fourth relation data corresponding to the sampling time point, where the fourth relation data indicates a relation between the first constant C and the sampling center of mass position Q(C). The value of the first constant C included in the fourth relation data is not determined, but values of other constants included in the fourth relation data have all been determined.

12053. Create the third relation data based on the state data error and the fourth relation data.

The third relation data indicates a positive correlation between the target value J and a square of the acting force $f_i$ corresponding to the at least one leg corresponding to the each sampling time point, the state data error, and the sampling center of mass position Q(C).

In a possible implementation, the second state data includes a target center of mass position, and the prediction state data includes a prediction center of mass position; and step 12053 includes: determining a first difference between the target center of mass position and the prediction center of mass position; and setting the target value J to a sum value of a first value, a second value, and a third value.

The first value is a square of the first difference, and the second value is a weighted sum of squares of a plurality of distances. The plurality of distances include a distance between any two neighboring center of mass positions of an initiation center of mass position in an initiation position, a plurality of sampling center of mass positions, and the prediction center of mass position, and the third value is a weighted sum of squares of the acting force $f_i$ corresponding to the at least one leg corresponding to the each sampling time point. In some embodiments, a weight of each distance is arbitrarily set by the legged robot. A squared value of a product of each distance and a corresponding weight is determined, and a sum of squared values corresponding to a plurality of distances is used as a weighted sum of squares of the plurality of distances. The weighted sum of squares of the plurality of distances can reflect the length of the center of mass trajectory, and can reduce the oscillation amplitude of the center of mass trajectory curve.

Because the plurality of sampling positions and the prediction center of mass position are all related to the first constant C, the first difference and the plurality of distances are all related to the first constant C. The first value is the square of the first difference, and the second value is the weighted sum of squares of the plurality of distances. Therefore, the first value and the second value are both related to the quadratic terms of the first constant C, and after the target value J is set to the sum value of the first value, the second value, and the third value, the target value J is related to the quadratic terms of the first constant C. In some embodiments, when the first constant C includes a plurality of first constant terms, quadratic terms of the first constant C include quadratic first constant terms formed by the plurality of first constant terms, that is, a square of each first constant term or a product of any two first constant terms. For example, the first constant C includes first constant terms $C_x$, $C_y$, and $C_z$, and therefore the quadratic terms of the first constant C include quadratic first constant terms such as $C_x^2$, $C_y^2$, $C_z^2$, $C_xC_y$, $C_xC_z$, and $C_yC_z$.

In a possible implementation, the second state data includes a target center of mass speed, and the prediction state data includes a prediction center of mass speed; and step 12053 includes: determining a third difference between the target center of mass speed and the prediction center of mass speed; and setting the target value J to a sum value of a second value, a third value, and a fifth value.

The fifth value is a square of the third difference, and the second value is a weighted sum of squares of a plurality of distances. The third value is a weighted sum of squares of the acting force $f_i$ corresponding to the at least one leg corresponding to the each sampling time point.

Because the plurality of sampling positions and the prediction center of mass speed are all related to the first constant C, the third difference and the plurality of distances are all related to the first constant C. The fifth value is the square of the third difference, and the second value is the weighted sum of squares of the plurality of distances. Therefore, the fifth value and the second value are both related to the quadratic terms of the first constant C, and after the target value J is set to the sum value of the second value, the third value, and the fifth value, the target value J is related to the quadratic terms of the first constant C. In some embodiments, when the first constant C includes a plurality of first constant terms, quadratic terms of the first constant C include quadratic first constant terms formed by the plurality of first constant terms, that is, a square of each first constant term or a product of any two first constant terms. For example, the first constant C includes first constant terms $C_x$, $C_y$, and $C_z$, and therefore the quadratic terms of the first constant C include quadratic first constant terms such as $C_x^2$, $C_y^2$, $C_z^2$, $C_xC_y$, $C_xC_z$, and $C_yC_z$.

In a possible implementation, the second state data includes a target center of mass acceleration, and the prediction state data includes a prediction center of mass acceleration; and step 12053 includes: determining a second difference between the target center of mass acceleration and the prediction center of mass acceleration; and setting the target value J to a sum value of a second value, a third value, and a fourth value.

The fourth value is a square of the second difference, and the second value is a weighted sum of squares of a plurality of distances. The third value is a weighted sum of squares of the acting force $f_i$ corresponding to the at least one leg corresponding to the each sampling time point.

Because the plurality of sampling positions and the prediction center of mass acceleration are all related to the first constant C, the second difference and the plurality of distances are all related to the first constant C. The fourth value is the square of the second difference, and the second value is the weighted sum of squares of the plurality of distances. Therefore, the fourth value and the second value are both related to the quadratic terms of the first constant C, and after the target value J is set to the sum value of the second value, the third value, and the fourth value, the target value J is related to the quadratic terms of the first constant C. In some embodiments, when the first constant C includes a plurality of first constant terms, quadratic terms of the first constant C include quadratic first constant terms formed by the plurality of first constant terms, that is, a square of each first constant term or a product of any two first constant terms. For example, the first constant C includes first constant terms $C_x$, $C_y$, and $C_z$, and therefore the quadratic terms of the first constant C include quadratic first constant terms such as $C_x^2$, $C_y^2$, $C_z^2$, $C_xC_y$, $C_xC_z$, and $C_yC_z$.

The three possible implementations of the foregoing step 12053 are respectively described only by using state data including center of mass positions, center of mass speeds, or center of mass accelerations. Additionally, any two of the foregoing three possible implementations can be combined, or the three possible implementations are combined.

When any two possible implementations are combined, if the state data error includes the first difference and the second difference, the target value J is set to a sum value of a weighted sum of squares of the first difference and the second difference, the second value, and the third value; or if the state data error includes the first difference and the third difference, the target value J is set to a sum value of a weighted sum of squares of the first difference and the third difference, the second value, and the third value; or if the state data error includes the second difference and the third difference, the target value J is set to a sum value of a weighted sum of squares of the second difference and the third difference, the second value, and the third value. Weights of any two differences included in the state data error are arbitrarily set by the legged robot.

When the foregoing three possible implementations are combined, that is, the state data error includes the first difference, the second difference, and the third difference, the target value J is set to a sum value of a weighted sum of squares of the first difference, the second difference, and the third difference, the second value, and the third value.

In some embodiments, weights of the first difference, the third difference, and the second difference are arbitrarily set by the legged robot. A squared value of a product of the first difference and the corresponding weight, a squared value of a product of the third difference and the corresponding weight, and a squared value of a product of the second difference and the corresponding weight are determined, and a sum of the squared value corresponding to the first difference, the squared value corresponding to the third difference, and the squared value corresponding to the second difference is a weighted sum of squares of the first difference, the third difference, and the second difference.

1206. Create eighth relation data, ninth relation data, and tenth relation data based on the first relation data and a start time point.

The eighth relation data indicates a relation between an initiation center of mass position of the legged robot in an initiation position and the first constant C, the ninth relation data indicates a relation between an initiation center of mass speed of the legged robot in the initiation position and the first constant C, and the tenth relation data indicates a relation between an initiation center of mass acceleration of the legged robot in the initiation position and the first constant C. in the legged robot, the eighth relation data, the ninth relation data, and the tenth relation data are stored in the form of descriptive statements or functions.

In a possible implementation, step 1206 includes: substituting the start time point into the first relation data, to obtain the eighth relation data; obtaining a first-order derivative of the first relation data with respect to the interval duration t, and substituting the start time point into relation data of the obtained first-order derivative, to obtain the ninth relation data; and obtaining a second-order derivative of the first relation data with respect to the interval duration t, and substituting the start time point into relation data of the obtained second-order derivative, to obtain the tenth relation data.

1207. Determine, based on the eighth relation data, the ninth relation data, the tenth relation data, the second relation data, and the third relation data, a value of the first constant C when a target value J is a minimum value.

When the first constant C meets the eighth relation data, the ninth relation data, the tenth relation data, and the second relation data, the value of the first constant C when the target value J is the minimum value is determined, so that the first state data of the legged robot in the initiation position meets the first relation data corresponding to the first constant C whose value is determined, and the acting force corresponding to the at least one leg in the initiation position meets the second relation data, to ensure accuracy of the determined value of the first constant C.

In a possible implementation, a friction force constraint condition is created, the friction force constraint condition indicates a friction force constraint condition met by the acting force to which the at least one leg in contact with the ground of the legged robot is subjected, and the friction force constraint condition includes the first constant C whose value is not determined. When the friction force constraint condition is met, the value of the first constant C when the target value J is the minimum value is determined based on the eighth relation data, the ninth relation data, the tenth relation data, the second relation data, and the third relation data.

In this application, description is made by using an example in which the value of the first constant C when the target value J is the minimum value is determined based on the eighth relation data, the ninth relation data, the tenth relation data, the second relation data, and the third relation data; and in another embodiment, it is unnecessary to perform steps 1206 to 1207, and the value of the first constant C when the target value J is the minimum value can be determined based on the second relation data and the third relation data in another manner.

1208. Obtain the first relation data corresponding to the first constant C whose value is determined.

After the value of the first constant C is determined, if the first constant C whose value is determined is substituted into the first relation data, the first relation data indicates a relation between the center of mass position $P(t_0)$ and the interval duration t; and except the interval duration t, the first relation data does not include other constants whose values are not determined. Therefore, the first relation data corresponding to the first constant C whose value is determined can represent a center of mass trajectory of the legged robot.

1209. Determine, based on the first relation data, a center of mass position $P(t_0)$ of the legged robot within any interval duration $t_0$ in a movement process of the legged robot.

This step is similar to step 311. Details are not described herein again.

1210. Determine, based on the center of mass position $P(t_0)$ and the termination position, joint torques of a plurality of joints of the legged robot.

This step is similar to step 312. Details are not described herein again.

1211. Control, according to the joint torques of the plurality of joints, the plurality of joints to rotate, to drive the legged robot to move.

This step is similar to step 313. Details are not described herein again.

In this embodiments of this application, a movement process that the legged robot moves from the initiation position to the termination position is describes; and in another embodiment, after reaching the termination position, the legged robot can further continue to perform the latter movement process, to perform the foregoing steps 1201 to 1211 by using the termination position of the former movement process as the initiation position of the latter movement process, so that the legged robot moves to the termination position of the latter process, thereby implementing a plurality of consecutive movement processes of the legged robot.

In a possible implementation, the termination position of the last movement process is used as a target position of the legged robot, and after it is determined that the legged robot moves to the termination position of the current movement process, it is detected whether the termination position coincides with the target position. In response to that the termination position does not coincide with the target position, the first state data is determined for the termination position. In response to that the termination position coincides with the target position, the second state data is determined for the termination position.

In this embodiment of this application, description is made by using the legged robot as an execution body; and in another embodiment, the foregoing steps 1201 to 1211 are performed by a server, the server determines, based on the center of mass position $P(t_0)$ and the termination position, the joint torques of the plurality of joints of the legged robot, and sends a movement instruction to the legged robot, where the movement instruction carries the joint torques of the plurality of joints, and the legged robot controls, according to the joint torques of the plurality of joints, the plurality of joints to rotate, to drive the legged robot to move.

In a possible implementation, the server establishes communicative connection to the plurality of joints of the legged robot, the server sends a rotating instruction to the plurality of joints of the legged robot according to the determined joint torques of the plurality of joints, where the rotating instruction carries the joint torques of the corresponding joints, and after receiving the rotating instruction, the plurality of joints of the legged robot rotate according to the corresponding joint torques, to drive the legged robot to move.

In these embodiments of this application, description is made by using the legged robot as an execution body; and in another embodiment, the foregoing steps 1201 to 1208 are performed by the server. After obtaining the first relation data corresponding to the first constant C whose value is determined, the server sends the first relation data corresponding to the first constant C whose value is determined to the legged robot, and the legged robot performs steps 1209 to 1211, thereby controlling the legged robot to move.

Based on the method provided in this embodiment of this application, it is unnecessary to detect a state of each joint of the legged robot. Instead, the prediction state data of the legged robot in the termination position is predicted through the first relation data; then by minimizing a state data error between the prediction state data and intended target state data, the first constant C in the first relation data is determined, so that a difference between the prediction state data and the second state data is minimum, to ensure accuracy of the value of the first constant C; and subsequently the corresponding center of mass trajectory is determined based on the first constant C whose value is determined, thereby improving accuracy of the center of mass trajectory of the legged robot, which is applicable to a legged robot with any quantity of legs and has a wide application range.

By creating the second relation data, the acting force to which the at least one leg in contact with the ground configured for the legged robot is subjected is considered, thereby improving accuracy of the center of mass trajectory of the legged robot, enabling the legged robot to move according to the determined center of mass trajectory, ensuring feasibility and efficiency of the determined center of mass trajectory, and also ensuring diversity and universality of determining the center of mass trajectory.

The foregoing embodiment involves the first relation data, the second relation data, and the third relation data, and based on the foregoing embodiment, the process of creating the foregoing three types of relation data is described in detail in the following embodiment:

First. The process of creating the first relation data in this embodiment of this application is similar to the process of creating the first relation data in the previous embodiment, and details are not described herein again.

Second. Process of creating second relation data:

1. The relation data between an acting force to which at least one leg of the legged robot is subjected and a center of mass position $P(t)$ of the legged robot is obtained based on the process of creating the second relation data in the foregoing embodiment and can be represented with the following function:

$$Gf_0 = m\begin{bmatrix} \ddot{P}_t \\ \hat{P}^{init}\ddot{P}_t + \hat{g}P_t \end{bmatrix} - m\begin{bmatrix} g \\ \hat{P}^{init}g \end{bmatrix} + \begin{bmatrix} 0_{3\times1} \\ m\hat{P}_t\dot{P}_t + \dot{L} \end{bmatrix}$$

where G is a constant matrix, the constant matrix $G \in \mathbb{R}^{6\times 3Y}$ represents that the constant matrix G is a matrix of 6 rows and 3Y columns, and $\mathbb{R}$ represents a real number set in a multi-dimensional space; $f_0$ is used for representing a sum of acting forces to which at least one leg in contact with the ground of the legged robot is subjected; m represents the mass of the legged robot; $P_t$ represents a center of mass position change amount of the center of mass position of the legged robot after the interval duration t away from the beginning of the start time point of the programming period; $\ddot{P}_t$ represents a second-order derivative of the center of mass position change amount $P_t$ with respect to the interval duration t; $P^{init}$ is a constant vector used for representing an initiation center of mass position of the legged robot at the beginning of any movement period, and $\hat{P}^{init}$ is a skew symmetric matrix of the constant vector $P^{init}$; g represents a gravity acceleration, and $g \in \mathbb{R}^{3\times 1}$ represents that the gravity acceleration g is a 3-dimensional column vector; ĝ represents a skew symmetric matrix of the gravity acceleration g, and $\hat{P}_t$ represents a skew symmetric matrix of change amounts of center of mass positions; and L represents an angular momentum of the legged robot, the angular momentum $L \in \mathbb{R}^{3\times 1}$ represents that the angular momentum L is a 3-dimensional column vector, and $\dot{L}$ represents a first-order derivative of the angular momentum L with respect to the interval duration t.

2. Create second relation data based on relation data between an acting force to which at least one leg of the legged robot is subjected and a center of mass position P(t) of the legged robot.

Because center of mass position change amounts meet the relation $P_t = P_t^{xy} + P_t^z$, in the foregoing relation data between an acting force to which at least one leg of the legged robot is subjected and the center of mass position P(t) of the legged robot, $\hat{P}_t \ddot{P}_t$ meets the following relation:

$$\hat{P}_t \ddot{P}_t = \hat{P}_t^{xy} \ddot{P}_t^{xy} + \hat{P}_t^{xy} \ddot{P}_t^z + \hat{P}_t^z \ddot{P}_t^{xy} + \hat{P}_t^z \ddot{P}_t^z$$

where $P_t^{xy}$ represents a component of the center of mass position change amount $P_t$ on a plane formed by the x and y axes, and the z coordinate corresponding to $P_t^{xy}$ is 0; $P_t^z$ represents a component of the center of mass position change amount $P_t$ on the z axis; $P_t^z$ corresponds to x and y coordinates of 0; $\hat{P}_t^{xy}$ represents a skew symmetric matrix of a component of the center of mass position change amount $P_t$ on a plane formed by the x and y axes; $\ddot{P}_t^{xy}$ represents a second-order derivative of a component of the center of mass position change amount $P_t$ on a plane formed by the x and y axes with respect to the interval duration t, and also represents a component of the center of mass acceleration on a plane formed by the x and y axes; $\ddot{P}_t^z$ represents a second-order derivative of a component of the center of mass position change amount $P_t$ on the z axis with respect to the interval duration t, and also represents a component of the center of mass acceleration on the z axis; $\hat{P}_t^z$ represents a skew symmetric matrix of a component of the center of mass position change amount $P_t$ on the z axis; $\hat{P}_t^{xy} \ddot{P}_t^{xy}$ represents a torque around the Z axis, and $\hat{P}_t^{xy} \ddot{P}_t^z + \hat{P}_t^z \ddot{P}_t^{xy}$ represents a torque in a direction within the xy plane. Because $\hat{P}_t^z$ and $\ddot{P}_t^z$ are collinear, $\hat{P}_t^z \ddot{P}_t^z$ is 0.

In a movement process of the legged robot, the legged robot has stable movement and a small change amount in the direction of the z axis, so that $\hat{P}_t^z$, $\ddot{P}_t^z$, and $\hat{P}_t^{xy} \ddot{P}_t^z + \hat{P}_t^z \ddot{P}_t^{xy}$ in the foregoing relations can be ignored; and $P_t^{xy}$, $\ddot{P}_t^{xy}$, and $\hat{P}_t^{xy} \ddot{P}_t^{xy}$ all have small absolute values, and therefore can be ignored. Therefore, $\hat{P}_t \ddot{P}_t$ in the foregoing relation data between an acting force to which at least one leg of the legged robot is subjected and the center of mass position P(t) of the legged robot can be ignored.

Given that within a programming period, a gesture of the legged robot at the start time point is $R_{t_s}$ and a gesture of the legged robot at the end time point is $R_{t_e}$, a gesture change of the legged robot within the programming period is $\Delta R = R_{t_e} R_{t_s}^T$, and the gesture change can represent that the gesture Y of the legged robot at the start time point changes by a rotation angle $\theta_{t_e}$ around a unit axis r to obtain the gesture $R_{t_e}$ at the end time point.

The unit axis Y and the rotation angle $\theta_{t_e}$ meet the following relation:

$$\theta_{t_e} = \cos^{-1}\left(\frac{\Delta R_{11} + \Delta R_{22} + \Delta R_{33} - 1}{2}\right)$$

$$Y = \frac{1}{2\sin(\theta_{t_e})}\begin{bmatrix}\Delta R_{32} - \Delta R_{23}\\ \Delta R_{13} - \Delta R_{31}\\ \Delta R_{21} - \Delta R_{12}\end{bmatrix}$$

where each of $R_{t_s}$, $R_{t_e}$, and $\Delta R$ is a matrix of 3 rows and 3 columns; $\Delta R_{ij}$ is an element in the ith row and the jth column in the gesture change $\Delta R$, and a value of i is 1, 2, or 3; a value of j is 1, 2, or 3; sin(•) is used for representing a sine function; cos(•) is used for representing a cosine function.

According to a curve interpolation method, curve difference calculation is performed on the rotation angle θ, to obtain relation data θ(t) between the rotation angle θ and the interval duration t, so that the relation data θ(t) meets the following relation:

$$\theta(t_s) = 0, \; \dot{\theta}(t_s) = 0, \; \theta(t_e) = \theta_{t_e}, \text{ and } \dot{\theta}(t_e) = 0$$

where $t_s$ represents the start time point, $t_e$ represents the end time point, and $\theta(t_s)=0$ represents that the rotation angle θ of the legged robot at the start time point is 0; $\dot{\theta}(t_s)=0$ represents that the angular speed of the legged robot at the start time point is 0; $\theta(t_e)=\theta_{t_e}$ represents that the rotation angle of the legged robot at the end time point is $\theta_{t_e}$, and the $\theta_{t_e}$ is a constant; $\dot{\theta}(t_e)=0$ represents that the angular speed of the legged robot at the end time point is 0.

Through the relation data θ(t), relation data R(t) between the gesture of the legged robot and the interval duration t is created, and the relation data R(t) meets the following relation:

$$R(t) = \left[I + \sin\theta(t)\hat{Y} + (1 - \cos\theta(t))\hat{Y}^2\right]R_{t_s}$$

where I represents an identity matrix of 3 rows and 3 columns; sin(•) is used for representing a sine function; cos(•) is used for representing a cosine function; θ(t) is used for representing a relation between the rotation angle θ of the legged robot and the interval duration t; Y represents the unit axis around which the gesture of the legged robot changes; Ŷ is a skew symmetric matrix of the unit axis Y; $R_{t_s}$ represents the gesture of the legged robot at the start time point.

Through the relation data R(t), relation data between a change amount of the angular momentum corresponding to the legged robot and the interval duration t is created. The relation data between the change amount of the angular momentum corresponding to the legged robot and the interval duration t meets the following relation:

$$\dot{L} = I_0^s \dot{w}_0^s - (I_0^s w_0^s) \times w_0^s$$

$$I_0^s = R_t I_0 R_t^T, \ w_0^s = Y\dot{\theta}(t), \ \dot{w}_0^s = Y\ddot{\theta}(t),$$

where $I_0$ represents the moment of inertia of the legged robot around the center of mass; Y represents the unit axis around which the gesture of the legged robot changes; $\theta(t)$ is used for representing a relation between the rotation angle $\theta$ of the legged robot and the interval duration t; $\dot{\theta}(t)$ is used for representing a relation between the angular speed of rotation of the legged robot around the unit axis and the interval duration t; $\ddot{\theta}(t)$ is used for representing a relation between the angular acceleration of rotation of the legged robot around the unit axis and the interval duration t.

Then, the relation data between the acting force to which the at least one leg of the legged robot is subjected and the center of mass position P(t) of the legged robot is converted, and the converted relation data between the acting force to which the at least one leg of the legged robot is subjected and the center of mass position P(t) of the legged robot meets the following relation:

$$Gf_0 \approx H_0 X_t' - W_g$$

$$H_0 = m \begin{bmatrix} 0_{3\times 3} & Z'_{3\times 3} \\ \hat{g} & \hat{P}^{init} \end{bmatrix}, \ X_t' = \begin{bmatrix} P_t \\ \ddot{P}_t \end{bmatrix}, \text{ and } W_g = \begin{bmatrix} g \\ m\hat{P}^{init}g - \dot{L} \end{bmatrix}.$$

where G is a constant matrix, the constant matrix $G \in \mathbb{R}^{6 \times 3Y}$ represents that the constant matrix G is a matrix of 6 rows and 3Y columns, and $\mathbb{R}$ represents a real number set in a multi-dimensional space; $f_0$ is used for representing a sum of acting forces to which at least one leg in contact with the ground of the legged robot is subjected; $H_0$ is a constant matrix; $W_g$ is a constant vector; $X'_t$ represents a set of the center of mass position change amount $P_t$ and the change amount of the center of mass acceleration $\ddot{P}_t$; m represents the mass of the legged robot; $Z'_{3\times 3}$ represents an identity matrix of 3 rows and 3 columns; $P^{init}$ is a constant vector used for representing an initiation center of mass position of the legged robot at the beginning of any movement period; $\hat{P}^{init}$ is a skew symmetric matrix of the constant vector $P^{init}$; g represents a gravity acceleration, and $g \in \mathbb{R}^{3 \times 1}$ represents that the gravity acceleration g is a 3-dimensional column vector; $\hat{g}$ represents a skew symmetric matrix of the gravity acceleration g.

The first relation data and the relation data between center of mass acceleration $\ddot{P}(t)$ corresponding to the center of mass position P(t) and the interval duration t are substituted into the foregoing converted relation data between the acting force to which the at least one leg of the legged robot is subjected and the center of mass position P(t) of the legged robot, to obtain second relation data, and the second relation data meets the following relation:

$$Gf_0 \approx HC - W_g$$

$$H = H_0 [E_t^T \ E_a^T]^T$$

where G is a constant matrix, and $f_0$ is used for representing a sum of acting forces to which at least one leg in contact with the ground of the legged robot is subjected; H represents a coefficient matrix about the interval duration t; C is a constant matrix; $W_g$ is a constant vector; $H_0$ is a constant matrix; $E_t$ represents a duration vector; $E_a$ represents a time matrix, which is obtained by performing the second-order derivation on the duration vector $E_t$ with respect to the interval duration t, and $E_a \in \mathbb{R}^{1 \times 4}$ represents that the time matrix $E_a$ is a 4-dimensional row vector; T represents transposition on a vector.

Third. Process of creating third relation data:

The third relation data is created based on a friction force constraint to which the legged robot is subjected, the fourth relation data, and the first relation data.

In a movement process of the legged robot, the legged robot is subjected to a friction force constraint: a leg in contact with the ground of the legged robot is subjected to a friction force greater than 0, and the friction force to which the leg is subjected is not less than a component force of an acting force $f_i$ to which the leg in contact with the ground is subjected in a friction force direction, to avoid generating relative slide between the leg and the ground, thereby ensuring that the legged robot can normally move. An acting force $f_i$ corresponding to each of at least one leg of the legged robot is subjected to a friction force constraint, and the following relation is met:

$$N_i'^T f_i \leq 0$$

$$N_i' = -[\mu_i n_i - o_i \ \mu_i n_i + o_i \ \mu_i n_i - t_i \ \mu_i n_i + t_i]$$

where $N'_i$ represents a vector matrix of a contact point in contact with the ground of the $i^{th}$ leg of the legged robot; $n_i$ is a normal vector of a contact point in contact with the ground of the $i^{th}$ leg of the legged robot, $n_i \in \mathbb{R}^{3 \times 1}$ represents that the normal vector $n_i$ is a 3-dimensional column vector, and $\mathbb{R}$ represents a real number set in a multi-dimensional space; $o_i$ and $t_i$ represent two tangent vectors on a plane perpendicular to the normal vector of the contact point in contact with the ground of the $i^{th}$ leg of the legged robot, the tangent vector $o_i$ and the tangent vector $t_i$ are orthogonal with each other, and $o_i, t_i \in \mathbb{R}^{3 \times 1}$ represents that the tangent vector $o_i$ and the tangent vector $t_i$ are both 3-dimensional column vectors; T represents transposition on a vector, and $\mu_i$ is a friction coefficient between the $i^{th}$ leg of the legged robot and the ground.

In a movement process of the legged robot, the legged robot is subjected to a friction force constraint. Therefore, a direction of the acting force to which the $i^{th}$ leg in contact with the ground of the legged robot is subjected is within a cone, a contact point in contact with the ground of the $i^{th}$ leg is a vertex of the cone, and a connecting line within the cone from the vertex to any point of a base circle of the cone can be used as the direction of the acting force $f_i$ to which the $i^{th}$ leg in contact with the ground is subjected. To avoid introducing a nonlinear constraint, the cone is approximately presented as a rectangular pyramid, and the acting force $f_i$ to which the $i^{th}$ leg in contact with the ground meets the following relation:

$$\begin{bmatrix} -\mu_i n_i^T \pm o_i^T \\ -\mu_i n_i^T \pm t_i^T \\ -n_i^T \\ n_i^T \end{bmatrix} f_i \leq \begin{bmatrix} 0 \\ 0 \\ -f_i^{min} \\ f_i^{max} \end{bmatrix}$$

where $\mu_i$ is a friction coefficient; $n_i$ is a normal vector of a contact point in contact with the ground of the th i leg of the legged robot, $n_i \in \mathbb{R}^{3 \times 1}$ represents that the normal vector $n_i$ is a 3-dimensional column vector, and $\mathbb{R}$ represents a real number set in a multi-dimensional space; $o_i$ and $t_i$ represent two tangent vectors on a plane perpendicular to the normal vector of the contact point in contact with the ground of the $i^{th}$ leg of the legged robot, the tangent vector $o_i$ and the tangent vector $t_i$ are orthogonal with each other, and $o_i, t_i \in \mathbb{R}^{3 \times 1}$ represents that the tangent vector $o_i$ and the tangent vector $t_i$ are both 3-dimensional column vectors; T represents transpose of a vector; $f_i^{min}$ represents a minimum value of the acting force to which the $i^{th}$ leg in contact with the ground of the legged robot is subjected in a normal direction, $f_i^{max}$ represents a maximum value of the acting force to which the $i^{th}$ leg in contact with the ground of the legged robot is subjected in the normal direction, $f_i^{min}$ and $f_i^{max}$ are both greater than 0, and each of $f_i^{min}$ and $f_i^{max}$ can be any value that is set. $-\mu_i n_i^T \pm o_i^T$ and $-\mu_i n_i^T \pm t_i^T$ are used for representing normal vectors of four side surfaces of the rectangular pyramid.

In the foregoing relation, through a constraint on component forces of the acting force $f_i$ to which the $i^{th}$ leg in contact with the ground of the legged robot is subjected on the four side surfaces of the rectangular pyramid, and a constraint on component forces of the acting force $f_i$ to which the $i^{th}$ leg in contact with the ground of the legged robot is subjected in the normal direction, the direction of the acting force $f_i$ to which the $i^{th}$ leg in contact with the ground of the legged robot is subjected is limited within the rectangular pyramid.

When a legged robot is in any position in a movement process, friction force constraints to which acting forces corresponding to all legs of the legged robot are subjected meet the following relation:

$$N^T f_0 \leq 0$$

$$N^T = \begin{bmatrix} N_1'^T & 0 & \cdots & 0 \\ 0 & N_2'^T & 0 & \vdots \\ \vdots & 0 & \ddots & 0 \\ 0 & \cdots & 0 & N_Y'^T \end{bmatrix}$$

where N represents a vector matrix of contact points in contact with the ground of all the legs of the legged robot; $f_0$ is used for representing a sum of acting forces to which at least one leg in contact with the ground of the legged robot is subjected; $N'_1$ represents a vector matrix of a contact point in contact with the ground of the first leg of the legged robot; $N'_2$ represents a vector matrix of a contact point in contact with the ground of the second leg of the legged robot; $N'_Y$ represents a vector matrix of a contact point in contact with the ground of the $Y^{th}$ leg of the legged robot; T represents transpose on a vector.

k sampling time points $(t_1, t_2, \ldots, t_k)$ are selected within the target movement duration, and G, f, N, H, and $W_g$ of the legged robot at the sampling time point $t_k$ are respectively represented as $G_k$, $N_k$, $H_k$, and $W_{gk}$. Moreover, when the legged robot is at the sampling time point $t_k$, the acting force $f_i$ to which the at least one leg in contact with the ground of the legged robot is subjected meets the following relation:

$$G_k f_k = H_k C - W_k$$

$$N_k^T f_k \leq 0$$

where $G_k$ represents a constant matrix at the sampling time point $t_k$; $f_k$ represents a sum of the acting forces corresponding to all the legs of the legged robot at the sampling time point $t_k$; $H_k$ represents a constant matrix at the sampling time point $t_k$; C is a constant matrix; $W_k$ is a constant vector at the sampling time point $t_k$; $N_k$ represents a vector matrix of contact points in contact with the ground of all the legs of the legged robot at the sampling time point $t_k$; T represents transpose of a vector.

$G_k$, $f_k$, $N_k$, $H_k$, and $W_{gk}$ are related to a situation that at least one leg of the legged robot is in contact with the ground when the legged robot is at the sampling time point $t_k$. For example, the legged robot is configured with 4 legs, which are respectively a right rear leg, a right front leg, a left rear leg, and a left front leg, and a stepping sequence of the legged robot is stepping with the right rear leg, stepping with the right front leg, stepping with the left rear leg, and stepping with the left front leg. In some embodiments, each half stepping period is stepping with the right rear leg and stepping with the right front leg, or stepping with the left rear leg and stepping with the left front leg. The legged robot repeatedly performs the stepping process of the plurality of legs according to the stepping sequence, thereby enabling the legged robot to move. The movement process of the legged robot includes eight movement stages: supporting with four legs, stepping with the right rear leg, stepping with the right front leg, supporting with four legs, supporting with four legs, stepping with the left rear leg, and stepping with the left front leg. When the legged robot is in a state of supporting with four legs, $G_k$ is a 6×12 matrix, $f_k$ is a 12×1 column vector, and $N_k$ is a 16×12 matrix. When the robot is in a different stage, the quantity of footholds, the position, and other related information may change.

The second relation data created through the fourth relation data and the first relation data meets the following relation:

$$J = J_{grf} + J_{len} + J_{tgt}$$

where J represents the target value; $J_{grf}$ is used for representing a weighted sum of squares of the acting force $f_i$ corresponding to the at least one leg, $J_{len}$ is used for representing a weighted sum of squares of the plurality of distances, and $J_{tgt}$ is used for representing a weighted sum of squares of the first difference between the prediction center of mass position and the target center of mass position, the third difference between the prediction center of mass speed the target center of mass speed, and the second difference between the prediction center of mass acceleration and the target center of mass acceleration when the legged robot is in the termination position.

After the second relation data is created, assuming that the start time point t is 0 when the legged robot is in the initiation position, based on the selected B sampling time points, the value of the constant C when the target value J is the minimum value is determined according to the following relation:

$$\begin{cases} J = J_{grf} + J_{len} + J_{tgt} \\ H_k C - W_k - \delta_k \le G_k f_k \le H_k C - W_k + \delta_k \\ N_k^T f_k \le 0, \ k = 1, 2, \dots, B \\ P(0) = 0, \ \dot{P}(0) = v_0, \ \ddot{P}(0) = a_0 \end{cases}$$

where $J_{grf}$ is used for representing a weighted sum of squares of the acting force $f_i$ corresponding to the at least one leg, $J_{len}$ is used for representing a weighted sum of squares of the plurality of distances, and $J_{tgt}$ is used for representing a weighted sum of squares of the first difference between the prediction center of mass position and the target center of mass position, the third difference between the prediction center of mass speed the target center of mass speed, and the second difference between the prediction center of mass acceleration and the target center of mass acceleration when the legged robot is in the termination position; $G_k$ represents a constant matrix at the sampling time point $t_k$; $f_k$ represents a sum of the acting forces corresponding to all the legs of the legged robot at the sampling time point $t_k$; $H_k$ represents a constant matrix at the sampling time point $t_k$; C is a constant matrix; $W_k$ is a constant vector at the sampling time point $t_k$; $\delta_k$ is a constant vector, which is a vector formed by a group of same integers; $N_k$ represents a vector matrix of contact points in contact with the ground of all the legs of the legged robot at the sampling time point $t_k$; B is the total quantity of sampling time points, and k is the kth sampling time point of B sampling time points; P(0)=0 represents that the center of mass position change amount of the legged robot in the initiation position determined based on the first relation data is 0; $\dot{P}(0)=v_0$ represents that the initiation center of mass speed of the legged robot in the initiation position determined based on the first relation data is $v_0$; $\ddot{P}(0)=a_0$ represents that the initiation center of mass acceleration of the legged robot in the initiation position determined based on the first relation data is $a_0$.

The center of mass position determining method provided in this embodiment of this application is applicable to various legged robots, for example, a two-legged robot, a four-legged robot or a six-legged robot; is applicable to various gaits of the legged robot, for example, two-legged walking, four-legged diagonal gait, four-legged crawling gait, and six-legged diagonal gait; is applicable to various complex environments, for example, a flat ground, an uneven ground, a slope, or stairs; can use any order of the interval duration t, and can use any movement process in the process from the initiation position to the termination position; and can keep, when the ground is a plane or has a relatively small height difference, the height of the center of mass of the robot unchanged, and use only 2 groups of curves to plan movement of the center of mass in the plane. Continuity constraints such as curve position, speed, acceleration may be added according to actual requirements, and it is necessary to ensure that a curve parameter having a constraint added still has an independent variable. When sampling time points are selected, sampling can be performed in any position on the trajectory of the center of mass position, and a larger quantity of sampling time points indicates more proper distribution, and a more reliable center of mass movement trajectory obtained, but a larger dimension and a longer solving time of the quadratic programming problem. Additionally, in the second relation data, the acting force to which the at least one leg in contact with the ground of the legged robot is subjected, and the distance corresponding to the sampling time point both have components in three directions of the x axis, the y axis, and the z axis, and different weights can be respectively selected on the x axis, the y axis, and the z axis according to an actual situation, to determine a weighted sum of squares of acting forces, and a weighted sum of squares of distances. Additionally, in the second relation data, in addition to the acting force of the ground and the curve oscillation amplitude, a sum of squares of accelerations, a sum of squares of speed differences between neighboring points, a sum of squares of differences between accelerations, and the like can be further considered. Position of a contact point: the contact point is not merely limited to a contact point in contact with the ground on a leg of the legged robot, and is similarly applicable to a case that a part of the robot such as the body, the trunk, or the upper limb is in contact with an environment. Based on the center of mass position determining method provided in this embodiment of this application, when a term with a relatively small effect is ignored, the center of mass position constraint, the center of mass speed constraint, the center of mass acceleration constraint, and the ground friction force constraint are fully considered, the center of mass trajectory programming problem is converted in to a quadratic programming problem, and a center of mass trajectory of movement of the legged robot is determined by using the quadratic programming problem. in the quadratic programming problem, the friction force constraint of the contact point on the ground and various optimization indexes are fully considered, to ensure feasibility and efficiency of the generated movement.

Figure 13:
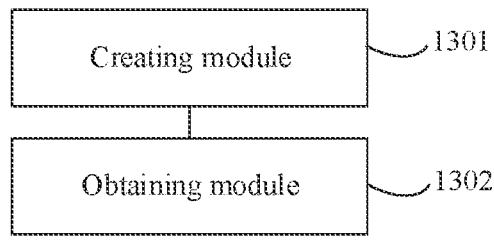
FIG. 13 is a schematic structural diagram of a center of mass position determining apparatus according to an embodiment of this application.

FIG. 13 is a schematic structural diagram of a center of mass position determining apparatus according to an embodiment of this application. As shown in FIG. 13, the apparatus includes:

a creating module 1301, configured to create first relation data, the first relation data indicating a relation between an interval duration t and a center of mass position P(t) of a legged robot, and the first relation data including a first constant C;

the creating module 1301 being further configured to create second relation data corresponding to at least one leg configured for the legged robot, the second relation data corresponding to the at least one leg separately indicating a relation between an acting force $f_i$ corresponding to the at least one leg and the center of mass position P(t), and the second relation data including the first constant C;

the creating module 1301 being further configured to create third relation data based on the second relation data corresponding to the at least one leg, and determining a value of the first constant C when a target value J is a minimum value, the third relation data indicating a positive correlation between the target value J and a square of an acting force $f_i$ to which the at least one leg in contact with the ground is subjected; and an obtaining module 1302, configured to obtain the first relation data corresponding to the first constant C whose value is determined.

Figure 14:
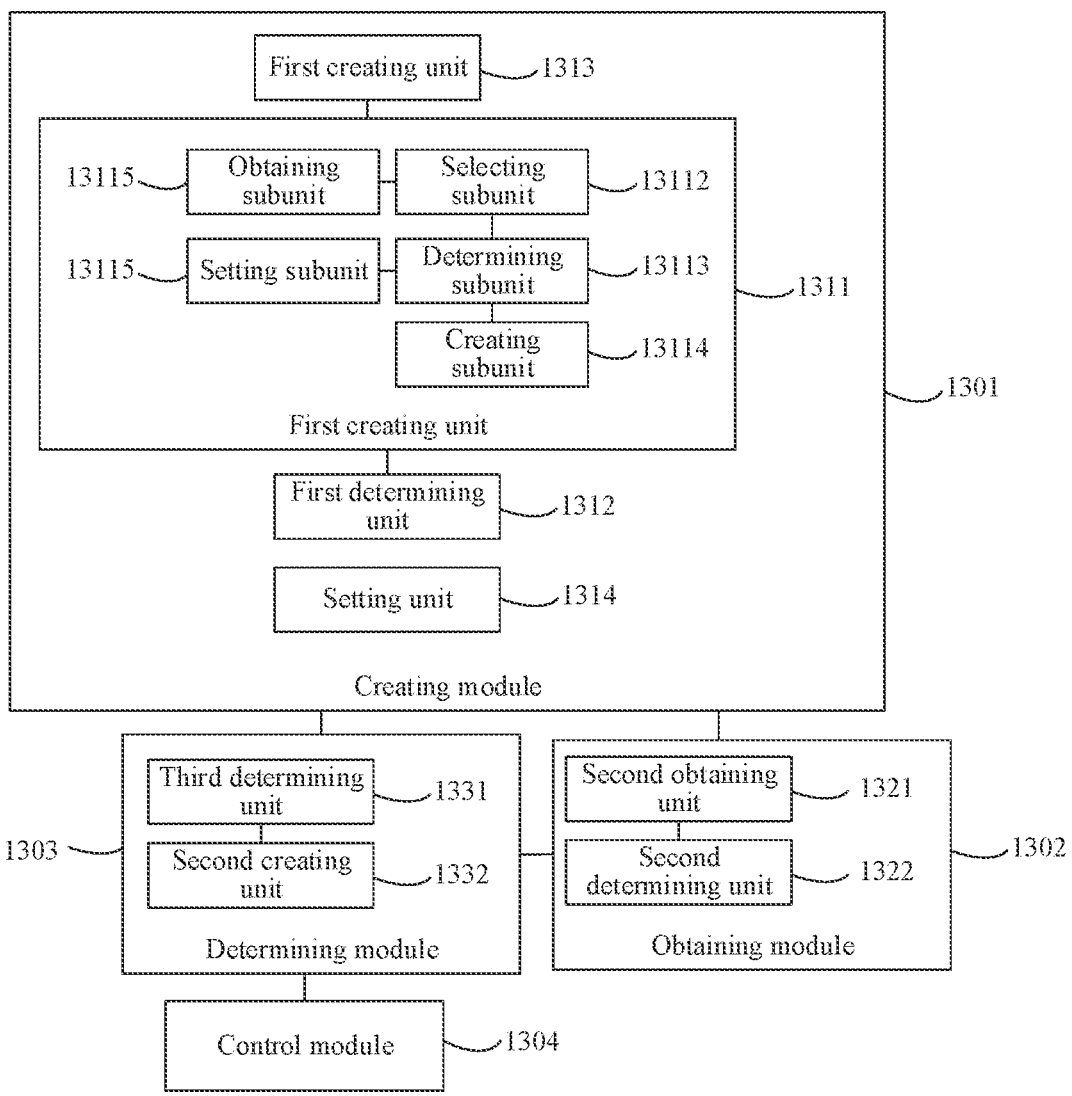
FIG. 14 is a schematic structural diagram of a center of mass position determining apparatus according to an embodiment of this application.

In a possible implementation, as shown in FIG. 14, the creating module 1301 includes:

a first creating unit 1311, configured to create the third relation data based on the first relation data and the second relation data corresponding to the at least one leg; and a first determining unit 1312, configured to determine, based on the third relation data, the value of the first constant C when the target value J is the minimum value.

In another possible implementation, as shown in FIG. 14, the creating module 1301 includes:

a first obtaining unit 1313, configured to obtain first state data and second state data of the legged robot in an initiation position and a termination position respectively, where the state data includes at least center of mass positions, center of mass speeds, and center of mass accelerations; and the first creating unit 1311 is further configured to create the first relation data, where the first relation data includes the first constant C, the first constant C includes a second constant $C_{free}$ whose value is not determined and a third constant h whose value is determined, and the third constant h is determined based on the obtained state data.

In another possible implementation, as shown in FIG. 14, the creating module 1301 includes:

a setting unit 1314, configured to set the first relation data as follows: the center of mass position P(t) is a product of the first constant C and a duration matrix E; and $$E = \begin{bmatrix} E_t & 0 & 0 \\ 0 & E_t & 0 \\ 0 & 0 & E_t \end{bmatrix}, \text{ and } E_t = [\,1 \quad t \quad t^2 \quad t^3\,]$$

where $E_t$ represents a duration vector.

In another possible implementation, as shown in FIG. 14, the creating module 1301 includes:

a setting unit 1314, configured to set second relation data corresponding to at least one leg as follows: an acting force $f_i$ corresponding to an $i^{th}$ leg is a sum of the first constant C and a linear mapping of a fourth constant λ corresponding to the $i^{th}$ leg.

In another possible implementation, as shown in FIG. 14, the first creating unit 1311 includes:

an obtaining subunit 13111, configured to obtain a movement duration required for the legged robot to move from an initiation position to a termination position;

a selecting subunit 13112, configured to select a plurality of sampling time points within the movement duration;

a determining subunit 13113, configured to determine, based on an interval duration between each sampling time point and a start time point and the first relation data, fourth relation data corresponding to the each sampling time point, where the fourth relation data indicates a relation between the first constant C and a sampling center of mass position Q(C), and the sampling center of mass position Q(C) indicates a center of mass position of the legged robot at the corresponding sampling time point;

the determining subunit 13113 being further configured to determine, based on the second relation data corresponding to the at least one leg and the fourth relation data, fifth relation data corresponding to the each sampling time point, where the fifth relation data indicates a relation between the first constant C and the acting force $f_i$ corresponding to the at least one leg; and a creating subunit 13114, configured to create the third relation data based on the fourth relation data and the fifth relation data, where the third relation data further indicates a positive correlation between the target value J and a square of the acting force corresponding to the at least one leg corresponding to the each sampling time point and the sampling center of mass position Q(C).

In another possible implementation, the creating subunit 13114 is configured to set the target value J to a sum value of a weighted sum of squares of a plurality of distances and a weighted sum of squares of the acting force $f_i$ corresponding to the at least one leg, where the plurality of distances include a distance between any two neighboring center of mass positions of a center of mass position in the initiation position, a plurality of sampling center of mass positions, and a center of mass position in the termination position.

In another possible implementation, the determining subunit 13113 is configured to determine, based on a stepping sequence of the legged robot, a stepping duration corresponding to the at least one leg, and the interval duration between the each sampling time point and the start time point, a leg of the legged robot in contact with the ground at the each sampling time point, where the stepping sequence indicates a stepping sequence of a plurality of legs of the legged robot, and a stepping duration corresponding to the leg is a duration from raising to lowering of the leg; and determining the fifth relation data based on each sampling center of mass position Q(C), the second relation data corresponding to the at least one leg, and the leg in contact with the ground at the each sampling time point.

In another possible implementation, as shown in FIG. 14, the apparatus further includes:

the obtaining module 1302 is further configured to obtain second state data of the legged robot in a termination position;

a determining module 1303, configured to determine, based on a target movement duration and the first relation data, prediction state data of the legged robot in the termination position; and the creating module 1301 includes:

a first creating unit 1311, configured to create the third relation data based on a state data error between the second state data and the prediction state data, where the third relation data indicates a positive correlation between the target value J and the state data error and the square of the acting force $f_i$ to which the at least one leg in contact with the ground is subjected; and a first determining unit 1312, configured to determine, based on the second relation data and the third relation data, the value of the first constant C when the target value J is the minimum value.

In another possible implementation, the second state data includes a target center of mass position, and the prediction state data includes a prediction center of mass position; and as shown in FIG. 14, the first creating unit 1311 includes:

a determining subunit 13113, configured to determine a first difference between the target center of mass position and the prediction center of mass position; and a setting subunit 13115, configured to set the target value J to a sum value of a weighted sum of squares of the acting force $f_i$ corresponding to the at least one leg, and a square of the first difference.

In another possible implementation, the second state data includes a target center of mass acceleration, and the prediction state data includes a prediction center of mass acceleration; and as shown in FIG. 14, the first creating unit 1311 includes:

a determining subunit 13113, configured to determine a second difference between the target center of mass acceleration and the prediction center of mass acceleration; and a setting subunit 13115, configured to set the target value J to a sum value of a weighted sum of squares of the acting force $f_i$ corresponding to the at least one leg, and a square of the second difference.

In another possible implementation, the second state data includes a target center of mass speed, and the prediction state data includes a prediction center of mass speed; and as shown in FIG. 14, the first creating unit 1311 includes:

a determining subunit 13113, configured to determine a third difference between the target center of mass speed and the prediction center of mass speed; and a setting subunit 13115, configured to set the target value J to a sum value of a weighted sum of squares of the acting force $f_i$ corresponding to the at least one leg, and a square of the third difference.

In another possible implementation, as shown in FIG. 14, the first creating unit 1311 includes:

a selecting subunit 13112, configured to select a plurality of sampling time points within the target movement duration;

a determining subunit 13113, configured to determine, based on an interval duration between each sampling time point and a start time point and the first relation data, fourth relation data corresponding to the each sampling time point, where the fourth relation data indicates a relation between the first constant C and a sampling center of mass position Q(C); and a creating subunit 13114, configured to create the third relation data based on the state data error and the fourth relation data, where the third relation data indicates a positive correlation between the target value J and a square of the acting force $f_i$ corresponding to the at least one leg corresponding to the each sampling time point, the state data error, and the sampling center of mass position Q(C).

In another possible implementation, the second state data includes a target center of mass position, and the prediction state data includes a prediction center of mass position; and the creating subunit 13114 is configured to determine a first difference between the target center of mass position and the prediction center of mass position; and set the target value J to a sum value of a first value, a second value, and a third value, where the first value is a square of the first difference, the second value is a weighted sum of squares of a plurality of distances, the plurality of distances include a distance between any two neighboring center of mass positions of a center of mass position in an initiation position, a plurality of sampling center of mass positions, and the prediction center of mass position, and the third value is a weighted sum of squares of the acting force $f_i$ corresponding to the at least one leg corresponding to the each sampling time point.

In another possible implementation, the second state data includes a target center of mass acceleration, and the prediction state data includes a prediction center of mass acceleration; and the creating subunit 13114 is configured to determine a second difference between the target center of mass acceleration and the prediction center of mass acceleration; and set the target value J to a sum value of a second value, a third value, and a fourth value, where the fourth value is a square of the second difference, the second value is a weighted sum of squares of a plurality of distances, the plurality of distances include a distance between any two neighboring center of mass positions of an initiation center of mass position in an initiation position, a plurality of sampling center of mass positions, and the prediction center of mass position, and the third value is a weighted sum of squares of the acting force $f_i$ corresponding to the at least one leg corresponding to the each sampling time point.

In another possible implementation, the second state data includes a target center of mass speed, and the prediction state data includes a prediction center of mass speed; and the creating subunit 13114 is configured to determine a third difference between the target center of mass speed and the prediction center of mass speed; and set the target value J to a sum value of a second value, a third value, and a fifth value, where the fifth value is a square of the third difference, the second value is a weighted sum of squares of a plurality of distances, the plurality of distances include a distance between any two neighboring center of mass positions of an initiation center of mass position in an initiation position, a plurality of sampling center of mass positions, and the prediction center of mass position, and the third value is a weighted sum of squares of the acting force $f_i$ corresponding to the at least one leg corresponding to the each sampling time point.

In another possible implementation, the first creating unit 1311 is further configured to create sixth relation data, where the sixth relation data indicates a relation between an angular momentum L of the legged robot and the interval duration t;

the first creating unit 1311 is further configured to create seventh relation data, where the seventh relation data indicates a negative correlation between the acting force $f_i(L)$ corresponding to the at least one leg and the angular momentum L; and the first creating unit 1311 is further configured to create, based on the sixth relation data and the seventh relation data, the second relation data corresponding to the at least one leg.

In another possible implementation, the first determining unit 1312 is configured to create eighth relation data, ninth relation data, and tenth relation data based on the first relation data and a start time point, where the eighth relation data indicates a relation between an initiation center of mass position of the legged robot in an initiation position and the first constant C, the ninth relation data indicates a relation between an initiation center of mass speed of the legged robot in the initiation position and the first constant C, and the tenth relation data indicates a relation between an initiation center of mass acceleration of the legged robot in the initiation position and the first constant C; and determine, based on the eighth relation data, the ninth relation data, the tenth relation data, the second relation data, and the third relation data, the value of the first constant C when the target value J is the minimum value.

In another possible implementation, the second state data includes a target center of mass position, and as shown in FIG. 14, the obtaining module 1302 includes:

a second obtaining unit 1321, configured to obtain, when the legged robot is in the termination position, a position of a contact point in contact with the ground of the at least one leg configured for the legged robot; and a second determining unit 1322, configured to determine the target center of mass position based on the position of the contact point of the at least one leg.

In another possible implementation, the second state data further includes a target center of mass speed, and the obtaining module 1302 is further configured to obtain first state data of the legged robot in an initiation position, where the first state data includes at least an initiation center of mass position; and the determining module 1303 is further configured to determine a ratio of a distance between the target center of mass position and the initiation center of mass position to the target movement duration as the target center of mass speed.

In another possible implementation, the second state data further includes a target center of mass acceleration, and the first state data further includes an initiation center of mass speed; and the determining module 1303 is further configured to determine a ratio of a difference between the target center of mass speed and the initiation center of mass speed to the target movement duration as the target acceleration.

In another possible implementation, the prediction state data includes a prediction center of mass position, and as shown in FIG. 14, the determining module 1303 includes:

a third determining unit 1331, configured to determine, based on the first relation data, the prediction center of mass position of the legged robot after the target movement duration away from an initiation position.

In another possible implementation, the prediction state data includes a prediction center of mass speed, and as shown in FIG. 14, the determining module 1303 includes:

a second creating unit 1332, configured to create, based on the first relation data, relation data between the interval duration t and a center of mass speed of the legged robot; and a third determining unit 1331, configured to determine, based on the relation data between the interval duration t and the center of mass speed of the legged robot, the prediction center of mass speed of the legged robot after the target movement duration away from an initiation position.

In another possible implementation, the prediction state data includes a prediction center of mass acceleration, and as shown in FIG. 14, the determining module 1303 includes:

a second creating unit 1332, configured to create, based on the first relation data, relation data between the interval duration t and a center of mass acceleration of the legged robot; and a third determining unit 1331, configured to determine, based on the relation data between the interval duration t and the center of mass acceleration of the legged robot, the prediction center of mass acceleration of the legged robot after the target movement duration away from an initiation position.

In another possible implementation, after the first relation data corresponding to the first constant C whose value is determined is obtained, as shown in FIG. 14, the apparatus further includes:

a determining module 1303, configured to determine, based on the first relation data, a center of mass position $P(t_o)$ of the legged robot within any interval duration $t_o$ in a movement process of the legged robot;

the determining module 1303 being further configured to determine, based on the center of mass position $P(t_o)$ and the termination position, joint torques of a plurality of joints of the legged robot; and a control module 1304, configured to control, according to the joint torques of the plurality of joints, the plurality of joints to rotate, to drive the legged robot to move.

When the center of mass position determining apparatus provided in the foregoing embodiment obtains the first relation data, it is illustrated with an example of division of functional modules. During practical application, the function distribution may be implemented by different functional modules according to requirements, that is, an internal structure of the legged robot or control device is divided into different functional modules, to implement all or some of the functions described above. In addition, the center of mass position determining apparatus and center of mass position determining method embodiments provided in the foregoing embodiments belong to the same conception. For the specific implementation process, reference may be made to the method embodiments, and details are not described herein again.

An embodiment of this application further provides a legged robot, including: a processor and a memory, the memory storing at least one computer program, and the at least one computer program being loaded and executed by the processor to implement operations performed in the center of mass position determining method according to the foregoing embodiments.

Figure 15:
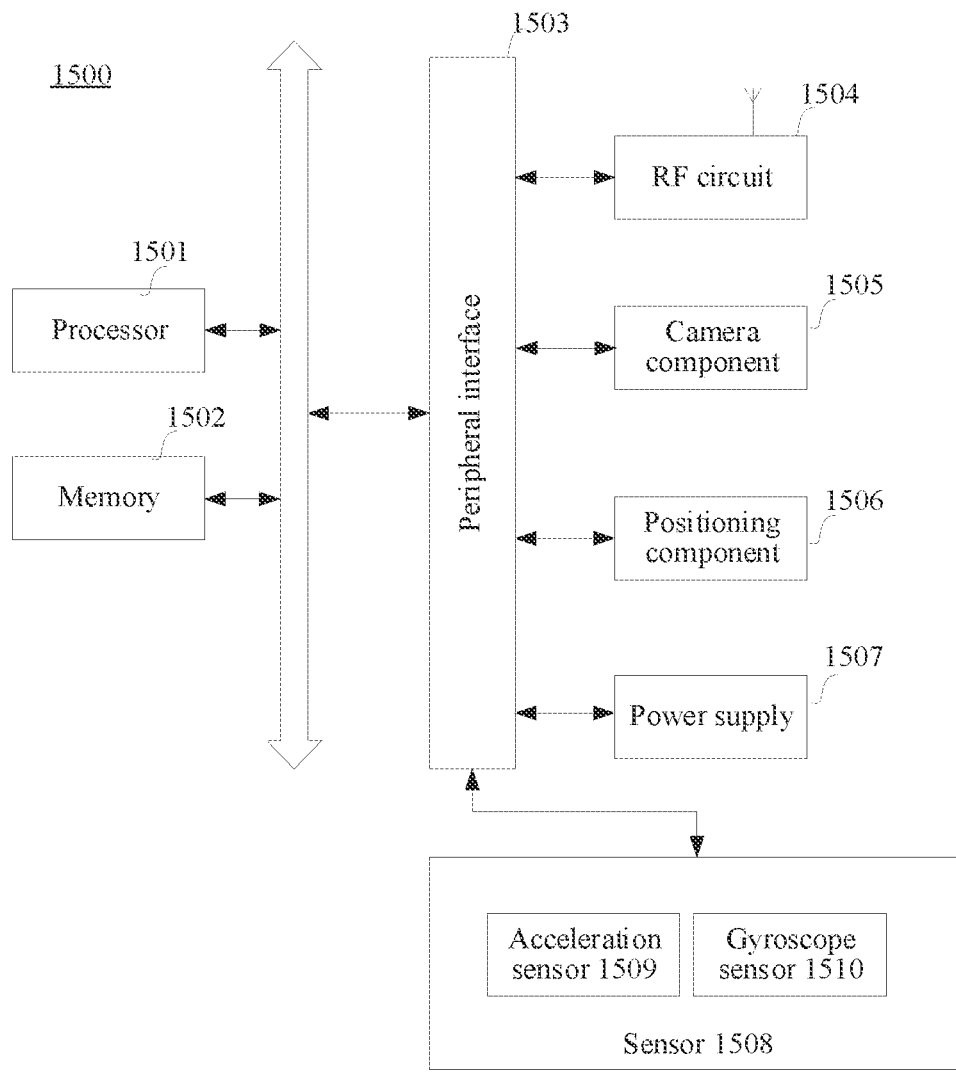
FIG. 15 is a schematic structural diagram of a legged robot according to an embodiment of this application.

FIG. 15 is a schematic structural diagram of a legged robot 1500 according to an exemplary embodiment of this application. The legged robot 1500 is configured to perform steps performed by the legged robot in the foregoing center of mass position determining method.

The legged robot 1500 includes a processor 1501 and a memory 1502.

The processor 1501 may include one or more processing cores, for example, a 4-core processor or a 15-core processor. The memory 1502 may include one or more (e.g., non-transitory) computer-readable storage media. The computer-readable storage medium may be non-transient and is configured to store at least one computer program, the at least one computer program being configured to be executed by the processor 1501 to implement the center of mass position determining method provided in the method embodiments of this application.

In some embodiments, the legged robot 1500 includes: a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. In some embodiments, the peripheral includes at least one of a radio frequency (RF) circuit 1504, a display screen 1505, a camera component 1505, an audio circuit 1507, a positioning component 1506, and a power supply 1507.

The peripheral interface 1503 may be configured to connect the at least one peripheral related to input/output (I/O) to the processor 1501 and the memory 1502.

The RF circuit 1504 is configured to receive and transmit an RF signal, also referred to as an electromagnetic signal. The RF circuit 1504 communicates with a communication network and other communication devices through the electromagnetic signal.

The camera component 1505 is configured to capture images or videos. In some embodiments, the camera component 1505 includes a front-facing camera and a rear-facing camera. The front-facing camera is disposed on the front panel of the terminal, and the rear-facing camera is disposed on a back face of the terminal.

The positioning component 1506 is configured to determine a current geographic location of the legged robot 1500, to implement a navigation or a location based service (LBS). The positioning component 1506 may be a positioning component based on the global positioning system (GPS) of the United States, the BeiDou System of China, and the GALILEO System of Russia.

The power supply 1507 is configured to supply power to components in the legged robot 1500. The power supply 1507 may be an alternating current, a direct current, a disposable battery, or a rechargeable battery. When the power supply 1507 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the legged robot 1500 further includes one or more sensors 1508. The one or more sensors 1508 include, but are not limited to: an acceleration sensor 1509 and a gyroscope sensor 1510.

The acceleration sensor 1509 may detect accelerations on three coordinate axes of a coordinate system established by the legged robot 1500. For example, the acceleration sensor 1509 may be configured to detect components of the gravity acceleration on the three coordinate axes. The processor 1501 may control, according to a gravity acceleration signal collected by the acceleration sensor 1509, the display screen to display the user interface in a landscape view or a portrait view. The acceleration sensor 1509 may be further configured to acquire game or user movement data.

The gyroscope sensor 1510 may detect a body direction and a rotation angle of the legged robot 1500. The gyroscope sensor 1510 may acquire a 3D action of the user on the legged robot 1500 together with the acceleration sensor 1509. The processor 1501 may implement the following functions according to the data collected by the gyroscope sensor 1510: movement sensing (such as changing the UI according to a tilt operation of the user), image stabilization during shooting, game control, and inertial navigation.

A person skilled in the art may understand that the structure shown in FIG. 15 does not constitute a limitation on the legged robot 1500, and the terminal may include more or fewer components than those shown in the figure, or some components may be combined, or a different component deployment may be used.

An embodiment of this application further provides a control device, including: a processor and a memory, the memory storing at least one computer program, and the at least one computer program being loaded and executed by the processor to implement operations performed in the center of mass position determining method according to the foregoing embodiments.

Figure 16:
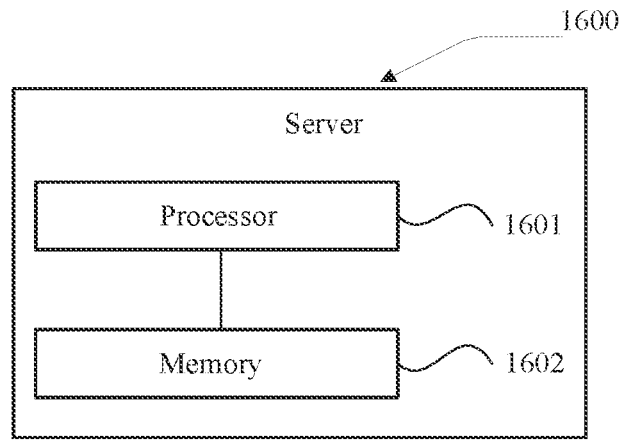
FIG. 16 is a schematic structural diagram of a server according to an embodiment of this application.

In some embodiments, the computer device is provided as a server. FIG. 16 is a schematic structural diagram of a server according to an embodiment of this application. The server 1600 may vary greatly due to different configurations or performance, and may include one or more processors (such as CPUs) 1601 and one or more memories 1602. The memory 1602 stores at least one computer program, the at least one computer program being loaded and executed by the processor 1601 to implement the methods provided in the foregoing method embodiments. Certainly, the server may also have a wired or wireless network interface, a keyboard, an input/output interface and other components to facilitate input/output. The server may also include other components for implementing device functions. Details are not described herein again.

An embodiment of this application further provides a computer-readable storage medium (e.g., a non-transitory computer-readable storage medium). The computer-readable storage medium stores at least one computer program, the at least one computer program being loaded and executed by a processor to implement operations performed in the center of mass position determining method according to the foregoing embodiments.

An embodiment of this application further provides a computer program product or a computer program. The computer program product or the computer program stores computer program code, the computer program code being stored in a computer-readable storage medium. A processor of a control device reads the computer program code from the computer-readable storage medium, and the processor executes the computer program code, to cause the control device to implement operations performed in the center of mass position determining method according to the foregoing embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of the embodiments of this application, and are not intended to limit the embodiments of this application. Any modification, equivalent replacement, or improvement made within the spirit and principle of the embodiments of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs center of mass determination and/or joint or movement control. In practical application, the foregoing functions may be allocated to and completed by different functional modules according to requirements, that is, an inner structure of a device is divided into different functional modules to implement all or a part of the functions described above.

What is claimed is:

1. A center of mass position determining method performed by a control device connected to a legged robot, the method comprising:
   creating first relation data, the first relation data indicating a relation between an interval duration t and a center of mass position P(t) of the legged robot, and wherein the center of mass position P(t) varies as a function of the interval duration t and a first constant C according to the first relation data;
   creating second relation data corresponding to the at least one leg of the legged robot, the second relation data indicating a relation between a force $f_i$ corresponding to the at least one leg with the ground and the center of mass position P(t), and wherein the force $f_i$ corresponding to the at least one leg with the ground varies as a function of the center of mass position P(t) and the first constant C according to the second relation data;
   creating third relation data based on the second relation data, the third relation data indicating a positive correlation between a target value J and a square of the force $f_i$ to which the at least one leg in contact with the ground is subjected, wherein the third relation data defines a quadratic programming problem in which the target value J varies as a function of a square of the force $f_i$ to which the at least one leg in contact with the ground is subjected;
   solving the quadratic programming problem by (i) applying different values for the first constant C to the center of mass position P(t) according to the first relation data and (ii) applying different values of the center of mass position P(t) corresponding to the different values for the first constant C to the force $f_i$ corresponding to the at least one leg with the ground according to the second relation data and (iii) applying different values of the force $f_i$ corresponding to the at least one leg with the ground to the target value J according to the third relation data until the target value J is minimized;
   determining, among the different values for the first constant C used for solving the quadratic programming problem, a value of the first constant C when the target value J is minimized as an optimized solution to the quadratic programming problem; and
   obtaining the first relation data according to the determined value of the first constant C, wherein the first relation data defines a trajectory of the center of mass position P(t) of the legged robot based on a movement of the legged robot as a function of time.

2. The method according to claim 1, wherein creating third relation data comprises:
   creating the third relation data based on the first relation data and the second relation data corresponding to the at least one leg; and
   determining, based on the third relation data, the value of the first constant C when the target value J is the minimum value.

3. The method according to claim 2, wherein the creating first relation data comprises:
   obtaining first state data and second state data of the legged robot in an initiation position and a termination position respectively, wherein the state data comprises at least center of mass positions, center of mass speeds, and center of mass accelerations; and
   creating the first relation data, wherein the first relation data comprises the first constant C, the first constant C comprises a second constant $C_{free}$ whose value is not determined and a third constant h whose value is determined, and the third constant h is determined based on the obtained state data.

4. The method according to claim 2, wherein creating the first relation data comprises:
   setting the first relation data as follows: the center of mass position P(t) is a product of the first constant C and a duration matrix E; and $$E = \begin{bmatrix} E_t & 0 & 0 \\ 0 & E_t & 0 \\ 0 & 0 & E_t \end{bmatrix}; \text{and } E_t = \begin{bmatrix} 1 & t & t^2 & t^3 \end{bmatrix}$$

wherein $E_t$ represents a duration vector.

5. The method according to claim 2, wherein creating the second relation data comprises:
   setting the second relation data corresponding to the at least one leg as follows: an acting force $f_i$ corresponding to an $i^{th}$ leg is a sum of the first constant C and a linear mapping of a fourth constant λ corresponding to the $i^{th}$ leg.

6. The method according to claim 2, wherein creating the third relation data based on the first relation data and the second relation data comprises:
   obtaining a movement duration required for the legged robot to move from an initiation position to a termination position;
   selecting a plurality of sampling time points within the movement duration;
   determining, based on an interval duration between each sampling time point and a start time point and the first relation data, fourth relation data corresponding to the each sampling time point, wherein the fourth relation data indicates a relation between the first constant C and a sampling center of mass position Q(C), and the sampling center of mass position Q(C) indicates a center of mass position of the legged robot at the corresponding sampling time point;
   determining, based on the second relation data corresponding to the at least one leg and the fourth relation data, fifth relation data corresponding to the each sampling time point, wherein the fifth relation data indicates a relation between the first constant C and the acting force $f_i$ corresponding to the at least one leg; and
   creating the third relation data based on the fourth relation data and the fifth relation data, wherein the third relation data further indicates a positive correlation between the target value J and a square of the acting force $f_i$ corresponding to the at least one leg corresponding to the each sampling time point and the sampling center of mass position Q(C).

7. The method according to claim 6, wherein creating the third relation data based on the fourth relation data and the fifth relation data comprises:
   setting the target value J to a sum value of a weighted sum of squares of a plurality of distances and a weighted sum of squares of the acting force $f_i$ corresponding to the at least one leg, wherein the plurality of distances comprise a distance between any two neighboring center of mass positions of a center of mass position in the initiation position, a plurality of sampling center of mass positions, and a center of mass position in the termination position.

8. The method according to claim 6, wherein determining the fifth relation data comprises:
   determining, based on a stepping sequence of the legged robot, a stepping duration corresponding to the at least one leg, and the interval duration between the each sampling time point and the start time point, a leg of the legged robot in contact with the ground at the each sampling time point, wherein the stepping sequence indicates a stepping sequence of a plurality of legs of the legged robot, and a stepping duration corresponding to the leg is a duration from raising to lowering of the leg; and
   determining the fifth relation data based on each sampling center of mass position Q(C), the second relation data corresponding to the at least one leg, and the leg in contact with the ground at the each sampling time point.

9. The method according to claim 1, further comprising:
   obtaining second state data of the legged robot in a termination position; and
   determining, based on a target movement duration and the first relation data, prediction state data of the legged robot in the termination position; and
   creating the third relation data comprises:
      creating the third relation data based on a state data error between the second state data and the prediction state data, wherein the third relation data indicates a positive correlation between the target value J and the state data error and the square of the acting force $f_i$ to which the at least one leg in contact with the ground is subjected; and
      determining, based on the second relation data and the third relation data, the value of the first constant C in a case that the target value J is the minimum value.

10. The method according to claim 9, wherein the second state data comprises a target center of mass position, and the prediction state data comprises a prediction center of mass position; and the creating the third relation data based on a state data error between the second state data and the prediction state data comprises:
    determining a first difference between the target center of mass position and the prediction center of mass position; and
    setting the target value J to a sum value of a weighted sum of squares of the acting force $f_i$ corresponding to the at least one leg, and a square of the first difference.

11. The method according to claim 9, wherein the second state data comprises a target center of mass acceleration, and the prediction state data comprises a prediction center of mass acceleration; and the creating the third relation data based on a state data error between the second state data and the prediction state data comprises:
    determining a second difference between the target center of mass acceleration and the prediction center of mass acceleration; and
    setting the target value J to a sum value of a weighted sum of squares of the acting force $f_i$ corresponding to the at least one leg, and a square of the second difference.

12. The method according to claim 9, wherein:
    the second state data comprises a target center of mass speed; and
    the prediction state data comprises a prediction center of mass speed; and
    creating the third relation data based on a state data error between the second state data and the prediction state data comprises:
       determining a third difference between the target center of mass speed and the prediction center of mass speed; and
       setting the target value J to a sum value of a weighted sum of squares of the acting force $f_i$ corresponding to the at least one leg, and a square of the third difference.

13. The method according to claim 9, wherein creating the third relation data based on a state data error between the second state data and the prediction state data comprises:
    selecting a plurality of sampling time points within the target movement duration;
    determining, based on an interval duration between each sampling time point and a start time point and the first relation data, fourth relation data corresponding to the each sampling time point, wherein the fourth relation data indicates a relation between the first constant C and a sampling center of mass position Q(C);
    creating the third relation data based on the state data error and the fourth relation data, wherein the third relation data indicates a positive correlation between the target value J and a square of the acting force $f_i$ corresponding to the at least one leg corresponding to the each sampling time point, the state data error, and the sampling center of mass position Q(C).

14. The method according to claim 13, wherein the second state data comprises a target center of mass position, and the prediction state data comprises a prediction center of mass position; and the creating the third relation data based on the state data error and the fourth relation data comprises:
    determining a first difference between the target center of mass position and the prediction center of mass position; and
    setting the target value J to a sum value of a first value, a second value, and a third value, wherein the first value is a square of the first difference, the second value is a weighted sum of squares of a plurality of distances, the plurality of distances comprise a distance between any two neighboring center of mass positions of a center of mass position in an initiation position, a plurality of sampling center of mass positions, and the prediction center of mass position, and the third value is a weighted sum of squares of the acting force $f_i$ corresponding to the at least one leg corresponding to the each sampling time point.

15. The method according to claim 13, wherein the second state data comprises a target center of mass acceleration, and the prediction state data comprises a prediction center of mass acceleration; and the creating the third relation data based on the state data error and the fourth relation data comprises:
    determining a second difference between the target center of mass acceleration and the prediction center of mass acceleration; and
    setting the target value J to a sum value of a second value, a third value, and a fourth value, wherein the fourth value is a square of the second difference, the second value is a weighted sum of squares of a plurality of distances, the plurality of distances comprise a distance between any two neighboring center of mass positions of an initiation center of mass position in an initiation position, a plurality of sampling center of mass positions, and the prediction center of mass position, and the third value is a weighted sum of squares of the acting force $f_i$ corresponding to the at least one leg corresponding to the each sampling time point.

16. The method according to claim 13, wherein the second state data comprises a target center of mass speed, and the prediction state data comprises a prediction center of mass speed; and the creating the third relation data based on the state data error and the fourth relation data comprises:
determining a third difference between the target center of mass speed and the prediction center of mass speed; and
setting the target value J to a sum value of a second value, a third value, and a fifth value, wherein the fifth value is a square of the third difference, the second value is a weighted sum of squares of a plurality of distances, the plurality of distances comprise a distance between any two neighboring center of mass positions of an initiation center of mass position in an initiation position, a plurality of sampling center of mass positions, and the prediction center of mass position, and the third value is a weighted sum of squares of the acting force $f_i$ corresponding to the at least one leg corresponding to the each sampling time point.

17. The method according to claim 9, wherein the second state data comprises a target center of mass position, and obtaining the second state data of the legged robot in the termination position comprises:
obtaining, when the legged robot is in the termination position, a position of a contact point in contact with the ground of the at least one leg configured for the legged robot; and
determining the target center of mass position based on the position of the contact point of the at least one leg.

18. The method according to claim 9, wherein the second state data further comprises a target center of mass speed, and the method further comprises:
obtaining first state data of the legged robot in an initiation position, wherein the first state data comprises at least an initiation center of mass position; and
determining a ratio of a distance between the target center of mass position and the initiation center of mass position to the target movement duration as the target center of mass speed.

19. A computing device connected to a legged robot, comprising:
one or more processors; and
memory storing one or more programs, the one or more programs comprising instructions that, when executed by the one or more processors, cause the one or more processors to perform operations comprising:
creating first relation data, the first relation data indicating a relation between an interval duration t and a center of mass position P(t) of the legged robot, and wherein the center of mass position P(t) varies as a function of the interval duration t and a first constant C according to the first relation data;
creating second relation data corresponding to the at least one leg of the legged robot, the second relation data indicating a relation between a force $f_i$ corresponding to the at least one leg with the ground and the center of mass position P(t), and wherein the force $f_i$ corresponding to the at least one leg with the ground varies as a function of the center of mass position P(t) and the first constant C according to the second relation data;
creating third relation data based on the second relation data, the third relation data indicating a positive correlation between a target value J and a square of the force $f_i$ to which the at least one leg in contact with the ground is subjected, wherein the third relation data defines a quadratic programming problem in which the target value J varies as a function of a square of the force $f_i$ to which the at least one leg in contact with the ground is subjected;
solving the quadratic programming problem by (i) applying different values for the first constant C to the center of mass position P(t) according to the first relation data and (ii) applying different values of the center of mass position P(t) corresponding to the different values for the first constant C to the force $f_i$ corresponding to the at least one leg with the ground according to the second relation data and (iii) applying different values of the force $f_i$ corresponding to the at least one leg with the ground to the target value J according to the third relation data until the target value J is minimized;
determining, among the different values for the first constant C used for solving the quadratic programming problem, a value of the first constant C when the target value J is minimized as an optimized solution to the quadratic programming problem; and
obtaining the first relation data according to the determined value of the first constant C, wherein the first relation data defines a trajectory of the center of mass position P(t) of the legged robot based on a movement of the legged robot as a function of time.

20. A non-transitory computer-readable storage medium, storing a computer program, the computer program, when executed by one or more processors of a computing device connected to a legged robot, cause the one or more processors to perform operations comprising:
creating first relation data, the first relation data indicating a relation between an interval duration t and a center of mass position P(t) of the legged robot, and wherein the center of mass position P(t) varies as a function of the interval duration t and a first constant C according to the first relation data;
creating second relation data corresponding to the at least one leg of the legged robot, the second relation data indicating a relation between a force $f_i$ corresponding to the at least one leg with the ground and the center of mass position P(t), and wherein the force $f_i$ corresponding to the at least one leg with the ground varies as a function of the center of mass position P(t) and the first constant (according to the second relation data;
creating third relation data based on the second relation data, the third relation data indicating a positive correlation between a target value J and a square of the force $f_i$ to which the at least one leg in contact with the ground is subjected, wherein the third relation data defines a quadratic programming problem in which the target value J varies as a function of a square of the force $f_i$ to which the at least one leg in contact with the ground is subjected;
solving the quadratic programming problem by (i) applying different values for the first constant C to the center of mass position P(t) according to the first relation data and (ii) applying different values of the center of mass position P(t) corresponding to the different values for the first constant C to the force $f_i$ corresponding to the at least one leg with the ground according to the second relation data and (iii) applying different values of the force $f_i$ corresponding to the at least one leg with the ground to the target value J according to the third relation data until the target value J is minimized;
determining, among the different values for the first constant C used for solving the quadratic programming problem, a value of the first constant C when the target value J is minimized as an optimized solution to the quadratic programming problem; and obtaining the first relation data according to the determined value of the first constant C, wherein the first relation data defines a trajectory of the center of mass position P(t) of the legged robot based on a movement of the legged robot as a function of time.

* * * * *